US012759096B2

(12) United States Patent
Wengerd et al.

(10) Patent No.: US 12,759,096 B2
(45) Date of Patent: Oct. 13, 2026

(54) METHOD AND APPARATUS FOR RETAINING WELD FIXTURES

(71) Applicant: FLEXTUR CORP., Dalton, OH (US)

(72) Inventors: John W. Wengerd, Dalton, OH (US); Larry E. Weaver, Dalton, OH (US)

(73) Assignee: FLEXTUR CORP., Dalton, OH (US)

( * ) Notice: Subject to any disclaimer, the term of this patent is extended or adjusted under 35 U.S.C. 154(b) by 114 days.

(21) Appl. No.: 18/947,439

(22) Filed: Nov. 14, 2024

(65) Prior Publication Data

US 2025/0083267 A1 Mar. 13, 2025

Related U.S. Application Data

(63) Continuation-in-part of application No. 18/652,882, filed on May 2, 2024.

(60) Provisional application No. 63/581,034, filed on Sep. 7, 2023.

(51) Int. Cl.
*B23K 37/04* (2006.01)
*B25J 9/00* (2006.01)

(52) U.S. Cl.
CPC ......... *B23K 37/0461* (2013.01); *B25J 9/0096* (2013.01)

(58) Field of Classification Search
CPC ...... B23K 37/0461; B25J 9/0096; B25H 1/08; B25H 1/02
USPC ...................................... 269/63; 29/791, 795
See application file for complete search history.

(56) References Cited

U.S. PATENT DOCUMENTS

| | | | | |
|---|---|---|---|---|
| 1,603,307 A * | 10/1926 | Anderson | B23K 37/0461 248/185.1 |
| 2,860,404 A | 11/1958 | Milton | |
| 2,928,364 A * | 3/1960 | Davis | B23K 37/053 269/254 R |
| 5,318,284 A * | 6/1994 | Demmeler | B25H 1/08 269/93 |
| 5,586,387 A | 12/1996 | Nakatani et al. | |
| 6,497,036 B1 | 12/2002 | Jenkins et al. | |
| 7,059,464 B2 | 6/2006 | Cho et al. | |
| 8,065,967 B2 * | 11/2011 | Wong | B25H 1/02 144/287 |
| 8,689,705 B2 | 4/2014 | Martin et al. | |
| 9,120,221 B2 | 9/2015 | Nagasuki et al. | |
| 9,630,284 B2 * | 4/2017 | Wessel | B23Q 17/005 |
| 9,862,088 B2 * | 1/2018 | Luis y Prado | B23K 37/0461 |
| 11,110,610 B2 | 9/2021 | Holmes et al. | |

(Continued)

OTHER PUBLICATIONS

Chad G., Introducing SparX ("sparks"), Guide Engineering's newest offering in collaborative welding., LinkedIn, retrieved Sep. 7, 2023.

(Continued)

*Primary Examiner* — Jason L Vaughan
(74) *Attorney, Agent, or Firm* — Sand, Sebolt & Wernow Co., LPA

(57) ABSTRACT

A modular cobot system is provided having a table that can connect with a plurality of modular secondary tables to enable a user to select or define a user-selected collective workspace area. There is one or more V-shaped notches formed in the lower surface of a fixture that is supported by a fixture support assembly on the table. These notches have a deep V-shaped configuration to allow a secure contact area to allow clamps and latches to secure the fixture atop the table.

17 Claims, 39 Drawing Sheets

(56) References Cited

U.S. PATENT DOCUMENTS

| | | | | |
|---|---|---|---|---|
| 2005/0039644 | A1 | 2/2005 | Sheahan et al. | |
| 2009/0283021 | A1* | 11/2009 | Wong | B23K 37/0461 108/115 |
| 2010/0219165 | A1* | 9/2010 | Woltering | B23K 37/0408 219/104 |
| 2021/0154829 | A1 | 5/2021 | Holmes et al. | |
| 2022/0152810 | A1* | 5/2022 | Gambino | B25H 1/08 |
| 2022/0388145 | A1* | 12/2022 | Siegmund | B25B 11/00 |
| 2022/0402147 | A1* | 12/2022 | Martin | B25J 15/0266 |
| 2023/0016165 | A1 | 1/2023 | Colin et al. | |
| 2023/0266024 | A1* | 8/2023 | Schneider | B23K 9/164 454/49 |
| 2023/0330795 | A1* | 10/2023 | Kappel | B25H 1/08 |
| 2023/0405739 | A1* | 12/2023 | Siegmund | B23K 37/0435 |

OTHER PUBLICATIONS

Flextur, Cobot Quick-Change Fixture Plate & Table from Flextur, https://www.youtube.com/watch?v=bfBCtmBYf5k&t=15s, Nov. 16, 2023.

* cited by examiner

METHOD AND APPARATUS FOR RETAINING WELD FIXTURES

CROSS REFERENCE TO RELATED APPLICATIONS

This application is a continuation-in-part application of U.S. patent application Ser. No. 18/652,882, filed on May 2, 2024, which claims the benefit of U.S. Provisional Application Ser. No. 63/581,034 filed Sep. 7, 2023, the entirety of each of which is incorporated herein.

TECHNICAL FIELD

This disclosure is directed to a cobot system and method thereof.

BACKGROUND ART

A “cobot,” short for “collaborative robot,” is a type of robot designed to work alongside humans in a shared workspace safely and efficiently. Unlike traditional industrial robots that typically operate in isolation behind safety cages, cobots are specifically built to interact with human workers and assist them in various tasks.

Cobots are typically smaller and lighter than traditional robots, making them more portable and easier to integrate into existing workspaces. One exemplary purpose is to assist humans in tasks that require physical interaction, such as assembly, material handling, quality control, and repetitive tasks. Cobots are meant to work alongside human workers, fostering a collaborative and symbiotic relationship between humans and machines. They can take over repetitive, ergonomically challenging, or dangerous tasks, allowing human workers to focus on more creative and complex aspects of their jobs. Contrast this with traditional robots that are usually larger and more powerful, often employed in automated manufacturing processes. They are typically stationary or operate within confined spaces, separated from human workers by safety barriers. These robots are programmed for specific tasks and don’t inherently consider human safety during operation.

Cobots are often designed to be easily programmable, either through intuitive graphical interfaces or by physically guiding the robot through the desired motion. This allows non-experts to program cobots quickly and adapt them to various tasks. Cobots can also be easily redeployed for different tasks or reprogrammed for new processes. Programming traditional robots typically requires specialized skills and can be complex. These robots are often dedicated to specific tasks and are less flexible when it comes to adapting to new jobs or environments.

Cobots are commonly used in manufacturing environments for tasks such as assembly, pick-and-place, quality control, and machine tending. They can work alongside human workers on the factory floor to increase productivity and efficiency. Cobots can also be easily reprogrammed and adapted to various tasks. This flexibility makes them suitable for custom manufacturing environments where products and processes may change frequently.

One exemplary cobot designed to assist a worker with manufacturing is a welding cobot that is a specialized collaborative robot tailored for welding applications. A welding cobot is equipped with a payload capacity suitable for handling welding equipment, which can include a welding torch, wire feeder, and other accessories. The exact payload capacity would depend on the specific model and manufacturer but typically ranges from 5 kg to 25 kg or more. The welding cobot may be programmed with advanced welding algorithms and software that ensure precise and high-quality welds. These algorithms can control parameters like voltage, current, wire feed speed, and torch angle to adapt to different welding tasks and materials. The welding cobot may be equipped with various sensors to monitor the welding process and environment. These sensors can include vision systems (e.g., high-resolution cameras for real-time weld seam tracking and quality control), force/torque Sensors to detect resistance and ensure the correct pressure is applied during welding, infrared sensors to monitor heat and prevent overheating or improper welds. The welding cobot may include safety mechanisms such as speed and force limitation to adjust its speed and force based on the proximity of the human worker, ensuring safe collaboration. The welding cobot may offer different welding modes, including MIG (Metal Inert Gas), TIG (Tungsten Inert Gas), or stick welding, depending on the specific welding application and material requirements. It can integrate with various welding power sources and controllers, ensuring compatibility with existing welding equipment and processes. The welding cobot may perform real-time quality control checks, inspecting the welds for defects, such as cracks or inconsistent bead profiles, and alerting the operator if any issues are detected.

SUMMARY OF THE INVENTION

While cobots have made significant advancements and have proven to be valuable assets in manufacturing facilities, there is still room for improvement and innovation in several areas to enhance their capabilities further. In one example, enhancing cobot capabilities lies in the realm of modularity and the development of a more modular design. The current landscape of cobots often lacks the flexibility to easily adapt to different tasks or industries without extensive reconfiguration. Some exemplary embodiments of the present disclosure focus on modularity to address this limitation. In doing so, some embodiments are able to improve upon the modularity of a cobot by providing a configuration or design that allows for easy swapping of components, structural components, end-effectors, and software modules. This approach enables cobots (and the human worker) to quickly transition between various tasks and industries, offering a more versatile and cost-effective solution. Additionally, a modular design facilitates scalability, making it simpler to deploy multiple cobots in a coordinated fashion for complex manufacturing processes while still maintaining the benefits of collaboration with human workers. The modularity of the present disclosure may also improve mobility and reach. The modularity of the system of the present disclosure can assist in creating a user-selected collective workspace area that enhances cobot’s mobility and reach to be optimized for a welding workspace. Its arm length and reach should be suitable for reaching various welding positions and angles based on the other modular components in operative communication therewith, such as a plurality of secondary tables that, at least in part, define the user-selected workspace area for an operation to be performed on a workpiece.

Although the present disclosure is generally directed towards improving the modularity or modular configuration of a cobot, it still can have other advantages. For example, the present disclosure may directly or indirectly increase the efficiently or speed of cobots while maintaining their safety features, enabling them to handle a broader range of manufacturing tasks. The present disclosure may directly or indirectly expand payload capabilities that allows the cobot to handle larger and heavier objects by increasing the collective workspace area for which a cobot operation may be performed, thereby making the cobot more versatile in manufacturing environments. The present disclosure may directly or indirectly enhance end-effector design and interchangeability that can improve adaptability to a wider range of applications without significant reconfiguration. The present disclosure may directly or indirectly improve sensors and vision systems that can enhance a cobot's ability to detect and interact with objects and humans more accurately. This can lead to better collision avoidance, object recognition, optical cueing, and coordination with human workers. The present disclosure may directly or indirectly improve or provide advanced artificial intelligence (AI) algorithms that can enable cobots to make more complex decisions in real-time. This includes path planning, task sequencing, and adapting to changing conditions autonomously. The present disclosure may directly or indirectly include better gesture recognition, voice commands, and natural language processing. The present disclosure may directly or indirectly reduce the overall cost of cobots, including both initial purchase and maintenance costs, that can make them more accessible to a broader range of manufacturers, especially small and medium-sized enterprises (SMEs). The present disclosure may directly or indirectly simplify the programming and integration of cobots into existing manufacturing systems that can lower the barrier to adoption. The present disclosure may directly or indirectly enhanceme the scalability of cobot solutions that can allow manufacturers to deploy multiple cobots in a coordinated manner, facilitating more complex and collaborative manufacturing processes.

In one aspect, an exemplary embodiment of the present disclosure may provide a cobot system comprising: a cobot mounted on a tabletop; at least one leg supporting the tabletop; and a bracket on the at least one leg, wherein the bracket is shaped to receive a component indirectly coupled to a modular second tabletop, wherein when the bracket receives the component, a collective workspace area is established and is defined by the tabletop and the modular second tabletop for the cobot to engage a workpiece located in the collective workspace area. This exemplary embodiment or another exemplary embodiment may further provide that the bracket comprises: a first plate connected to the at least one leg; a second plate connected to the at least one leg; and wherein the first plate has a major surface that is orthogonal to a major surface of the second plate. This exemplary embodiment or another exemplary embodiment may further provide that the bracket comprises: a first L-shaped plate connected to the at least one leg; and a second L-shaped plate connected to the at least one leg. This exemplary embodiment or another exemplary embodiment may further provide that the bracket comprises: a first plate connected to the at least one leg; and a first flange connected to the at least one leg below the first plate. This exemplary embodiment or another exemplary embodiment may further provide an adjustment mechanism coupled to the first flange. This exemplary embodiment or another exemplary embodiment may further provide a second plate connected to the at least one leg; and a second flange connected to the at least one leg below the second plate. This exemplary embodiment or another exemplary embodiment may further provide an adjustment mechanism coupled to the second flange. This exemplary embodiment or another exemplary embodiment may further provide that the bracket comprises: a first plate connected to the at least one leg, the first plate having an upper end and a lower end, wherein the first plate defines an aperture extending through the first plate adjacent the upper end thereof; and a second plate connected to the at least one leg, the second plate having an upper end and a lower end, wherein the second plate defines an aperture extending through the second plate adjacent the upper end thereof. This exemplary embodiment or another exemplary embodiment may further provide that the component indirectly coupled to the second tabletop defines a second aperture that aligns with one of the aperture extending through the first plate and the aperture extending through the second plate. This exemplary embodiment or another exemplary embodiment may further provide a first sidewall of the at least one leg; a second sidewall of the at least one leg; wherein the first sidewall is orthogonal to the second sidewall; wherein the bracket is connected to both the first sidewall and the second sidewall that is adapted to permit the second tabletop to extend from either a side or an end of the tabletop based on a user-selected configuration for the collective workspace area. This exemplary embodiment or another exemplary embodiment may further provide a universal reference point on the tabletop for a sensor on the cobot regardless of the user-selected configuration for the collective workspace area. This exemplary embodiment or another exemplary embodiment may further provide a universal reference point on the second tabletop for a sensor on the cobot regardless of the user-selected configuration for the collective workspace area. This exemplary embodiment or another exemplary embodiment may further provide a V-shaped channel in one of the tabletop and the second tabletop; and a clamp that engages the V-shaped channel, wherein the V-shaped channel is configured to align a workpiece in the collective workspace area. This exemplary embodiment or another exemplary embodiment may further provide a void formed in one of the tabletop and the second tabletop below the V-shaped channel, wherein the void is configured to reduce debris collection. This exemplary embodiment or another exemplary embodiment may further provide alignment indices in one of the tabletop and the second tabletop to identify alignment of the clamp relative to the V-shaped channel. This exemplary embodiment or another exemplary embodiment may further provide that upper surfaces of the tabletop and second tabletop lie along a single even plane to provide level continuity for the collective workspace area.

In another aspect, and exemplary embodiment of the present disclosure may provide a method comprising: aligning a secondary tabletop with a tabletop supporting a cobot; aligning a component indirectly coupled to the secondary tabletop with a bracket on a leg supporting the tabletop; abutting the component with the bracket; and connecting the component to the bracket to thereby establish a collective workspace area defined by the aligned tabletop and secondary tabletop within which the cobot performs an operation. This exemplary embodiment or another exemplary embodiment may further provide for leveling the collective workspace area along a single even plane by manipulating an adjustment mechanism, wherein the adjustment mechanism is located on a leg supporting the tabletop. This exemplary embodiment or another exemplary embodiment may further provide for defining a universal reference point for the cobot within the collective workspace area regardless of a user-selected configuration for the collective workspace area. This exemplary embodiment or another exemplary embodiment may further provide connecting a clamp to a v-shaped channel formed in one of the tabletop and the second tabletop, wherein a void is defined below the V-shaped channel to reduce collection of debris in the V-shaped channel.

In yet another aspect, an exemplary embodiment of the present disclosure may provide a welding table kit comprising: a primary table that supports a welding cobot; a plurality of secondary tables that are selectively connectable with the primary table based on a user-selected preference and configuration of a resultant collective workspace area defined by aligned tabletops of the primary table and the secondary tables, wherein connection of the secondary tables to the primary table is effectuated by joining complementary connectors on respective legs of the primary table and the secondary tables.

In yet another aspect, an exemplary embodiment of the present disclosure may provide a welding table comprising: a table frame having downwardly extending legs; a welding fixture support assembly positioned atop the table frame, wherein the welding fixture support assembly comprises: a first rail having a first end and a second end; a first clamp hook at the second end of the first rail, wherein the first clamp hook is shaped to fit within a first generally V-shaped slot formed below a welding fixture that is to be supported by and engaged with the fixture support assembly via the first clamp hook, wherein the first generally V-shaped slot tapers at an angle less than about 45 degrees, and wherein the first clamp hook contacts an edge of the first generally V-shaped slot at a contact area that has a length greater than ½ inch. In this exemplary embodiment or another exemplary embodiment, the contact area has a length of about 1.25 inches and/or the angle is about 40 degrees. In this exemplary embodiment or another exemplary embodiment, the welding fixture support assembly further comprises: a second rail having a first end and a second end; and a second clamp hook at the second end of the second rail, wherein the second clamp hook is shaped to fit within a second generally V-shaped slot formed below the welding fixture that is to be supported by and engaged with the fixture support assembly via the second clamp hook, wherein the second generally V-shaped slot tapers at an angle less than about 45 degrees, and wherein the second clamp hook contacts an edge of the second generally V-shaped slot at a contact area that has a length greater than ½ inch. In this exemplary embodiment or another exemplary embodiment, the welding fixture support assembly further comprises: a first latch adjacent the first end of the first rail; and an actuator operatively connected to the first latch and the first clamp hook, wherein movement of the actuator imparts movement to the first latch and the first clamp hook. In this exemplary embodiment or another exemplary embodiment, the welding fixture support assembly further comprises: a biasing member operatively connected to the first clamp hook via a lever that offsets the biasing member from an arm of the first clamp hook, wherein the biasing member assists movement of the first clamp hook between an unclamped position and a clamped position, wherein the clamp clamps the welding fixture to the welding fixture support assembly in the clamped position. In this exemplary embodiment or another exemplary embodiment, the welding fixture support assembly further comprises a first latch plate adjacent the first end of the first rail; and a first alignment indicator formed as an arrow being centered relative to the first latch plate. In this exemplary embodiment or another exemplary embodiment, the welding fixture support assembly further comprises an extension coil spring having one end connected to a body of the first latch, wherein the extension coil spring is adapted to assist the actuator in moving the latch between a latched position and an unlatched position, wherein the latch latches the welding fixture to the welding fixture support assembly in the latched position. In this exemplary embodiment or another exemplary embodiment, movement of the actuator moves the first latch between a latched position and an unlatched position, and movement of the actuator moves the first clamp hook between a clamped position and an unclamped position, wherein the actuator causes the first clamp hook and the first latch to be unclamped and unlatched, respectively, at the same time and the first actuator causes the first clamp hook and the first latch to be clamped and latched, respectively, at the same time. In this exemplary embodiment or another exemplary embodiment, the welding fixture support assembly further comprises a first cutout defined adjacent to the first end of the first rail, wherein the first cutout is adapted to prevent interference of weld spatter during a welding operation.

In yet another aspect, an exemplary embodiment of the present disclosure may provide a method comprising: placing a latch on a welding fixture support assembly in an unlatched position, wherein the welding fixture support assembly is supported by a table; placing a clamp on the welding fixture support assembly in an unclamped position; placing a welding fixture atop a welding fixture support assembly that is supported by a table; sliding the fixture along a top surface of the welding fixture support assembly; inserting the clamp into a first generally V-shaped slot formed in the welding fixture, wherein the first generally V-shaped slot tapers at an angle less than about 45 degrees, and wherein the clamp contacts an edge of the first generally V-shaped slot at a contact area that has a length greater than ½ inch; and actuating an actuator to simultaneously move the latch to a latched position and the clamp to a clamped position. This exemplary embodiment or another exemplary embodiment may further include inserting the latch into a second generally V-shaped slot formed in the welding fixture, wherein the second generally V-shaped slot tapers at an angle less than about 45 degrees, and wherein the latch contacts an edge of the second generally V-shaped slot at a contact area that has a length greater than ½ inch. This exemplary embodiment or another exemplary embodiment may further provide that movement of the clamp from the unclamped position to the clamped position further comprises pivoting a lever connected to a body of the clamp with assistance from a biasing member. This exemplary embodiment or another exemplary embodiment may further include that the biasing member is a torsion spring located between a tip of the body of the clamp and a lower end of the body of the clamp. This exemplary embodiment or another exemplary embodiment may further include performing a welding operation with the welding fixture secured to the welding fixture support assembly; and effecting weld splatter to move through a cutout defined adjacent to an end of rail in the welding fixture support assembly.

In yet another aspect, an exemplary embodiment of the present disclosure may provide a cobot welding table comprising: a table frame having downwardly extending legs; at least one modular connector on the table frame, wherein the modular connector is a generally flat and planar member that extends in a vertical direction, wherein the modular connector has an upper end connected to one leg of the table frame, a lower end connected the leg of the table frame, and a central portion that is offset from the leg, wherein the central portion defines an aperture that extends fully through the modular connector; a fixture support assembly positioned atop the table frame, the fixture support assembly including: a pair of lateral supports that are elongated to extend in a lateral first direction; a pair of longitudinal supports that are elongated to extend in a longitudinal second direction that is perpendicular to the first direction; a first rail and a second rail located between a first longitudinal support and a second longitudinal support, wherein the first longitudinal support and the second longitudinal support collectively define the pair of longitudinal supports, wherein the first rail and the second rail are at least as long as the pair of longitudinal supports; a first end of each of the first rail and the second rail; a second end of each the first rail and the second rail; a first latch plate adjacent the first end of the first rail, and a first alignment indicator formed as an arrow being centered relative to the first latch plate; a first latch adjacent the first end of the first rail and adjacent the first latch plate; a first clamp hook at the second end of the first rail, wherein the first clamp hook is shaped to fit within a first V-shaped slot formed below a fixture that is to be supported by and engaged with the fixture support assembly via the first clamp, wherein the first V-shaped slot tapers at an angle less than about 45 degrees, and a contact area at where the first clamp hook contacts a sidewall of the first V-shaped slot has a length greater than ¾ inch; a first actuator operatively connected to the first latch and the first clamp hook, wherein movement of the first actuator moves the first latch between a latched position and an unlatched position, and movement of the first actuator moves the first clamp hook between a clamped position and an unclamped position, wherein the first actuator causes the first clamp hook and the first latch to be unclamped and unlatched, respectively, at the same time and the first actuator causes the first clamp hook and the first latch to be clamped and latched, respectively, at the same time; a first biasing member in operative communication with the first clamp hook, wherein the first biasing member assists to move the first clamp hook between the clamped position and the unclamped position, and wherein the first biasing member is a spring; a second latch plate adjacent the first end of the second rail, and a second alignment indicator formed as an arrow being centered relative to the second latch plate; a second latch adjacent the first end of the second rail and adjacent the second latch plate; a second clamp hook at the second end of the second rail, wherein the second clamp hook is shaped to fit within a second V-shaped slot formed below a fixture that is to be supported by and engaged with the fixture support assembly via the second clamp, wherein the second V-shaped slot tapers at an angle less than about 45 degrees, and a contact area at where the second clamp hook contacts a sidewall of the second V-shaped slot has a length greater than ¾ inch; a second actuator operatively connected to the second latch and the second clamp hook, wherein movement of the second actuator moves the second latch between a latched position and an unlatched position, and movement of the second actuator moves the second clamp hook between a clamped position and an unclamped position, wherein the second actuator causes the second clamp hook and the second latch to be unclamped and unlatched, respectively, at the same time and the second actuator causes the second clamp hook and the second latch to be clamped and latched, respectively, at the same time; a second biasing member in operative communication with the second clamp hook, wherein the second biasing member assist to move the second clamp hook between the clamped position and the unclamped position, and wherein the second biasing member is a spring; a first cutout defined adjacent to the first end of the first rail, wherein the first cutout is adapted to prevent interference of weld spatter during cobot welding operation; and a second cutout defined adjacent to the first end of the second rail, wherein the second cutout is adapted to prevent interference of weld spatter during cobot welding operation. This exemplary embodiment or another exemplary embodiment may further include air supply couplings on one of the pair of lateral supports; and a safety kill switch in a lateral sidewall, wherein the safety kill switch is a push-button type switch.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
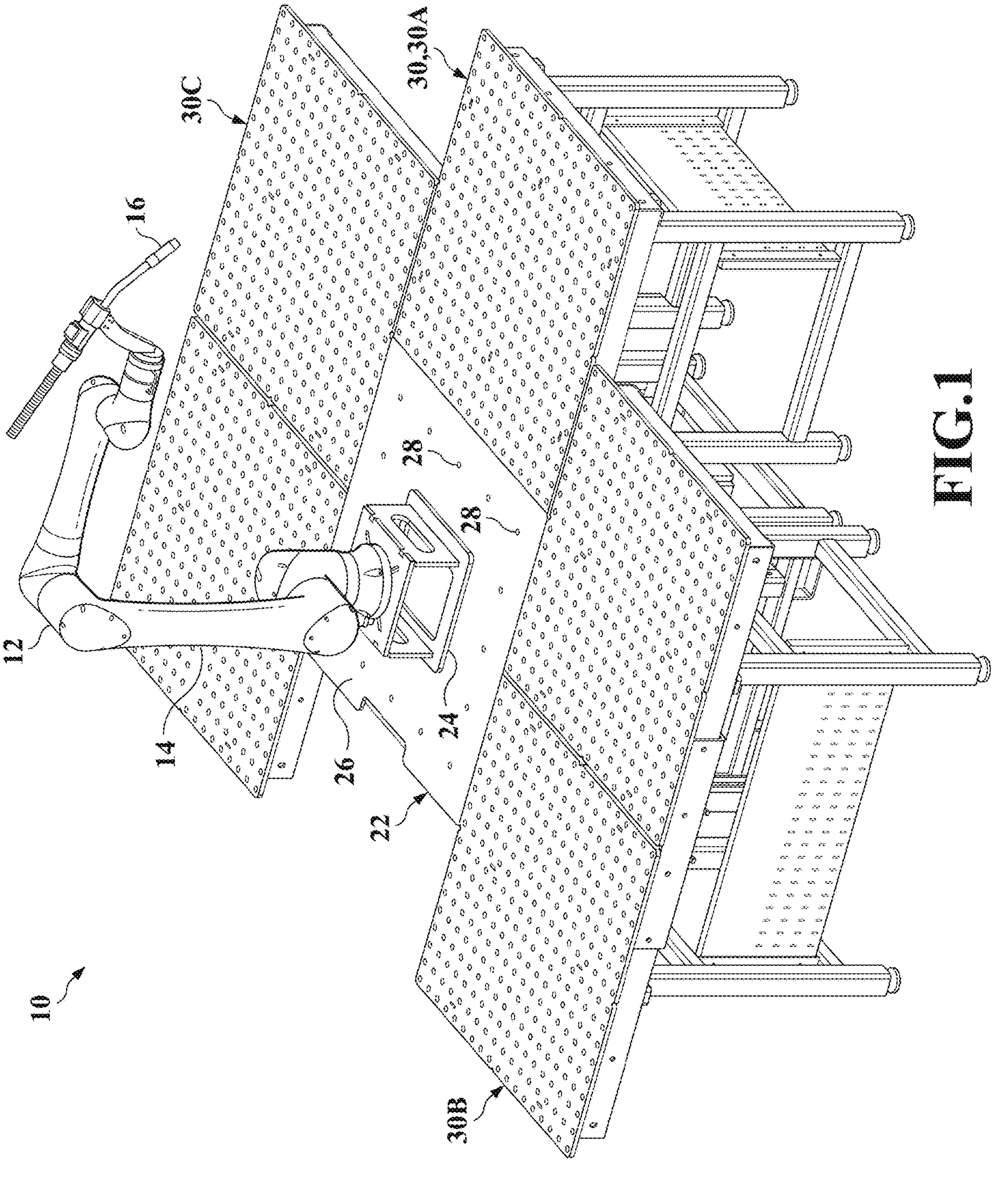
FIG. 1 (FIG. 1) is a perspective view of a modular cobot system according to one exemplary embodiment of the present disclosure.

The figures depict a modular cobot system generally at 10. Although the modular cobot system 10 is primarily discussed herein with reference to a welding cobot, other types of cobots are entirely and can be used within modular cobot system 10. A welding cobot 12 is a complex system comprising various components that work together to enable precise and efficient welding processes while ensuring the safety of human workers. Cobot 12 may include an arm 14. One exemplary arm 14 is manufactured by Universal Robotics, however other manufacturers can be utilized. The arm 14 includes multiple joints that provide the robot's mobility and flexibility. The number of joints and the arm's reach may vary depending on the model. Cobot 12 may include a variety of welding equipment. A welding torch 16 is the part of the welding equipment that generates the electric arc used for welding. It typically includes a nozzle, electrode, and shielding gas supply. In cases of MIG welding, a wire feeder is used to feed the welding wire into the torch at a controlled rate. There may also be a power cable and gas hose. These connect the welding torch to the power source and gas supply, respectively. Cobot 12 may also include a heavy industrial pulse power source 18 that provides the electrical power needed for welding. It generates the welding current, voltage, and pulse settings required for different welding processes. A pulse control allows the operator or user to control the timing and intensity of the welding pulses, which is necessary for achieving the desired weld quality and minimizing heat input. Source 18 may use inverter technology, which makes it more energy-efficient and capable of handling various welding processes. Source 18 may offer the ability to control the welding waveform, which can improve the weld's penetration and appearance.

Cobot 12 may include one or more vision systems, often integrated into the cobot's end-of-arm tooling, that may be used for real-time weld seam tracking, ensuring precise placement of the welding torch. The vision system may also be used for proper alignment of the workpiece that is to be welded. Further, the vision system can locate either the workpiece, a clamp or a jig to ensure the workpiece is in a proper position. Cobot 12 may also include force/torque sensors that provide feedback on the force and torque applied by the cobot during welding, allowing for precise control and monitoring. Cobot 12 may be controlled by a dedicated controller, which processes input from the operator or the programming interface and translates it into robot movements and welding parameters. The control system may include safety features such as collision detection, speed and force monitoring, and emergency stop functionality to ensure the safety of human workers. A programming interface allows operators, users or welders to teach the cobot specific welding paths and parameters. It can be a physical teach pendant or software-based, depending on the cobot model. Cobot 12 may have a safety barrier 20 or curtain to protect human workers from the welding arc and sparks.

The components of cobot 12 are typically contained, mounted, or supported by a table 22 or platform to create a stable and functional work environment. The arm 14 may be mounted to a rigid, fixed base 24 attached to the table 22 or platform. This base 24 provides stability and ensures that the arm 14 can move accurately and consistently during welding operations. The heavy industrial pulse power source 18 is a separate unit that can be placed on or near the table 22 or platform. It may have its own mounting bracket or support structure. Cables from the power source connect to the welding torch and, if necessary, to the UR arm's controller. The safety barrier(s) 20, curtains, or screens are set up around the table 22 or platform to create a controlled and safe working area. The table 22 or platform itself is typically designed to provide a stable foundation for all these components and to ensure that the welding cobot 12 operates with precision and accuracy. Table 22 may have leveling mechanisms to ensure that the workspace is flat and even, which is crucial for welding tasks. Additionally, the table 22 or platform often includes cable management systems to keep power and communication cables organized and prevent entanglement during the cobot's movements.

The table 22 includes a top 26 or tabletop 26. Tabletop 26 may feature a grid or array of holes 28, similar to a pegboard, to assist with clamping and securing the objects/workpiece being welded by both the welding cobot 12 and human worker/user. These hole 28 patterns serve several purposes in welding applications. The grid of holes 28 interact a versatile clamping system. Various types of clamps and fixtures can be inserted into these holes and tightened to secure the workpiece firmly in place. This flexibility allows for the clamping of objects/workpieces with different shapes, sizes, and orientations, making it easier to accommodate a wide range of welding tasks. Additionally, welding setups often require precise positioning and alignment of workpieces, which can be aided by the vision system on cobot 12. The hole 28 pattern allows for the easy attachment and alignment of custom jigs, fixtures, and workholding devices. Welders and operators can design and adapt their clamping setups to meet the specific requirements of each welding project. In collaborative welding scenarios where both the cobot 12 and human worker/user are involved, having a shared workspace or collective workspace area with a hole-patterned tabletop facilitates collaborative welding. Both the cobot and the human worker can utilize the same clamping system, making it simpler to coordinate their efforts and ensure that the workpiece is securely held in place during welding. The hole 28 pattern provides a reference grid for repeatability. This may be important in automated welding processes where the cobot needs to return to precise welding positions repeatedly. These holes may serve as one or more reference points for aligning the workpiece accurately, ensuring consistent weld quality. However, other reference points, which are not holes, may also be provided on tabletop 26 in the collective workspace area. Clamping workpieces securely in place assists with safety during welding. The hole-patterned tabletop 26 helps prevent workpieces from shifting or moving during welding, reducing the risk of accidents and ensuring that the welding torch or electrode remains at the correct distance from the workpiece. With a well-designed hole 28 pattern, operators can quickly set up and secure workpieces, saving time and improving the overall efficiency of the welding process. This is particularly beneficial in high-production environments. Additionally, welding cobots may need to handle a variety of workpieces in a single workspace or the collective workspace area. The hole-patterned tabletop may make it easier to switch between different workpiece clamping setups, allowing for greater adaptability and quicker changeovers between tasks.

FIG. 1 depicts the modularity of system 10. Particularly, table 22 and its tabletop 26 are shown as being connected with a plurality of modular secondary tables 30. There may be a first secondary table 30A, a second secondary table 30B, and a third secondary table 30C. The secondary tables 30 can be configured to connect with table 22 that supports the cobot 12, to provide a greater tabletop workspace or effective working area (i.e., a collective workspace area greater than the tabletop 26 area alone) for the welding piece that is being assembled by the cobot 12 in conjunction with the worker. The manner in which the modularity and connection of the secondary tables 30 to the primary table or table 22 is detailed herein.

Figure 2:
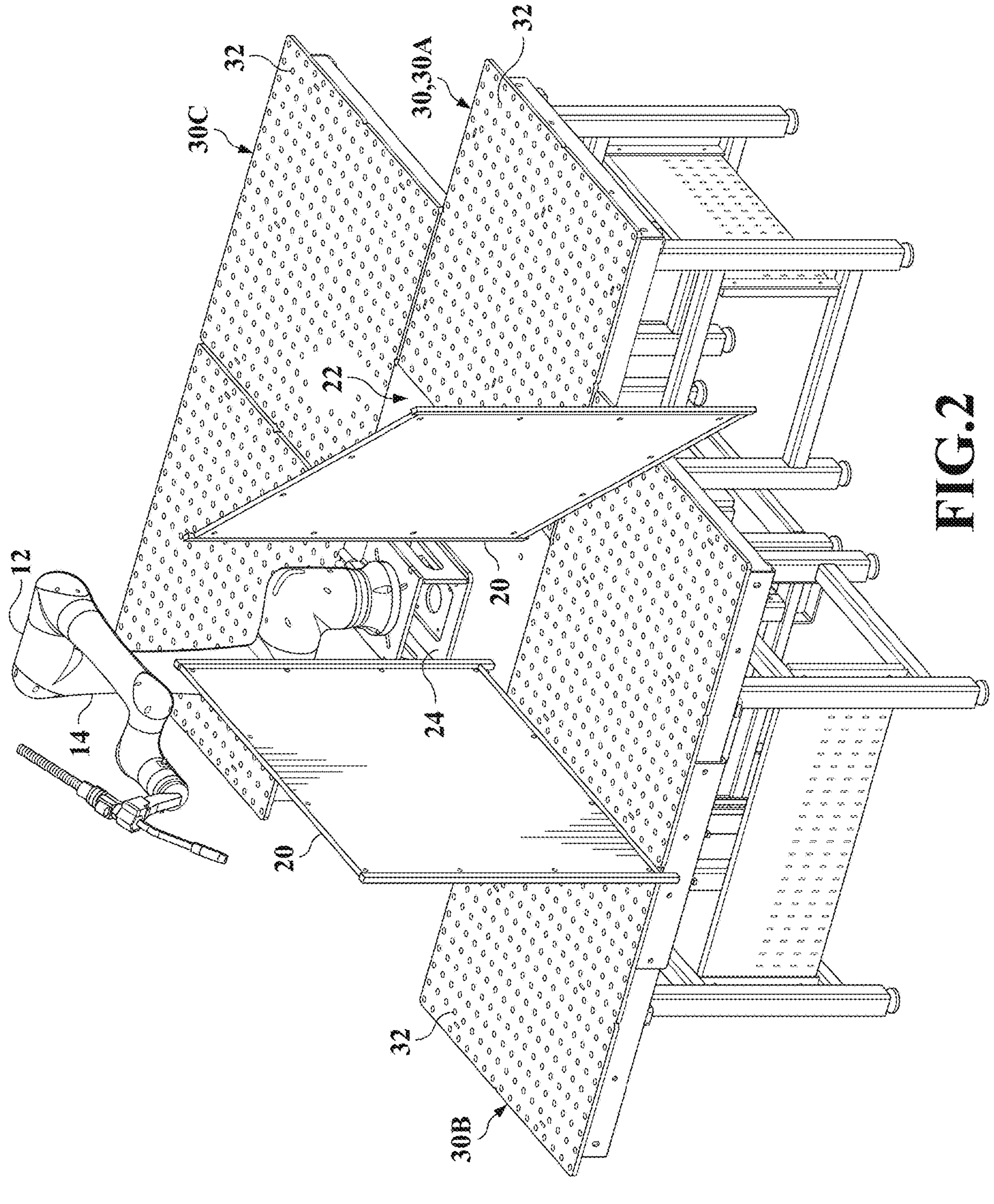
FIG. 2 (FIG. 2) is a perspective view of a modular cobot system with protective barriers according to one exemplary embodiment of the present disclosure.

FIG. 1-FIG. 2 depict that the tabletop or tops of the secondary tables 30 may also be configured with a plurality of secondary holes 32, defining an array or grid-like pattern on the top surface of each respective secondary table 30. The secondary holes 32 function similarly to holes 28 to allow attachment of various devices on the larger expanded tabletop surface or collective top surface when the secondary tables 30 are connect with primary table 22. Holes 32 may also be utilized as reference points for positioning/aligning the cobot 12 aided by the vision system. Additionally, FIG. 2 depicts the connection of the barriers 20 to the holes 28 in the primary table 22. However, it is to be understood that barriers 20 may similarly be connected with the secondary holes 32 in the secondary tables 30. The holes may also function as or similar to a pegboard to allow other components to releasably attach to the tabletop.

Figure 3:
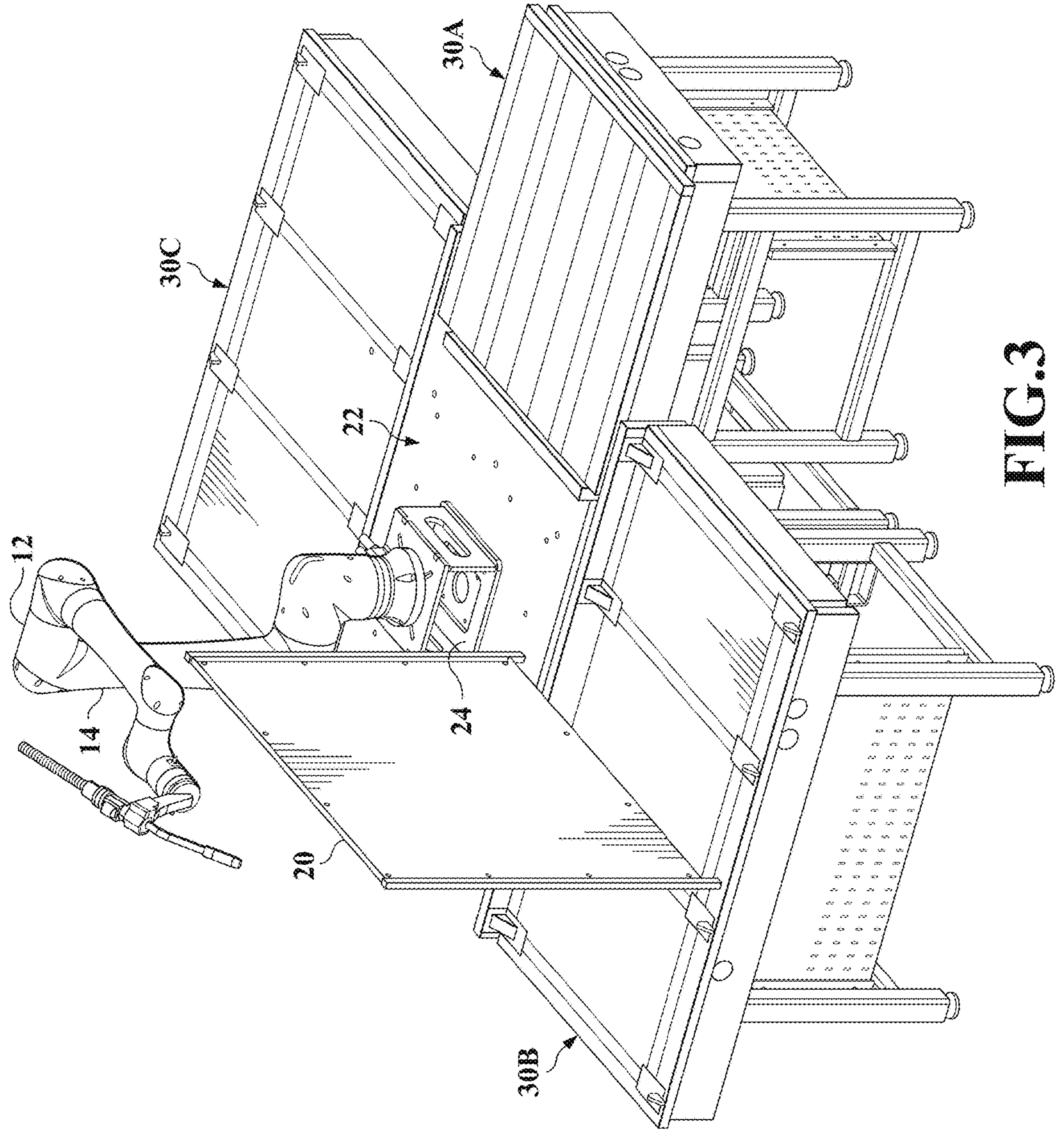
FIG. 3 (FIG. 3) is a perspective view of a modular cobot system with protective barriers and flat top secondary tables according to one exemplary embodiment of the present disclosure.

FIG. 3 depicts an embodiment in which the secondary tables 30 are flattop tables. The flattop tables 30A, 30B, and 30C depicted in FIG. 3 may modularly connect with the primary table 22 in the manner detailed herein, but only differ by having a different tabletop configuration of each respective secondary table 30.

Figure 4:
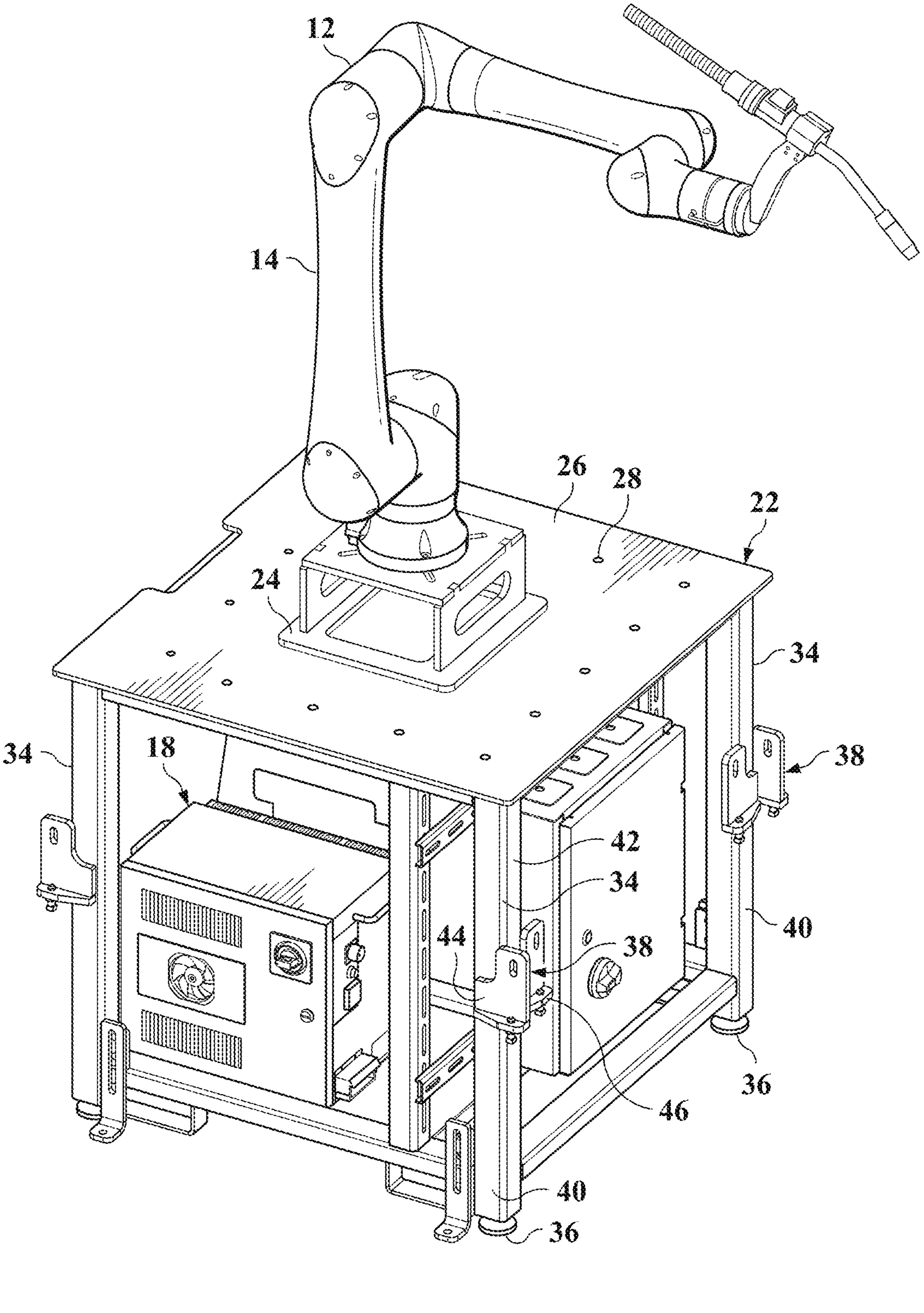
FIG. 4 (FIG. 4) is a perspective view of the primary table and cobot of the modular cobot system.
Figure 5:
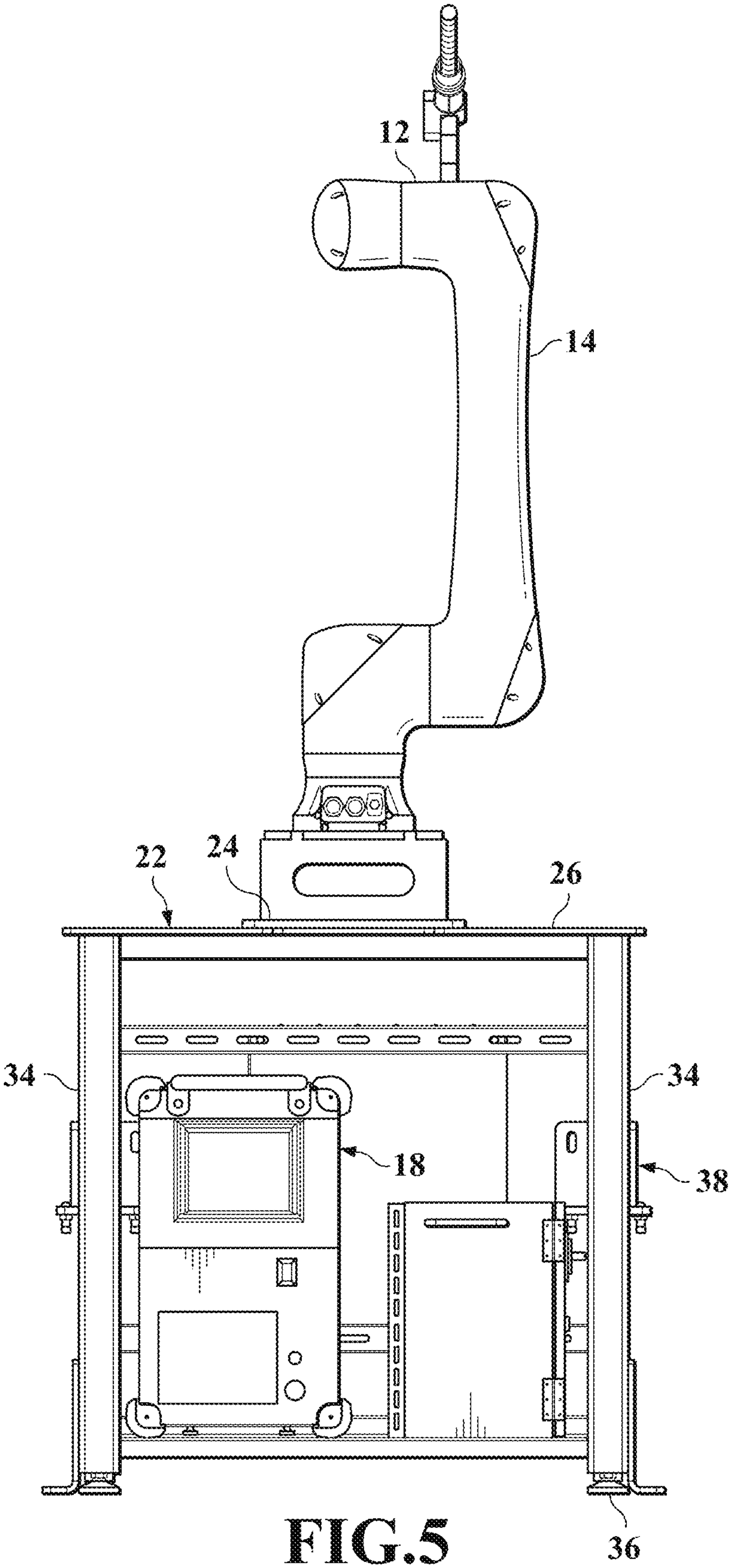
FIG. 5 (FIG. 5) is a side elevation view of the primary table and cobot.
Figure 6:
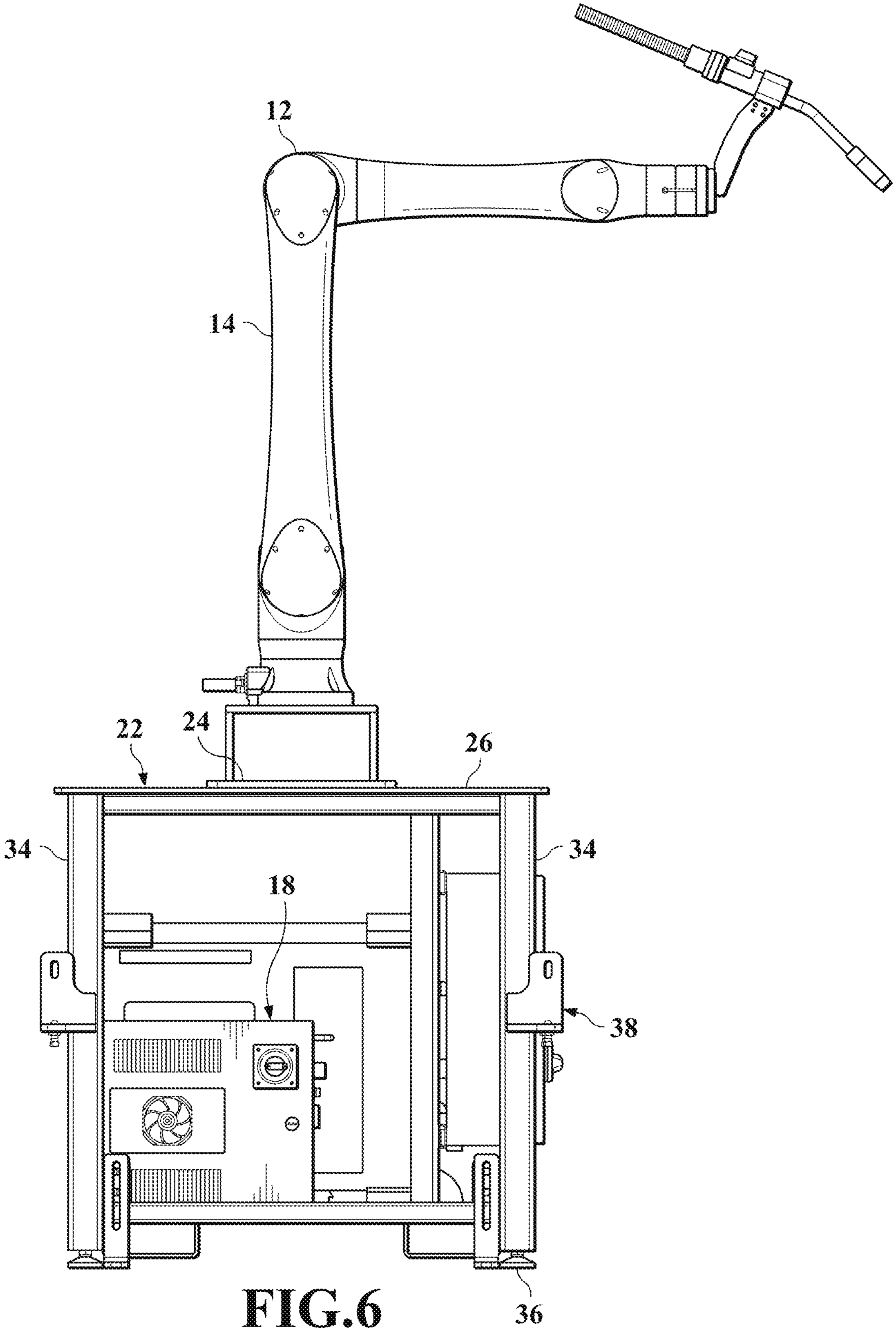
FIG. 6 (FIG. 6) is an end elevation view of the primary table and cobot.
Figure 7:
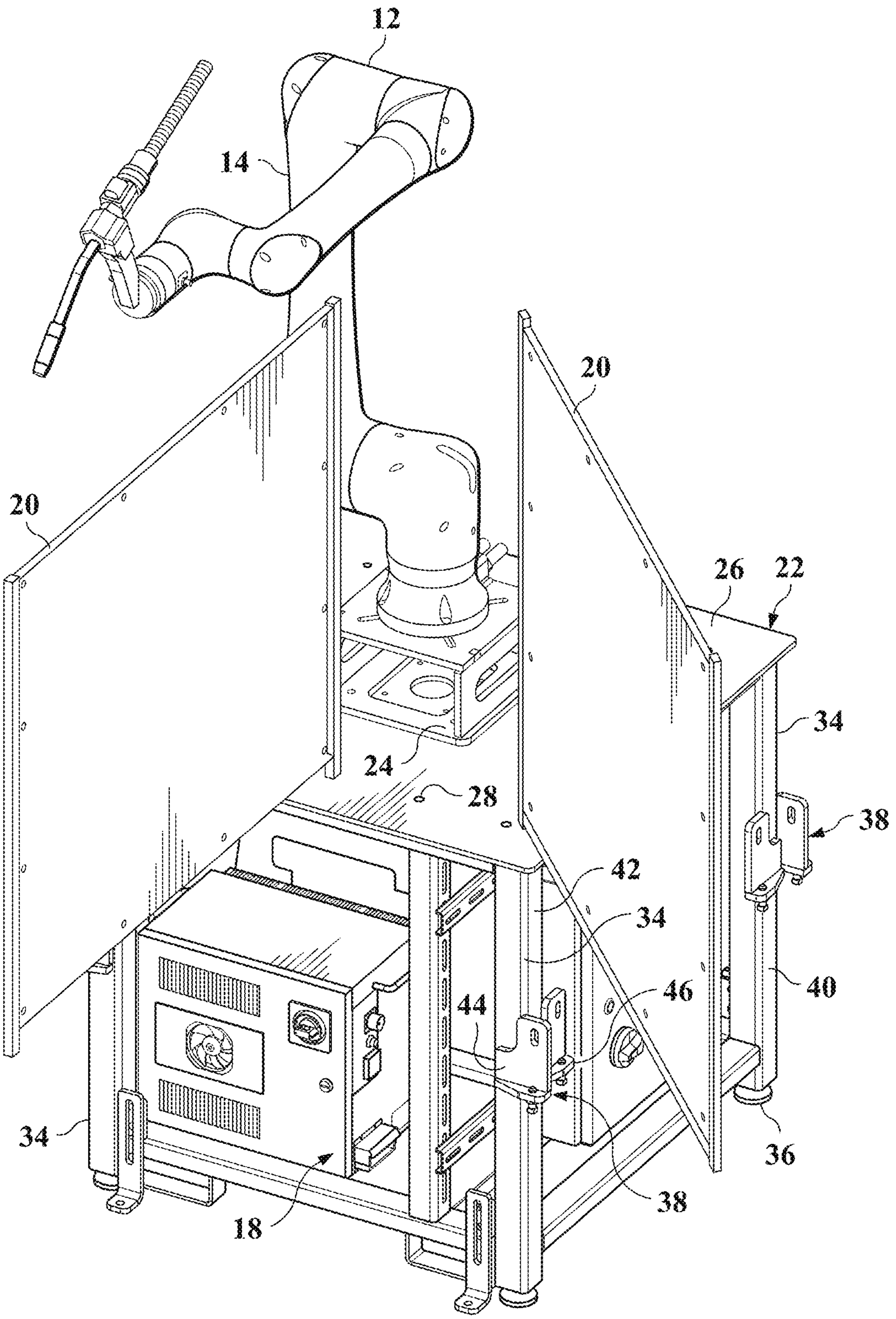
FIG. 7 (FIG. 7) is a perspective view of the primary table, protective barriers, and cobot of the modular cobot system.
Figure 8:
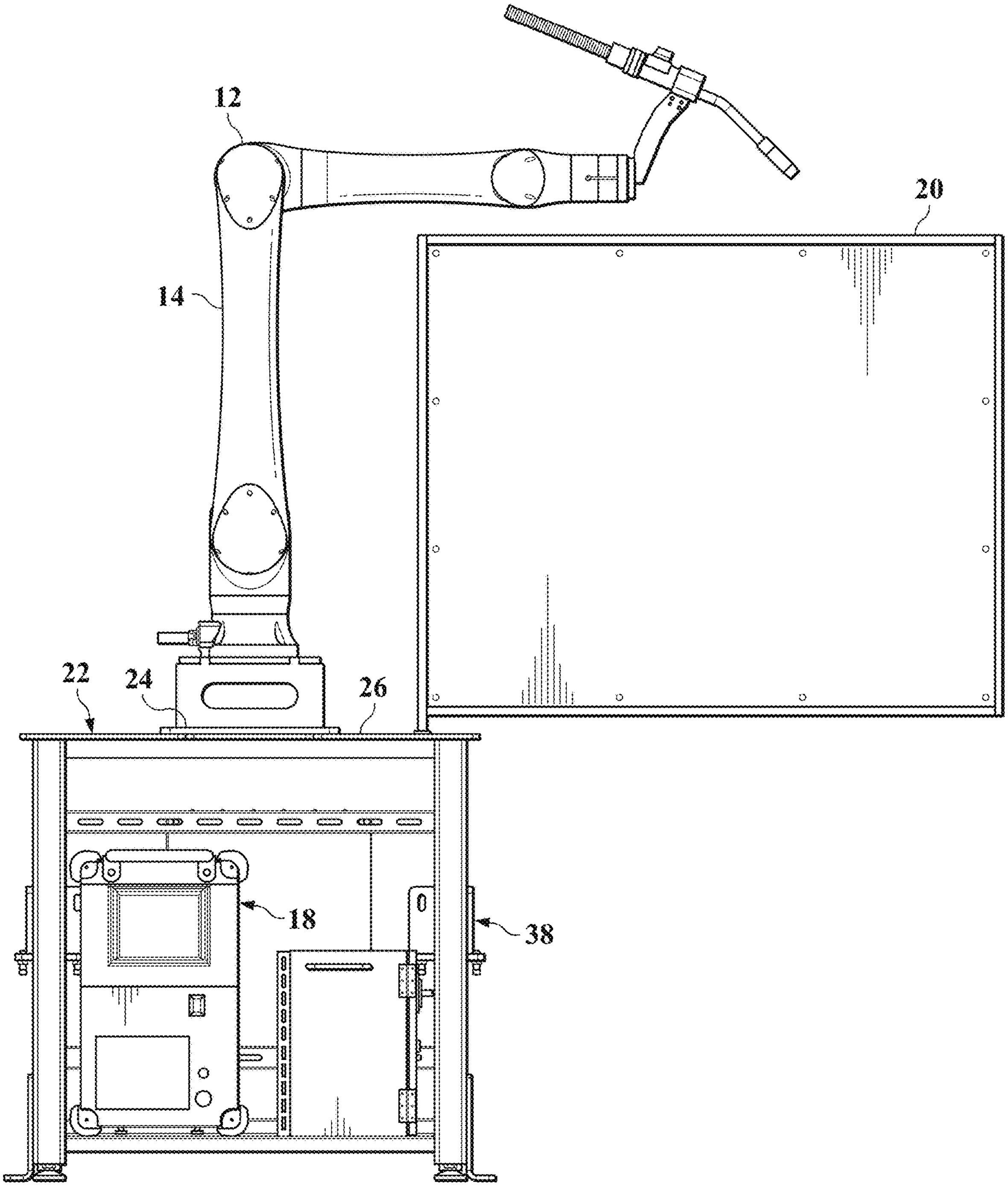
FIG. 8 (FIG. 8) is a side elevation view of the primary table, protective barriers, and cobot.
Figure 9:
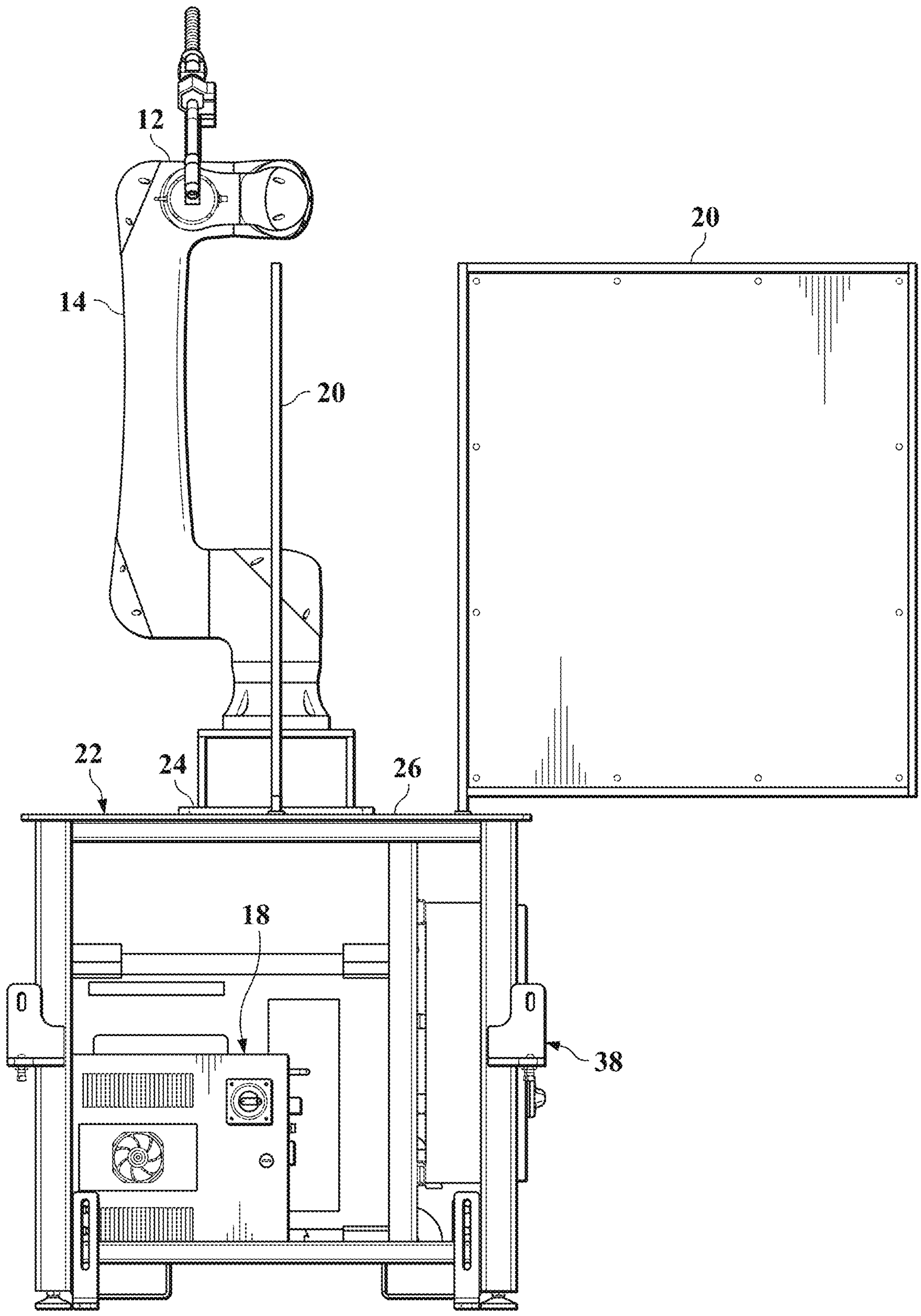
FIG. 9 (FIG. 9) is an end elevation view of the primary table, protective barriers, and cobot.
Figure 10:
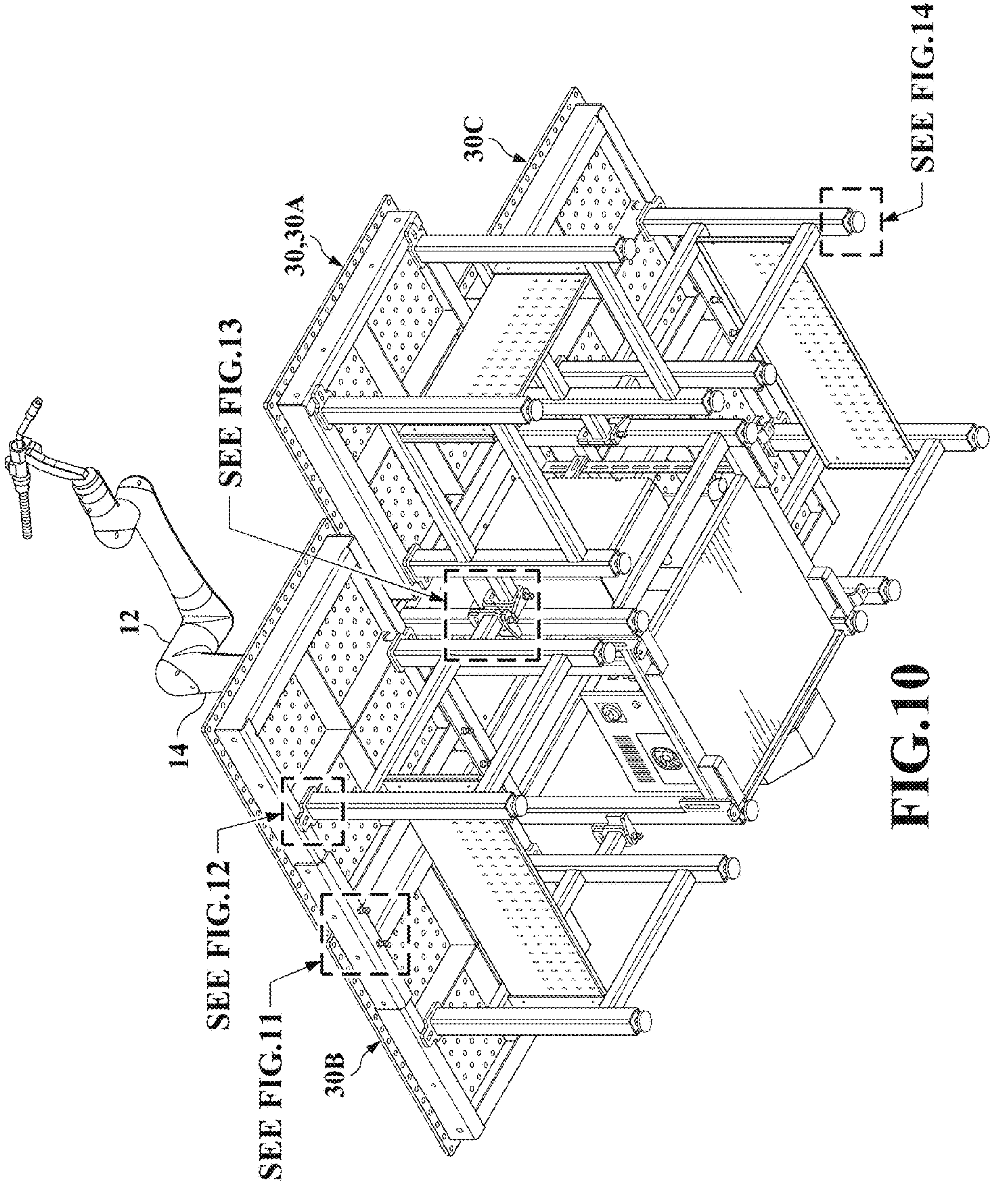
FIG. 10 (FIG. 10) is a bottom perspective view of the modular cobot system according to one exemplary embodiment of the present disclosure.

FIG. 4-FIG. 6 depict the primary table 22. Primary table 22 may have four legs 34 extending between a top end and a bottom end. The bottom end of each leg 34 may include an adjustable foot 36 that assists with leveling the tabletop 26 of table 22. Leg 34 includes a bracket 38 between the top end and the bottom end of leg 34 that assist with the modularity of system 10. In one embodiment, the bracket 38 is located approximately halfway between the top end and the bottom end of leg 34. However, the bracket may be located at any portion of the leg 34. Bracket 38 receives or interacts with a component on one or more of the secondary tables. In one embodiment, the component is a complementary bracket or plate on one of the secondary tables 30 to effectuate the connection of the secondary tables 30 to the primary table 22.

In one particular embodiment, leg 34 is a rectangular or square leg having a first flat sidewall 40 and an orthogonal second sidewall 42. Bracket 38 includes a first plate 44 and a second plate 46. The first plate 44 may be an L-shaped plate including a vertical leg and a horizontal leg. The horizontal leg is positioned below the vertical leg. The horizontal leg includes a major first surface that is rigidly connected with the first sidewall 40 of leg 34. The vertical leg extends upwardly from the horizontal leg. An aperture may extend through the vertical leg of the first plate 44. Additionally, a bottom flange 48 may be positioned below the horizontal leg of the L-shaped plate 44. The second plate 46 is configured similar to the first plate but is connected to the second sidewall 42 of leg 34. Second plate 46 is L-shaped having a horizontal leg and a vertical leg defining an aperture extending therethrough. Flange 50 may extend below the horizontal leg of the second L-shaped plate 46. Each flange 48, 50 may define a vertically aligned through aperture that receives an adjustment mechanism 52 therethrough. In one particular embodiment, the adjustment mechanism 52 is a setscrew that can vary the height of an end of the adjustment mechanism to vary the resultant height of one of the secondary tables 30 when a corresponding secondary plate 54 (e.g. a component on the secondary table 30) is abutted and connected with either the first plate 44 or second plate 46 of bracket 38.

Because the leg 34 has a rectangular or square cross-section composed of the first sidewall 40 and the second sidewall 42 being orthogonal to each other, when the first plate 44 and the second plate 46 are mounted on the respective sidewalls 40, 42, the plates 44, 46 are also orthogonal to each other. Stated otherwise, the primary surface or major surface of the L-shaped first plate 44 is approximately 90 degrees from the primary or major surface of the second L-shaped plate 46. Additionally, flange 48 extends in a transverse direction along a transverse plane having a length that is approximately 90 degrees offset or orthogonal to that of flange 50. This allows the secondary tables, such as the first secondary table 30A and the second secondary table 30B to be relatively orthogonal to each other when both are connected to the primary table 22.

Figure 11:
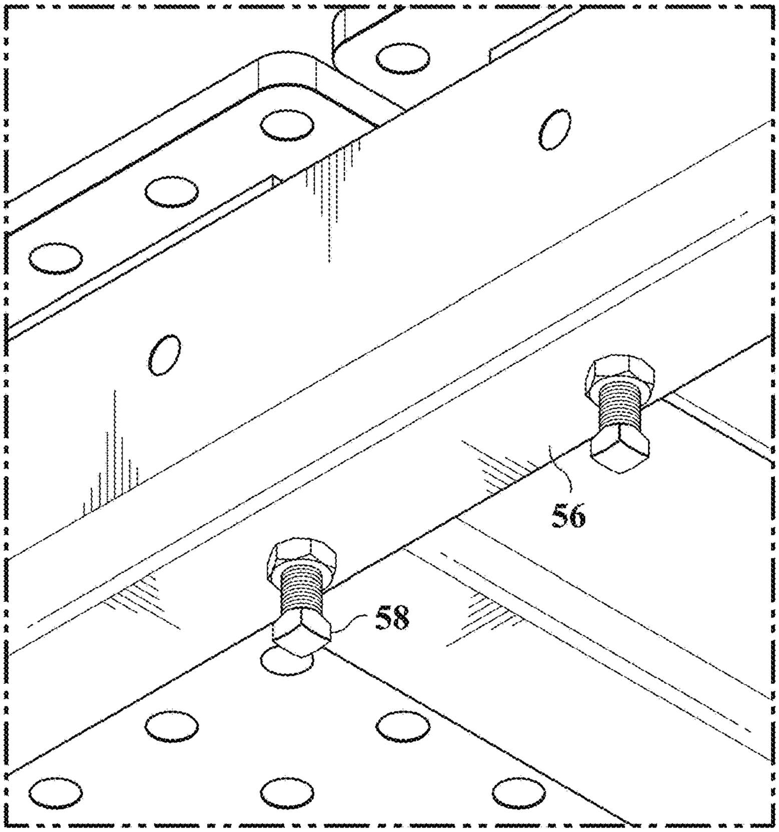
FIG. 11 (FIG. 11) is an enlarged perspective view of the region labeled as "See FIG. 11" in FIG. 10.

FIG. 11 depicts that one of the secondary tables or each of the secondary tables may include a rail 56 having an adjustment mechanism 58 connected thereto. The adjustment mechanism 58 can be utilized to adjust the level of the tabletop of the secondary table 30. In this particular embodiment, the second secondary table 30B is shown with rail 56 and the adjustment mechanism 58. However, it is to be understood that this type of adjustment mechanism 58 and rail 56 configuration can be utilized on any of the secondary tables 30. Adjustment mechanism 58 may be a setscrew that can be threaded through the rail and be in operative communication with the tabletop of the second secondary table 30B to adjust the level of the tabletop surface.

Figure 12:
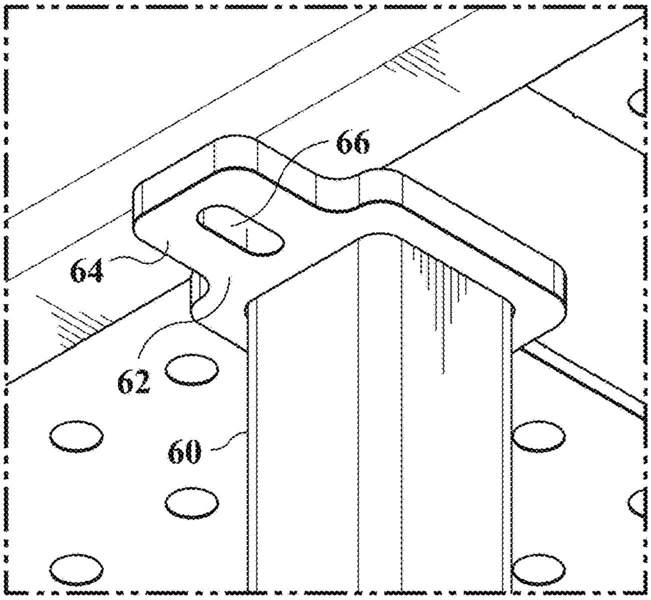
FIG. 12 (FIG. 12) is an enlarged perspective view of the region labeled as "See FIG. 12" in FIG. 10.

FIG. 12 depicts that each secondary table is supported by leg 60 having a flange 62 at the top end of legs 60. Flange 62 may compose an elongated lug 64 that generally defines a projecting ear that is rectangular in cross-section having an aperture 66 extending vertically therethrough. Flange 62 may support rail 56 or may directly support the tabletop of the secondary table 30.

Figure 13:
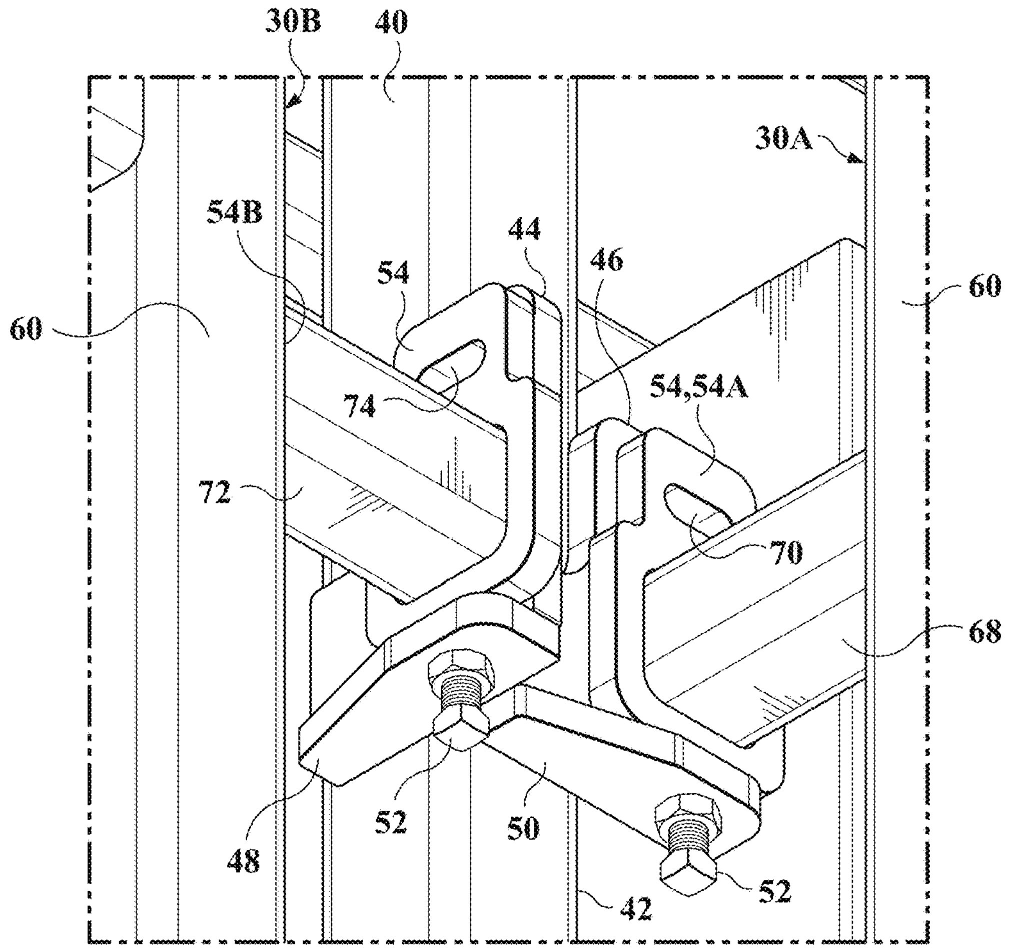
FIG. 13 (FIG. 13) is an enlarged perspective view of the region labeled as "See FIG. 13" in FIG. 10.

FIG. 13 depicts that the plate 54 on a respective secondary table is configured to mate, abut, or directly connect with either first plate 44 or second plate 46. Particularly, plate 54A is positioned at the end of a member 68 extending horizontally from one of the legs 60 of first secondary table 30A. Plate 54A has a vertically aligned length that is orthogonal to the horizontally aligned length of member 68. The upper end of plate 54A includes a vertically extending lug defining an aperture 70 that aligns with the aperture in the vertical leg of second plate 46. A screw or other mechanical connector can be inserted through the aligned apertures in plate 54A and second plate 46 to connect the first secondary table 30A to the primary table 22. The lower end of plate 54A rests upon flange 50 and can be adjusted up and down via rotational movement of the adjustment mechanism 52 extending through flange 50.

In a similar regard, plate 54B is orthogonally connected with member 72 on one of the legs 60 of second secondary table 30B. Plate 54B includes and aperture 74 extending through the plate 54B near the top end formed in a lug projecting vertically upward therefrom. The aperture 74 aligns with the aperture in the first plate 44 and enables a connector to be inserted there through to directly connect the second secondary table 30B with the primary table 22. The lower end of plate 54B rest upon flange 48 and may be adjusted up and down via rotational action of the adjustment mechanism 52.

Figure 14:
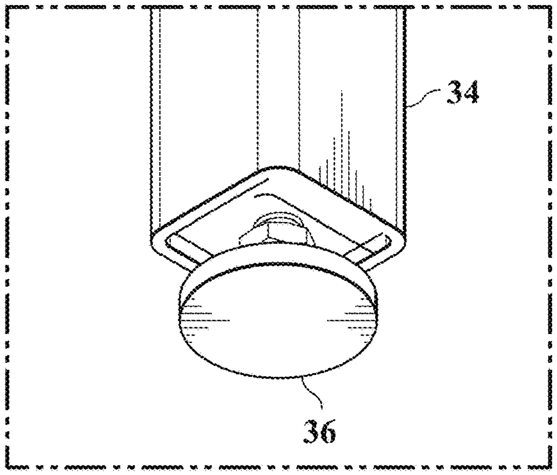
FIG. 14 (FIG. 14) is an enlarged perspective view of the region labeled as "See FIG. 14" in FIG. 10.

FIG. 14 is an enlarged view depicting the adjustable foot 36 at the lower end of leg 34 of the primary table 22. The adjustable foot 36 may be threadably inserted into the lower end of leg 34 and may be rotatable or threaded in a manner that allows the foot 36 to adjust the height of the leg 34, which results in an adjustment of the height of the tabletop 26 of primary table 22 based on the rotational or threaded position of the adjustable foot 36.

Figure 15:
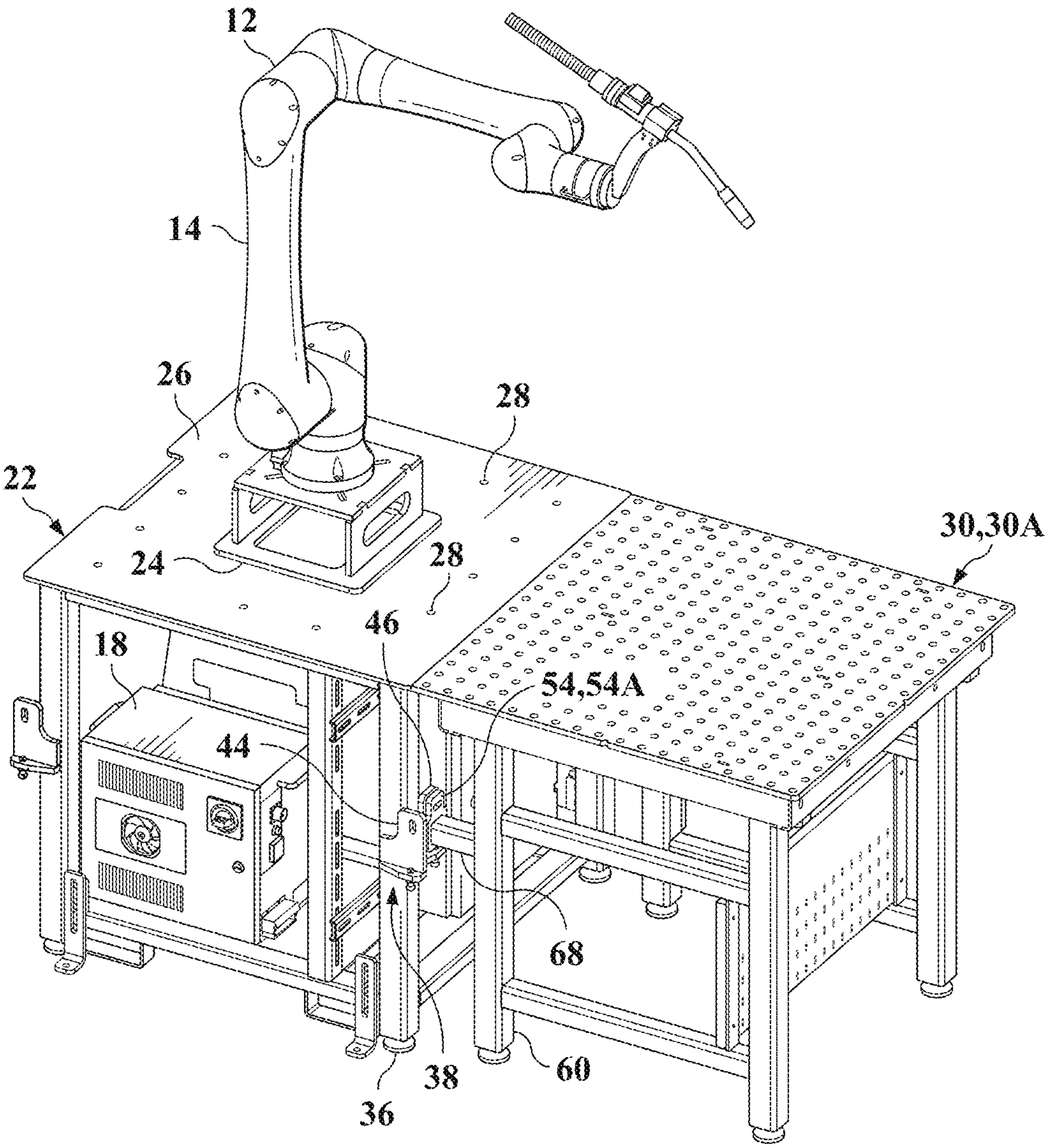
FIG. 15 (FIG. 15) is a perspective view of the modular cobot system having only one secondary table connected to the primary table.

FIG. 15 depicts an embodiment in which only one of the secondary tables 30 is connected with the table 22 supporting cobot 12 to establish the collective workspace area. In the shown embodiment the first secondary table 30A is connected with the primary table 22 via bracket 38. First secondary table 30A positioned off to one side of the primary table 22 and is aligned in a manner such that the plate 54A on the secondary table mates with the second plate 46 of bracket 38. The aligned apertures in plate 54A and plate 46 can be utilized to connect the connector therethrough to secure the first secondary table 30A to the primary table 22.

Figure 16:
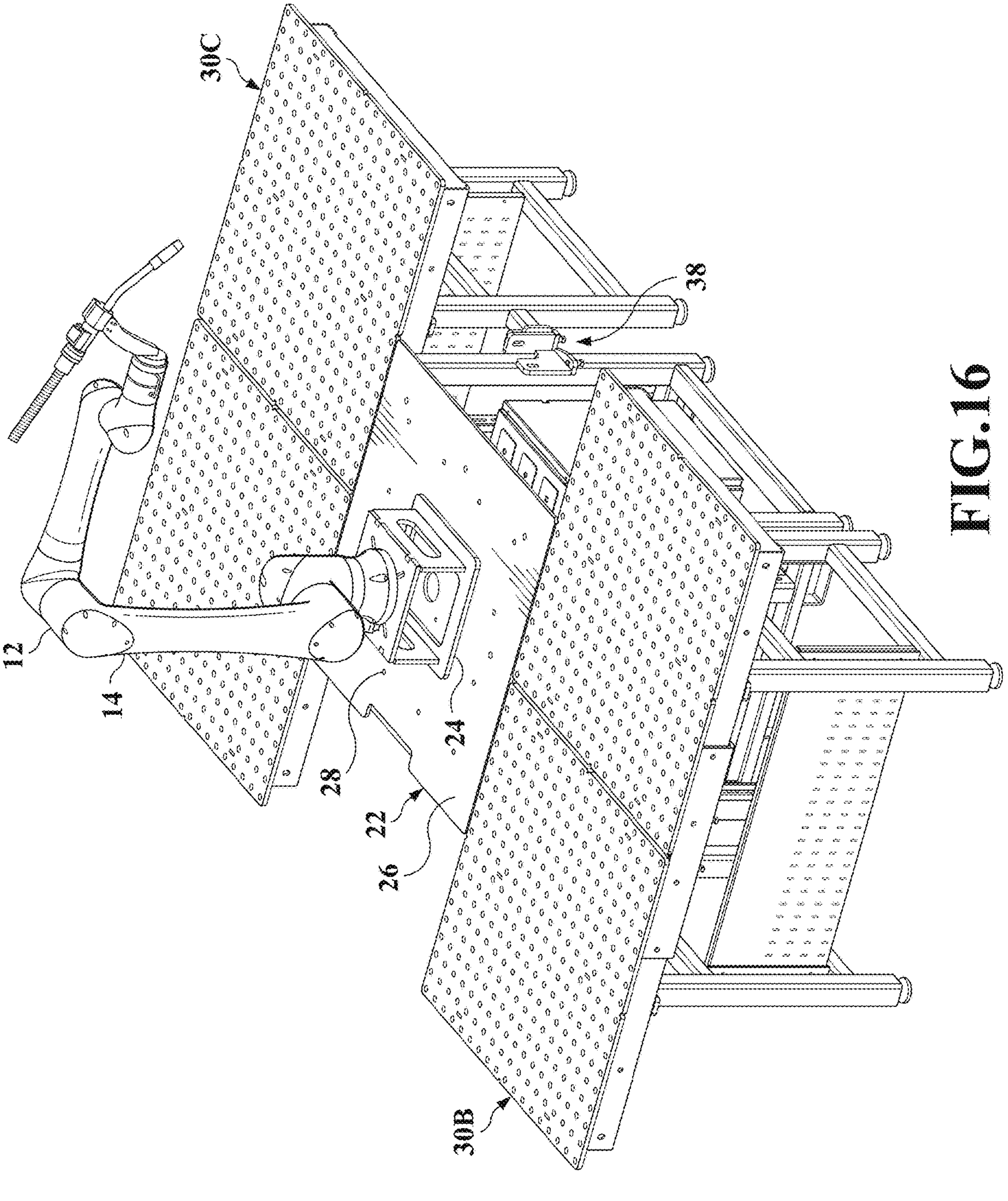
FIG. 16 (FIG. 16) is a perspective view of the modular cobot system having two secondary tables connected to the primary table.

FIG. 16 depicts an alternative arrangement in which the second secondary table 30B and the third secondary table 30C are connected to primary table 22 to define the collective workspace area. The first primary table 30A is absent from the configuration shown in FIG. 16. The secondary tables 30B, 30C are connected to the primary table 22 via brackets 38 on each respective leg 34 of the primary table 22.

Figure 17:
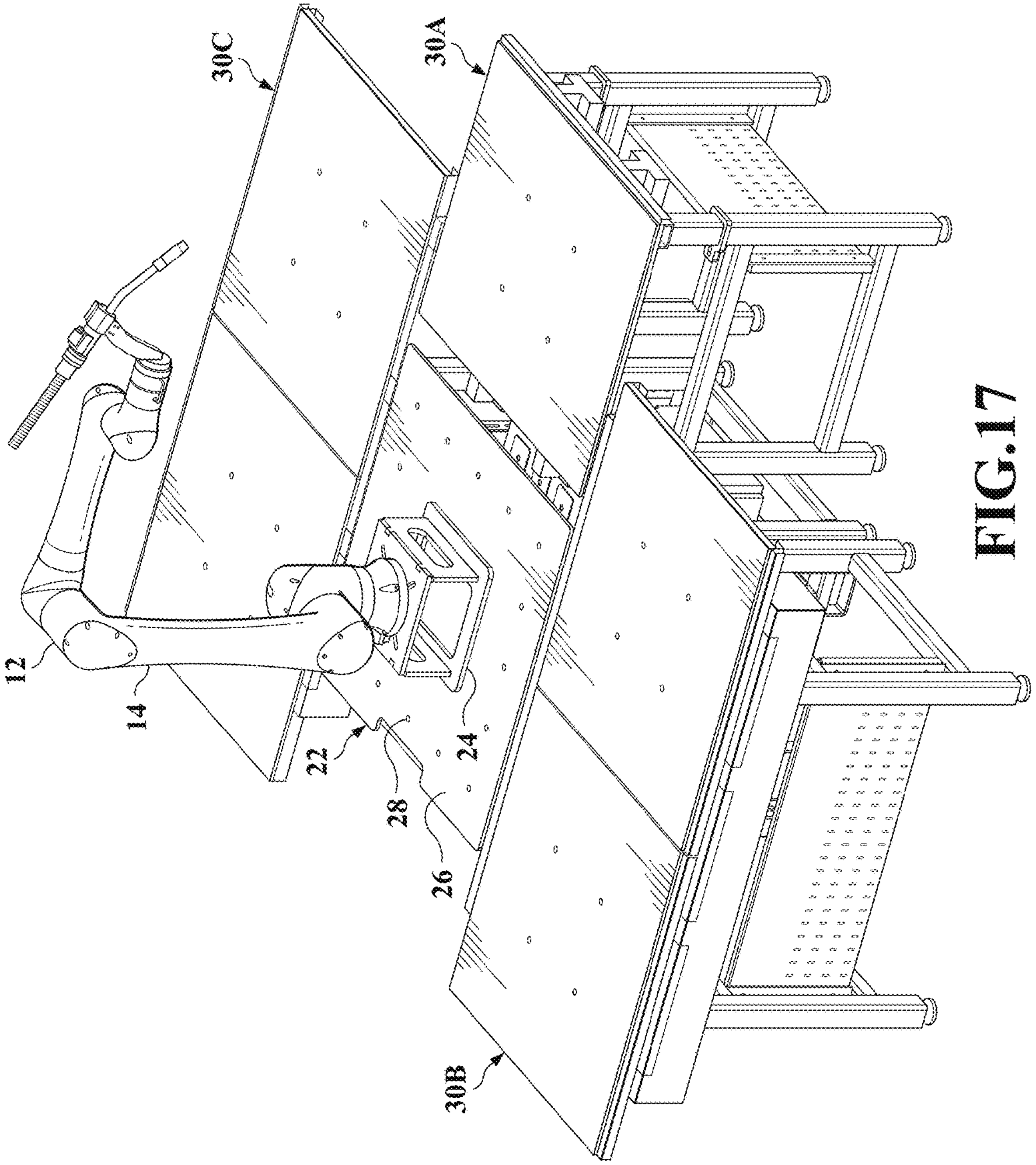
FIG. 17 (FIG. 17) is a perspective view of the modular cobot system having three flattop secondary tables connected to the primary table.

FIG. 17 depicts an alternative arrangement in which the secondary tables that are connected to the primary table 22 have a generally flattop configuration. The flattop configuration of secondary tables 30 may have fewer apertures than the full aperture grid shown in FIG. 17. This results in a generally flattop surface with a minimal amount of apertures that can be utilized to connect the clamp or other jig to define the overall welding surface from the modular design of system 10.

Figure 18:
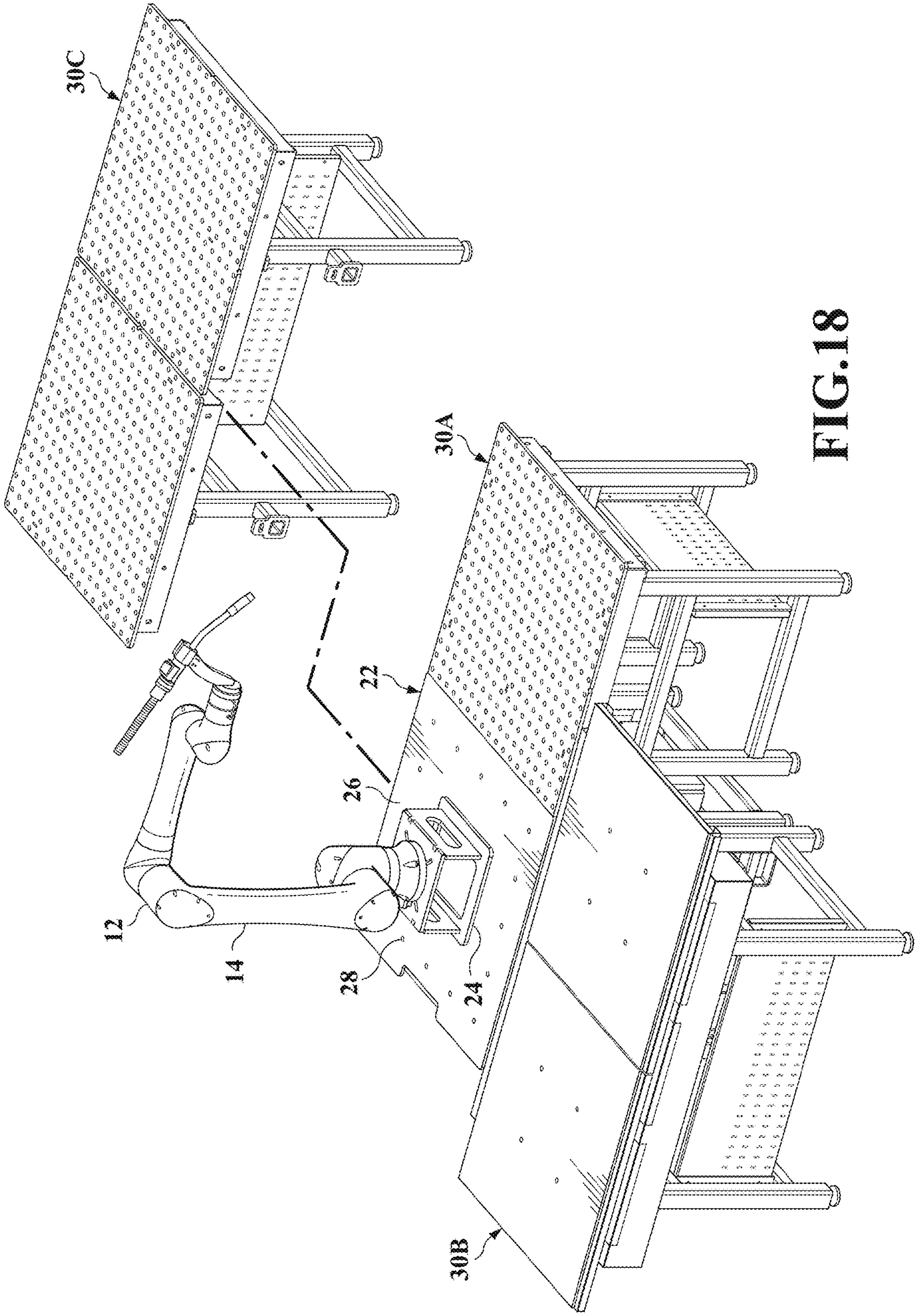
FIG. 18 (FIG. 18) is a perspective view of the modular cobot system having different types of secondary tables connected to the primary table.

FIG. 18 depicts an alternative configuration where some of the secondary tables utilized a pegboard style (e.g., full grid) tabletop and some of the secondary tables use a generally flattop configuration. For example, as depicted in FIG. 18 the first secondary table 30A and the third secondary table 30C have a pegboard style tabletop configuration and the second secondary table 30B has a generally flattop configuration.

Figure 19:
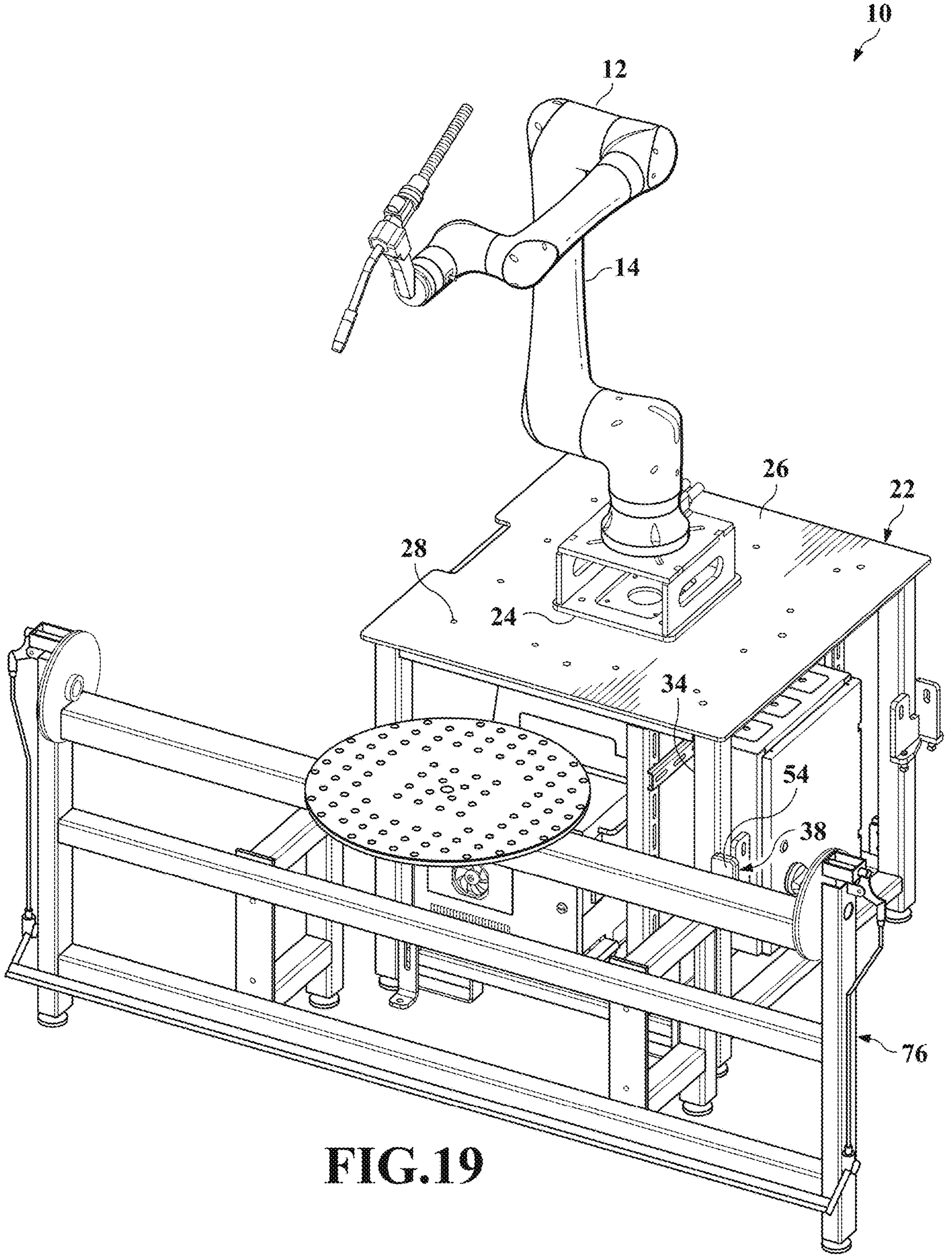
FIG. 19 (FIG. 19) is a perspective view of the modular cobot system having a different modular workspace item connected to the primary table.

FIG. 19 depicts an alternative embodiment of the present disclosure in which system 10 utilizes a secondary object 76 to connect with the primary table 22. The secondary object 76 may be any type of structural component utilized in the cobot welding process that otherwise comprised a similar flange to connect with bracket 38 on one of the legs 34 of primary table 22. For example, secondary object 76 has a plate 54 that mates or joins or unions (e.g., contacts) with the first plate 44 of bracket 38 that has a frame or frame work comprising a circular tabletop comprising a plurality of holes extending there through. Further, the framework could be adjustable relative to a rotational axis to provide more flexibility and adjustability for the resultant workpiece that is to be welded by cobot 12.

In the tabletop of either table 22 or secondary table 30 may define an elongated channel. In one embodiment, the channel may be V-shaped. The V-shaped channel creates more surface contact for better alignment of a clamp for a workpiece. The V-shaped channel should reduce the risk of error caused by a potential misaligned platen or fixture plate. In one embodiment, the tabletop may have a void or aperture that is cut away or removed under the V-shaped channel to eliminate any collection of debris or splatter that could cause a potential misalignment. The V-shaped channel permits the platen or fixture plate to move, translate or travels on a continuous plane, or strip of steel as it slides into position. Additionally, there may be alignment indices, such as arrows, in the tabletop of either table 22 or secondary table 30 that are cut into the platen, tabletop or fixture plate for highly visible and easy alignment when changing fixtures. These indices may be optically observed and detected by the vision system on cobot 12.

FIG. 20 through FIG. 33B depict another exemplary embodiment of a cobot welding table or cobot welding system 210. Throughout FIG. 20-FIG. 33B, this other exemplary embodiment depicts a cobot welding table 222 comprising a table frame having downwardly extending legs 34. There may be at least one modular connector 238 on the table frame, wherein the modular connector 238 is a generally flat and planar member, such as a plate having a unique configuration, that extends in a vertical direction, wherein the modular connector has an upper end connected to one leg 34 of the table frame, a lower end connected that same leg 34 of the table frame, and a central portion that is offset from the leg 34, wherein the central portion defines an aperture that extends transversely, fully through the modular connector.

Table 222 may include a welding fixture support assembly 300 positioned atop the table frame to support a welding fixture 302. Welding fixtures, such as fixture 302, are beneficial tools in manufacturing, ensuring the precise alignment and stability of workpieces during welding operations, especially cobot welding operations. They are useful for achieving high-quality welds and enhancing productivity. Welding fixtures are typically shaped as plates with an array of jigs or plates attached to their top surfaces. These jigs and plates, often adjustable, hold the workpiece securely, preventing movement and ensuring alignment. The fixture plate itself is robust rigid member, capable of withstanding the stresses of welding. The welding fixture is supported by a welding table, such as table 222, which provides a stable and level surface. This connection allows easy access to the workpiece from multiple angles, facilitating complex welding operations. Welding tables often feature grid patterns or perforations, enabling the flexible attachment of various fixtures. One of the advantageous features of welding fixtures, such as fixture 302, is their adaptability. They can be configured with a variety of jigs, clamps, and plates, depending on the specific welding task. This flexibility allows manufacturers to customize the fixture setup to accommodate different shapes, sizes, and types of workpieces. Welding fixtures are used in various applications, from simple tasks like welding small brackets to complex projects such as assembling large structures.

The fixture support assembly 300 may include a pair of opposing, spaced apart lateral supports 304 that are elongated to extend in a lateral first direction and a pair of opposing, spaced longitudinal supports 306 that are elongated to extend in a longitudinal second direction that is perpendicular to the first direction. There may be a first rail 308 and a second rail 310 between a first longitudinal support and a second longitudinal support, wherein the first longitudinal support and the second longitudinal support collectively define the pair of longitudinal supports 306. In one embodiment, the first rail 308 and the second rail 310 are at least as long as the pair of longitudinal supports 306. The first rail 308 has a first end 308A and a second end 308B. The second rail 310 has a first end 310A and a second end 310B. The first rail 308 has an upwardly facing top surface 309 and the second rail 310 has an upwardly facing top surface 311. In one particular embodiment, the second rail 310 is configured the same as the first rail 308, and as such, reference numerals and descriptions may not be repeated for brevity however it is to be understood that the components described with respect to first rail 308 are also present on second rail 310.

There may be a first latch plate 312 adjacent the first end 308A of the first rail 308. An alignment indicator 314, which may be formed as an arrow, may be centered above the first latch plate 312. Alignment indicator 314 is configured to align with a corresponding indicator 315 on the fixture 302, wherein when indicators 314, 315 are aligned the fixture 302 will be aligned above the rails 308, 310 so that the fixture can be secured to the fixture support assembly 300. A first latch 316 may be adjacent the first end 308A of the first rail 308 and adjacent the first latch plate 312. There may be a first clamp hook 318 at the second end 308B of the first rail 308. The first clamp hook 318 is shaped to fit within a first V-shaped slot 320 formed below or in the bottom of the fixture 302 that is to be supported by and engaged with the fixture support assembly 300 via the first clamp hook 318, wherein the first V-shaped slot 320 tapers at an angle less than about 45 degrees, and a contact area at where the first clamp hook contacts a sidewall of the first V-shaped slot has a length greater than ¾ inch. A second V-shaped slot 322, which is located at the opposing end of the fixture 302 engages the latch 316.

On the other side of the system 210, a second latch plate 324 is adjacent the first end 310A of the second rail 310. Another alignment indicator 314 may be centered relative to the second latch plate 324. The another alignment indicator 314 is configured to align with a corresponding another indicator 315 on the fixture 302, wherein when indicators 314, 315 are aligned the fixture 302 will be aligned above the rails so that the fixture can be secured to the fixture support assembly 300. There is a second latch 326 adjacent the first end 310A of the second rail 310 and adjacent the second latch plate 324. A second clamp hook 328 is at the second end 310B of the second rail 310, wherein the second clamp hook 328 is shaped to fit within another V-shaped slot 330 formed below or in the bottom of the fixture 302 that is to be supported by and engaged with the fixture support assembly 300 via the second clamp hook 328, wherein the V-shaped 330 is formed the same as slot 320 and tapers at an angle less than about 45 degrees, and a contact area at where the second clamp hook contacts a sidewall of the V-shaped slot 330 has a length greater than ¾ inch. Another slot 332 at the other end of fixture 302 engages the second latch 326.

There may be a first biasing member 334 in operative communication with the first clamp hook 318, wherein the first biasing 471 member moves the first clamp hook 318 between a clamped position and an unclamped position, wherein the first biasing member is located between the first longitudinal support and the second longitudinal support, and is below the top surface 350. In one embodiment the first biasing member 334 is a torsion spring. There may also be a second biasing member (not shown, but arranged in a similar manner as the first biasing member 471) in operative communication with the second clamp hook 328, wherein the second biasing member moves the second clamp hook 328 between a clamped position and an unclamped position, wherein the second biasing member is located between the first longitudinal support and the second longitudinal support, and wherein the second biasing member is a torsion spring.

There may be a first cutout 336 may be defined adjacent the first end 308A of the first rail 308, wherein the first cutout 336 is adapted to prevent interference of weld spatter during cobot welding operation. Similarly, a second cutout may be defined as adjacent to the first end of the second rail, wherein the second cutout is adapted to prevent interference of weld spatter during cobot welding operation.

Having thus described an exemplary configuration of system 210, reference is now made to components and configurations of system 210 with reference to particular figures.

Figure 20:
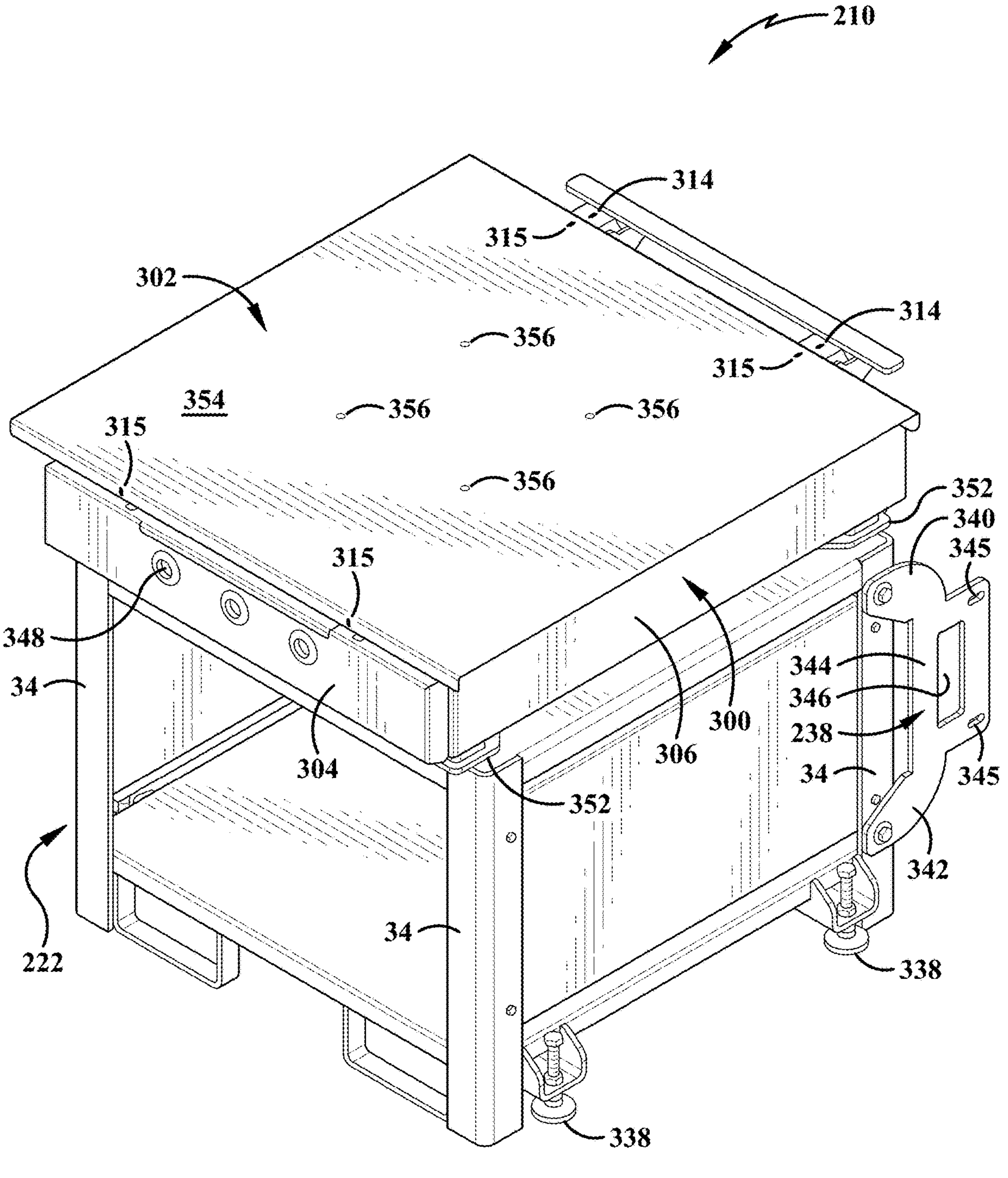
FIG. 20 (FIG. 20) is a top, front perspective view of another exemplary embodiment of a modular cobot system with a fixture support assembly that effectuates a quick change weld table.
Figure 21:
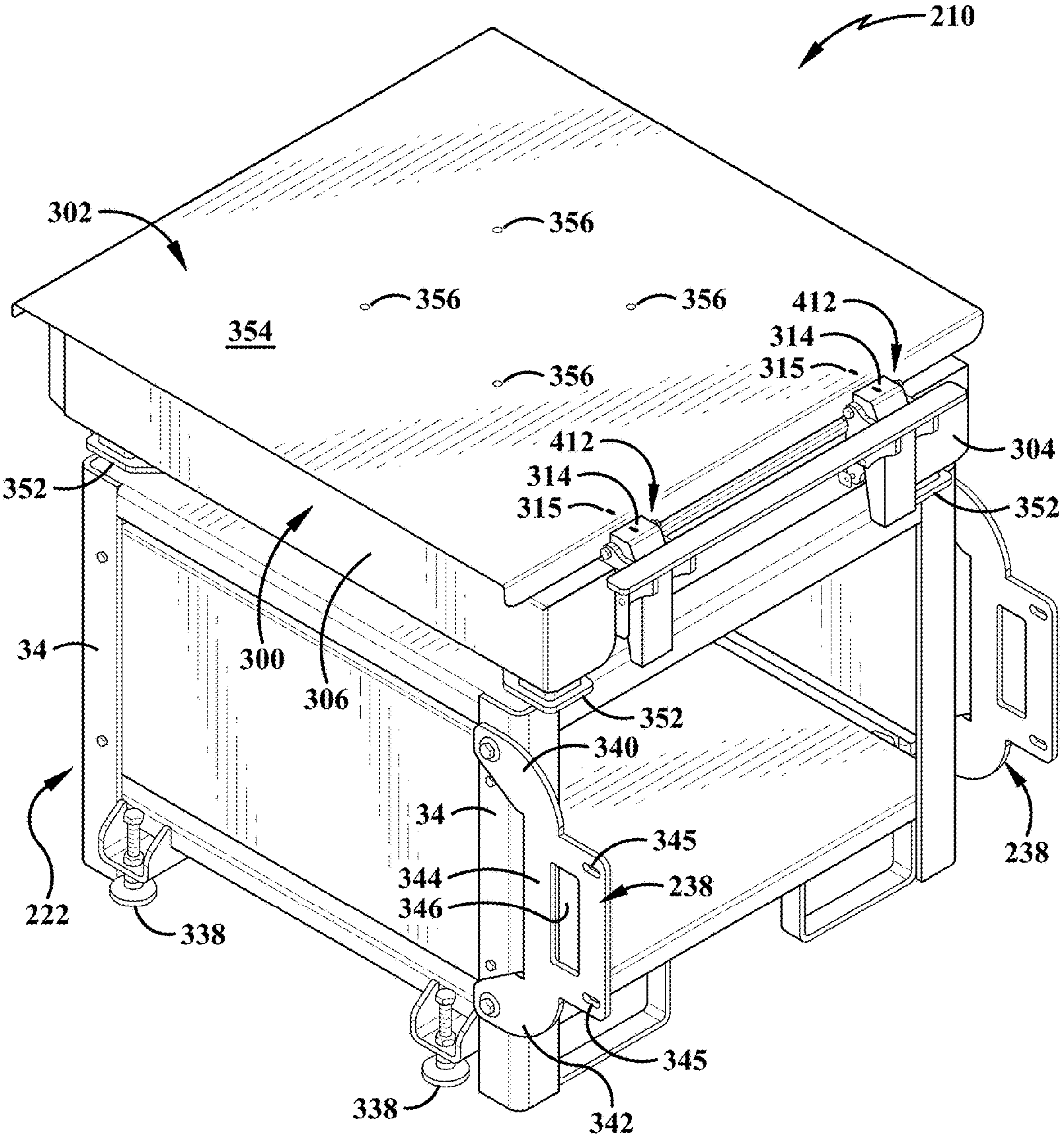
FIG. 21 (FIG. 21) is a top, rear perspective view the modular cobot system with the fixture support assembly shown in FIG. 20.

FIG. 20 and FIG. 21 depict the table 222 of the cobot system 210 as having downwardly extending legs 34. In this particular embodiment, there are four downwardly extending legs 34 each at a respective corner of the table 222. Although four legs 34 are shown, it is to be understood that other embodiments of the table 222 could have any number of legs to meet the application specific needs of the cobot system 210. Adjacent the lower end of each of the legs 34 may be adjustable feet 338 that are in operative communication with a threaded member and a threaded receiver that allow the feet 338 to be screwed into a lower portion of the table either on the legs 34 or adjacent the legs as shown in FIG. 20 and FIG. 21. The threading of the feet 338 relative to the threaded receiver enable the feet to be adjusted along a vertical axis in response to rotational movement of the feet 338.

With continued reference to FIG. 20 and FIG. 21, it is seen that the table 222 is part of a modular cobot system that would allow table 222 to be connected to other secondary tables (such as those described above in FIGS. 1-19) within the cobot system via the modular connector 238. The modular connector 238 is coupled to one of the legs 34. Modular connector 238 may include an upper end 340 and a lower end 342. The upper end 340 is rigidly connected to the leg 34 and the lower end 342 is rigidly connected to the leg 34 below the upper end 340. A central portion 344 of the modular connector 238 is offset and spaced apart from the leg 34. The central portion 344 defines an aperture 346 that extends transversely through the body of the modular connector 238. Thus, it can be seen that the modular connector 238 has a general C-shaped configuration. The aperture 346 is elongated in the vertical direction and is generally rectangular in shape.

With continued reference to FIG. 20 and FIG. 21, the table 222 supports the fixture assembly 300 on the top thereof. As mentioned previously, the fixture support assembly 300 includes the pair of lateral supports 304 and the pair of longitudinal supports 306 that are oriented perpendicular to each other to define a generally rectangular configuration similar to that of the table 222. One of the lateral supports 304 may include a plurality of apertures or ports that serve operational or functional purposes of the cobot system 210 during a welding operation. For example, there may be a safety kill switch 348 in the lateral sidewall of one of the lateral supports 304, preferably the frontal lateral sidewall, wherein the safety kill switch 348 is a push button type switch.

With continued reference to the modular connector 238, the modular connector 238 is configured to be shaped complimentary to other modular connectors 238 in the overall cobot system 210 to allow the table 222 to connect with secondary tables having a similar modular connector 238. As such, one surface of the modular connector may be a generally planar surface having the configuration shown in FIG. 20 and FIG. 21 that allows the modular connector to abut with a similarly shaped modular connector on a secondary table. Various connectors, such as bolts or screws, could be inserted through holes in the central portion 344 of the body, such as the screw holes 345, that would allow table 222 to modularly connect with a secondary table positioned adjacent table 222.

Figure 22:
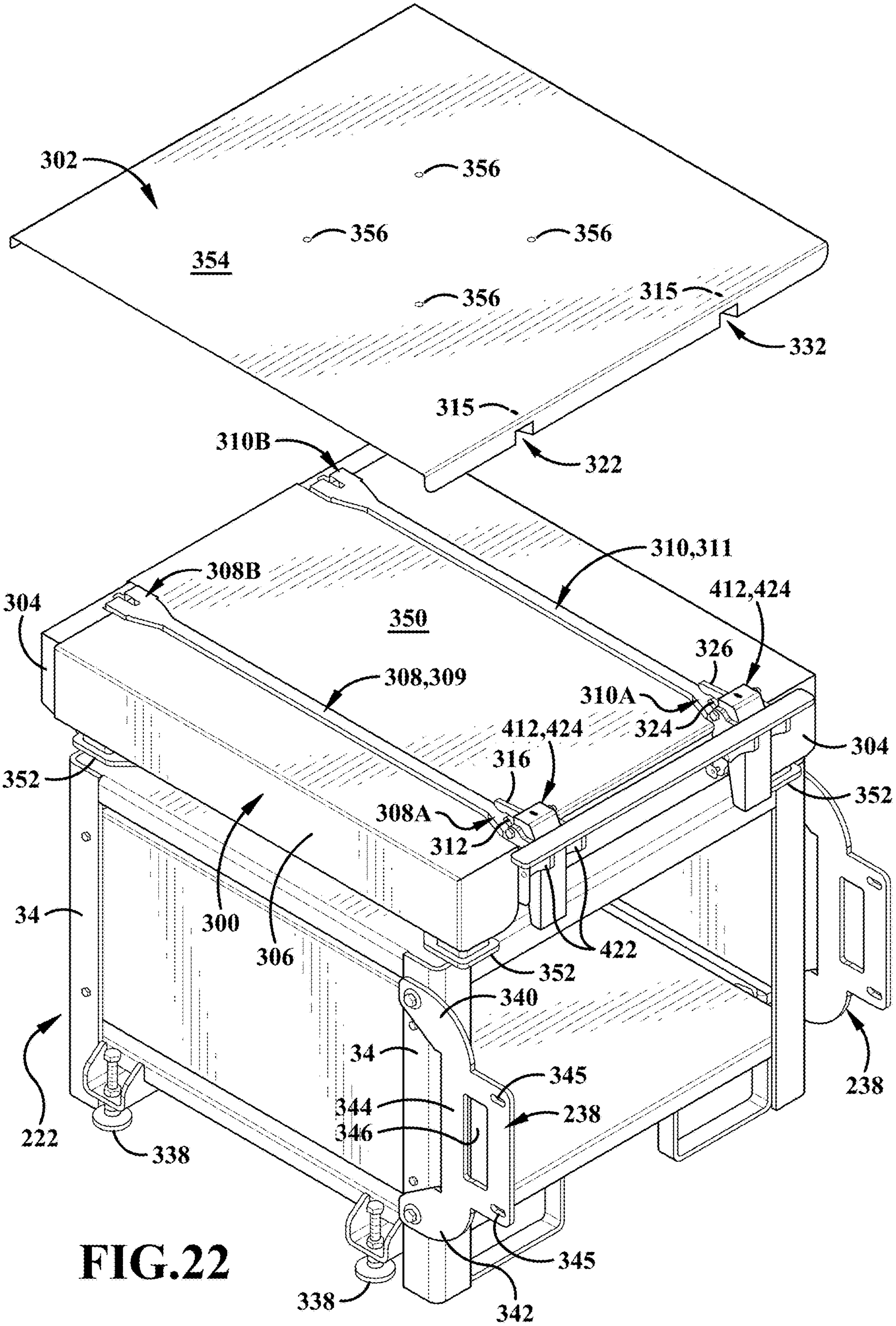
FIG. 22 (FIG. 22) is an exploded top, rear perspective view the modular cobot system with the fixture support assembly shown in FIG. 21.

FIG. 22 depicts that the fixture support assembly 300 includes a top surface 350 that is rigidly connected to the pair of lateral supports 304 and the pair of longitudinal supports 306. The fixture support assembly 300 has downwardly extending bottom supports 352 that extend below the pair of longitudinal supports 306 and the lateral supports 304 to rest atop the framework of the table frame and are positioned above the modular connectors 238. The fixture support assembly 300 is supported by these lower supports 352 in order to support the fixture 302, which is shown exploded from the fixture support assembly 300 in FIG. 22. The first rail 308 and the second rail 310 extend longitudinally across the top surface 350 of the fixture support assembly 300. In one particularly embodiment, the top surface 309 of the first rail 308, the top surface 311 of the second rail 310 and top surface 350 of the fixture support assembly 300 are coplanar along one common horizontal plane. In the shown embodiment, the first rail 308 and the second rail 310 are spaced apart and generally parallel to each other extending from their respective first and second ends between the pair of longitudinal supports 306. In one particular embodiment, the length of each respective rail 308, 310 extends the full length of the fixture support assembly 300 between the pair of lateral supports 304.

As mentioned previously, each rail 308, 310 has a latch or latch assembly located adjacent the first end of the rail and a clamp or clamp hook located adjacent the second end of each respective rail. The description and functionality of which will be detailed further herein. The rails 308, 310, along with the top surface 350 of the fixture support assembly 300 are configured to support the fixture 302 that rests atop and is supported from below by the fixture support assembly 300.

As shown in FIG. 22, the fixture 302 includes a top surface 354 that may include a plurality of vertically extending apertures 356 that are configured to retain a jig or an item that is to be welded by the cobot.

Figure 23:
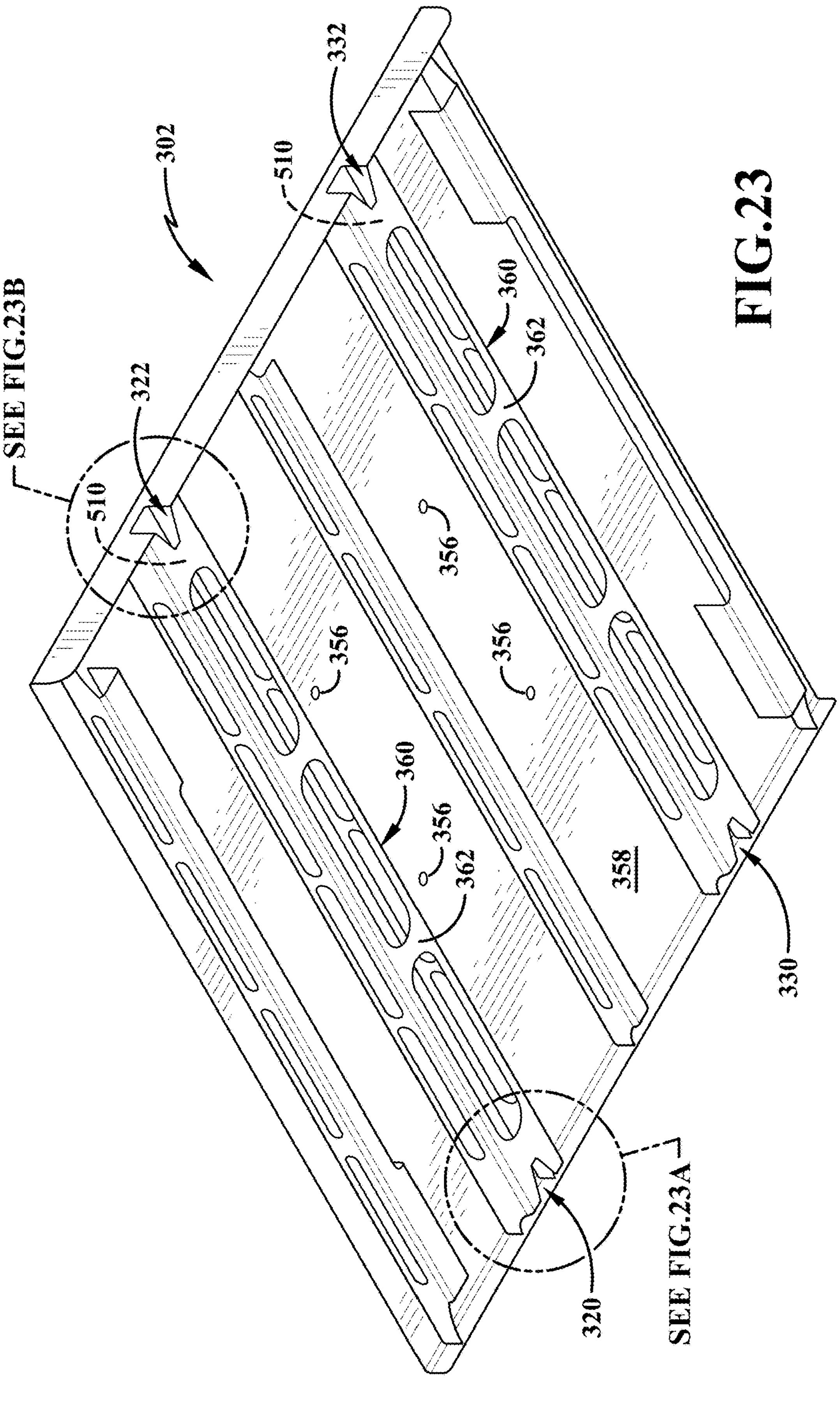
FIG. 23 (FIG. 23) is a bottom perspective view of the fixture support assembly.
Figure 23A:
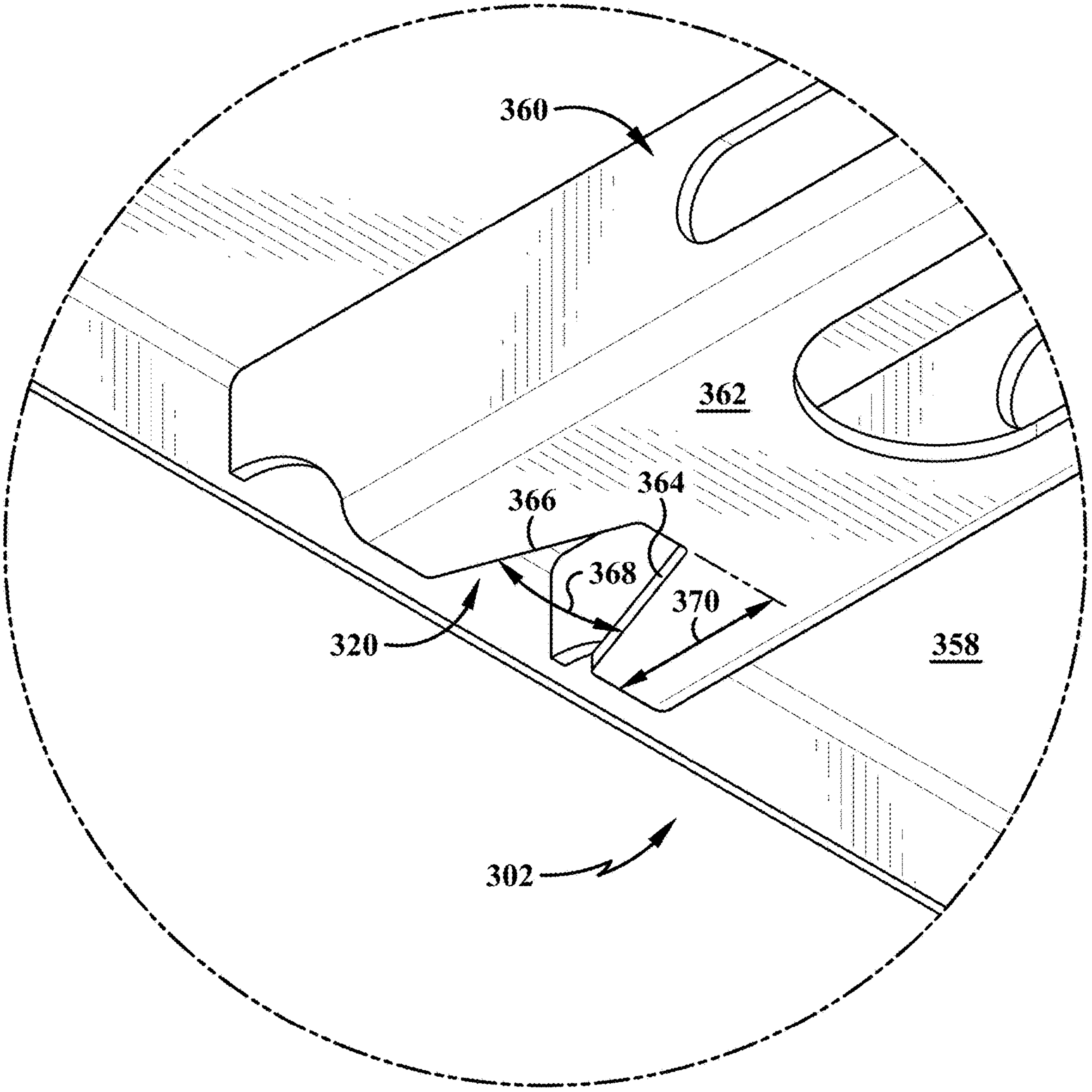
FIG. 23A (FIG. 23A) is an enlarged bottom perspective view of the fixture support assembly depicting the region labeled "SEE FIG. 23A" in FIG. 23.
Figure 23B:
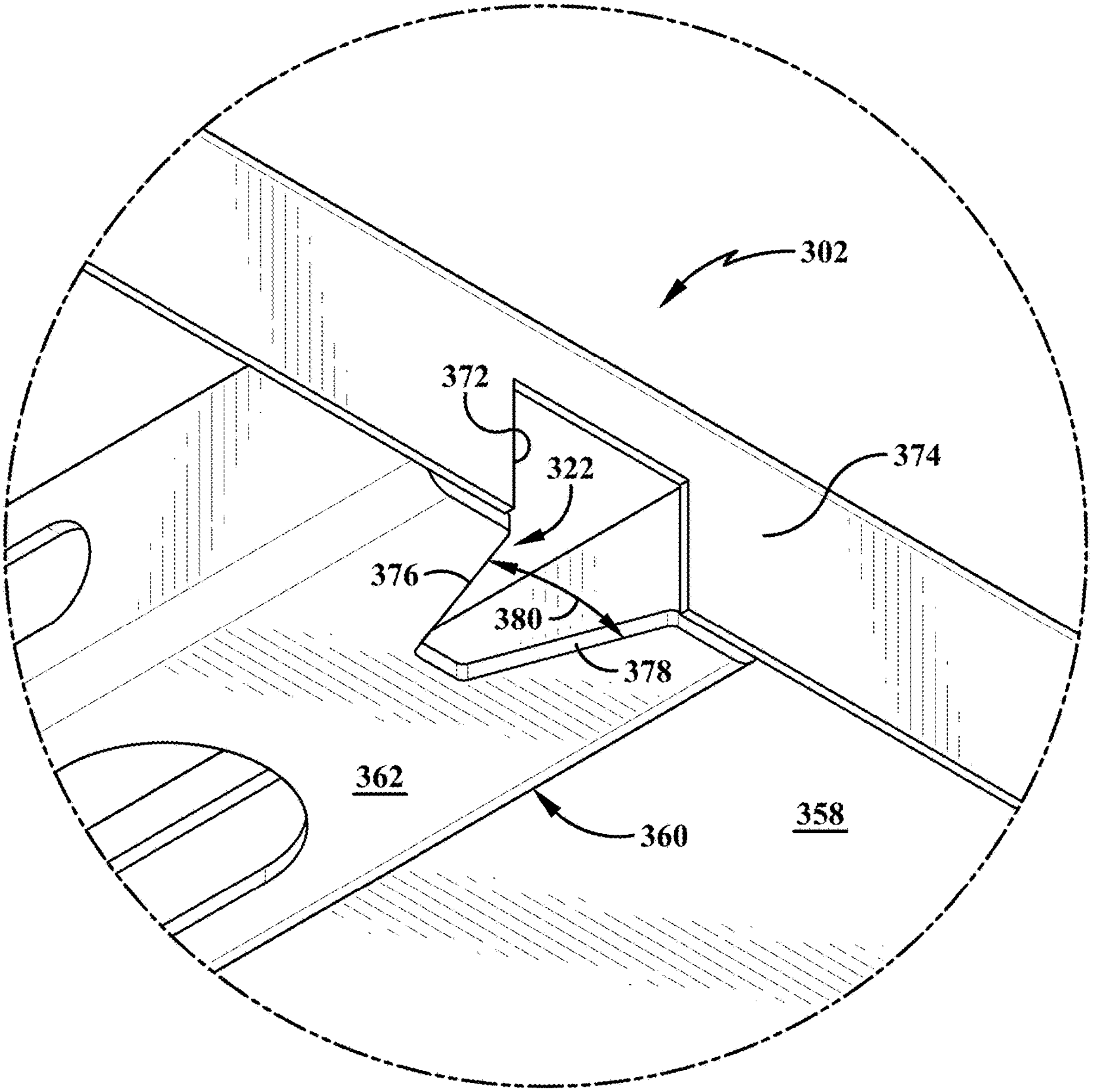
FIG. 23B (FIG. 23B) is an enlarged bottom perspective view of the fixture support assembly depicting the region labeled "SEE FIG. 23B" in FIG. 23.

FIG. 23, FIG. 23A and FIG. 23B depict the underside of the fixture 302. The fixture 302 includes a bottom surface 358. The bottom surface may have a plurality of connected longitudinally extending support members 360 that extend fully end to end on the bottom surface 358. The support members 360 may either be integrally formed with the fixture 302 or may be rigidly attached to the bottom surface 358. In the shown embodiment there are at least two lower supports 360 wherein the first lower support defines notches 320, 322 and the second lower support defines notches 330, 332. It is to be understood that the lower supports 360 are identical to each other in the particular configuration shown in FIG. 23. However, it is to be understood that the lower support 360 could have differing configurations should that meet the application specific needs of the fixture 302.

As shown in FIG. 23A, the lower support 360 includes a lower surface 362 that extends from a first end of the lower support 360 to a second end. Notch 320 is formed at one end, such as the first end, of the lower support 360 in the lower surface 362. The notch 320 includes a first side edge 364 and second side edge 366. The edges 364, 366 are straight edges that are angled towards each other in a tapering manner to define an angle 368 therebetween. In one particular embodiment, the angle 368 at which the edges 364, 366 are oriented is less than about 45 degrees. In one particular embodiment, the angle 368 is equal to about 40 degrees. When angle 368 is equal to about 40 degrees the length 370 of each edge 364, 366 is in a range from about 1 inch to about 2 inches. In one particular embodiment, the length 370 of each side edge 364, 366 that defines the notch 320 is approximately 1.25 inches. The edges 364, 366 define the contact area that will engage the clamp hook 318 and define a contact area between the exterior surface of the clamp hook 318 and the notch 320. By having a contact area between the edges 364, 366 and the clamp hook 318 being greater than at least one inch, the fixture support assembly 300 is able to better secure the fixture 302 in position for a welding operation. This provides a marked improvement over previous technologies that may have utilized shorter contact or areas during clamping operations, wherein those shorter areas may have been established by a tapering angle of the respective sidewalls greater than 45 degrees.

FIG. 23B depicts the notch 322 that will engage the latch 316 on the fixture support assembly 300. The notch 322 is aligned with a cutout 372 that is defined in a downwardly extending flange 374 on the fixture 302. The notch 322 is defined by a first side edge 376 and a second side edge 378 that are linear straight edges oriented at a tapered angle 380 relative to each other. In one particular embodiment, the angle 380 is equal to angle 368 that defines the notch 320 at the first end or the opposite end of the lower support 360. The sides edges 376, 378 are configured to engage and establish a contact area with the latch or latch arm 316 defined at the first end of the first rail 308. The contact area of sides edges 376, 378 may have the same dimensions as edges 364, 366.

Figure 24:
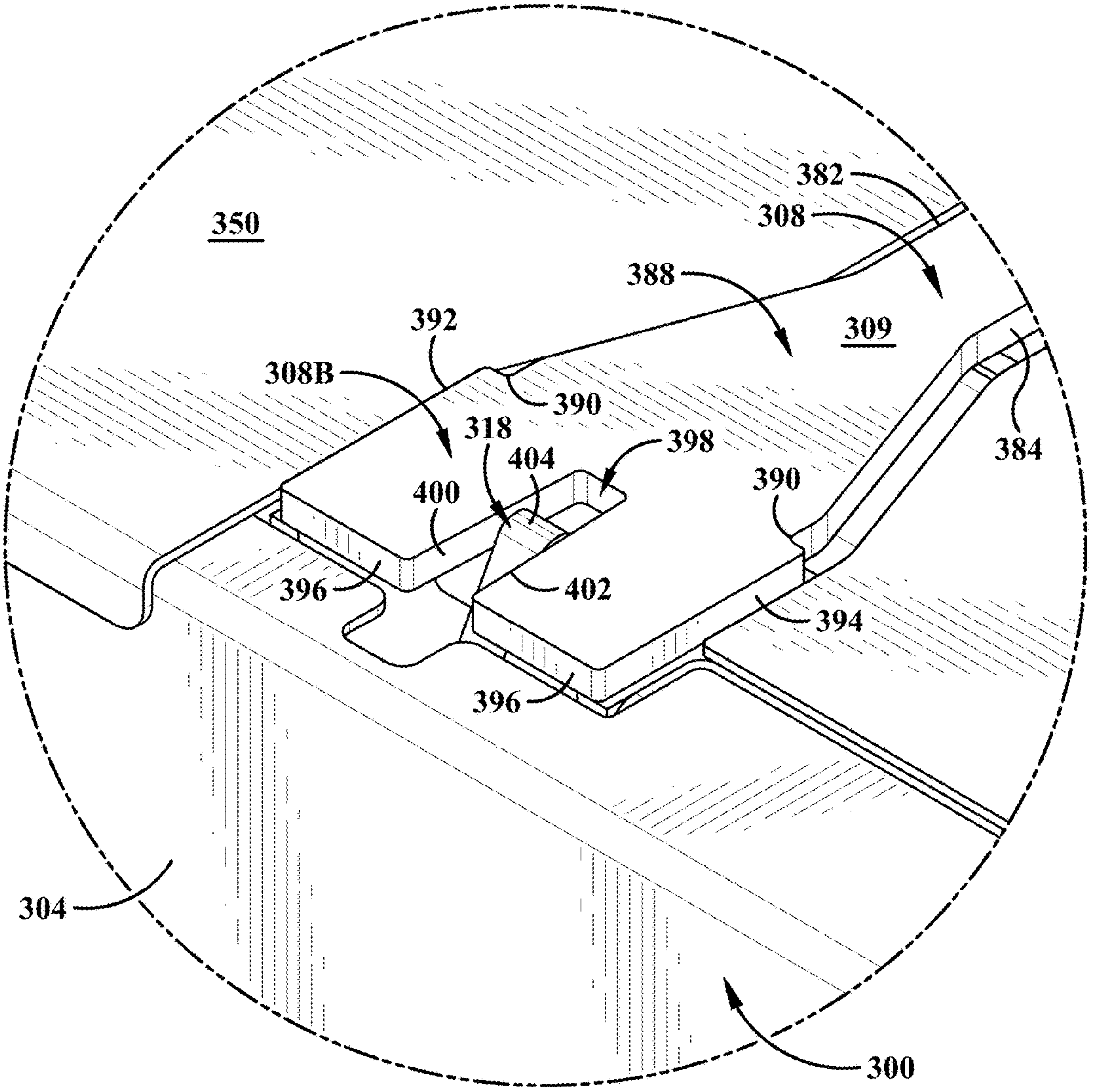
FIG. 24 (FIG. 24) is an enlarged top perspective view of a clamp hook at or near one end of a rail on the table of the modular cobot system.
Figure 25:
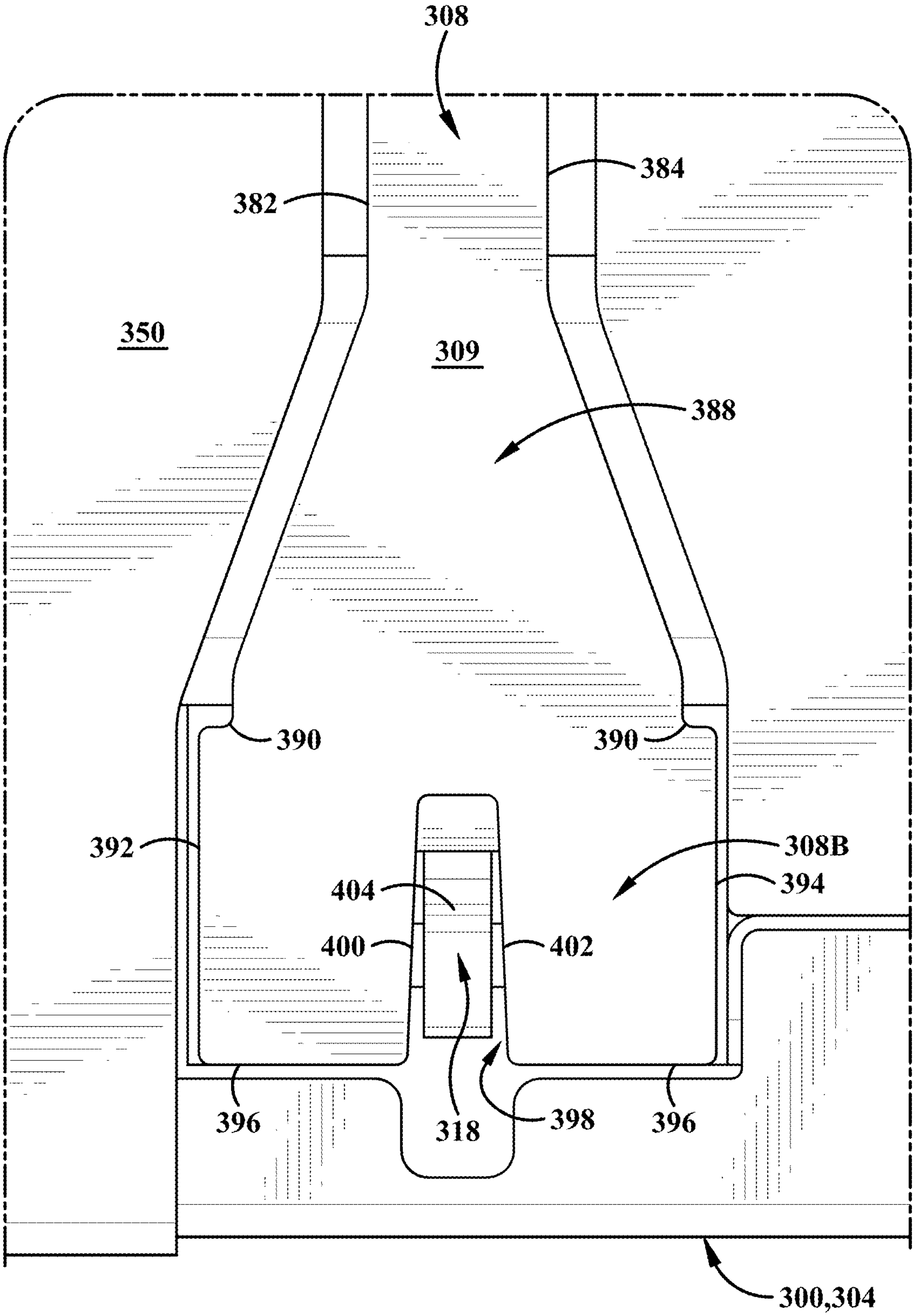
FIG. 25 (FIG. 25) is an enlarged top plan view of the clamp hook at or near one end of the rail on the table of the modular cobot system.

FIG. 24 and FIG. 25 depict the second end 308B of the first rail 308. The rail 308 has a first side edge 382 and a second side edge 384 that extend parallel to each other substantially along the length of the top surface 350 of the fixture support assembly 300. The first side edge 382 and the second side edge 384 widen and angle away from each other at a neck region 388. The neck region 388 widens to a corner 390 where the side edges extend away from each other and then transition to defined parallel first and second end edges 392, 394, respectively. The end edges 392, 394 are parallel to each other but are spaced apart farther from each other than the side edges 382, 384 that are located distally from the neck region 388. The rail 308 includes a second end edge 396 that is interrupted by a longitudinally extending slot 398 defined by first slot edge 400 and second slot edge 402. The clamp hook 318 is positioned within the slot 398. As will be described in greater detail below, the clamp hook 318 is configured to move between a clamped position and an unclamped position. The unclamped position is shown in FIG. 24 and FIG. 25 in which the clamp hook 318 is lowered and only the tip 404 of the clamp hook 318 is within the slot 398. The remainder of the clamp hook 318 is positioned below the slot 398. However, when the clamp 318 is moved upwardly into the clamped position in order to clamp the notch 320 on the lower support member 360 of the fixture 302, the body of the clamp hook 318 will extend upwardly through the slot 398 in order to clamp onto lower support member 360 by positioning the clamp hook into the notch 320 and engage the side edges 364, 366 of notch 320 to define a contact area in which the clamp hook 318 contacts the side edges 364, 366 of the lower support member 360 to secure the fixture 302 to the fixture support assembly 300.

Although FIG. 24 and FIG. 25 are referenced with respect to the first clamp hook 318 and the first rail 308, it is to be understood that the second clamp hook 328 and the second rail 310 have a similar configuration and interaction with the second lower support member that defines the notch 322 on the fixture 302.

Figure 26A:
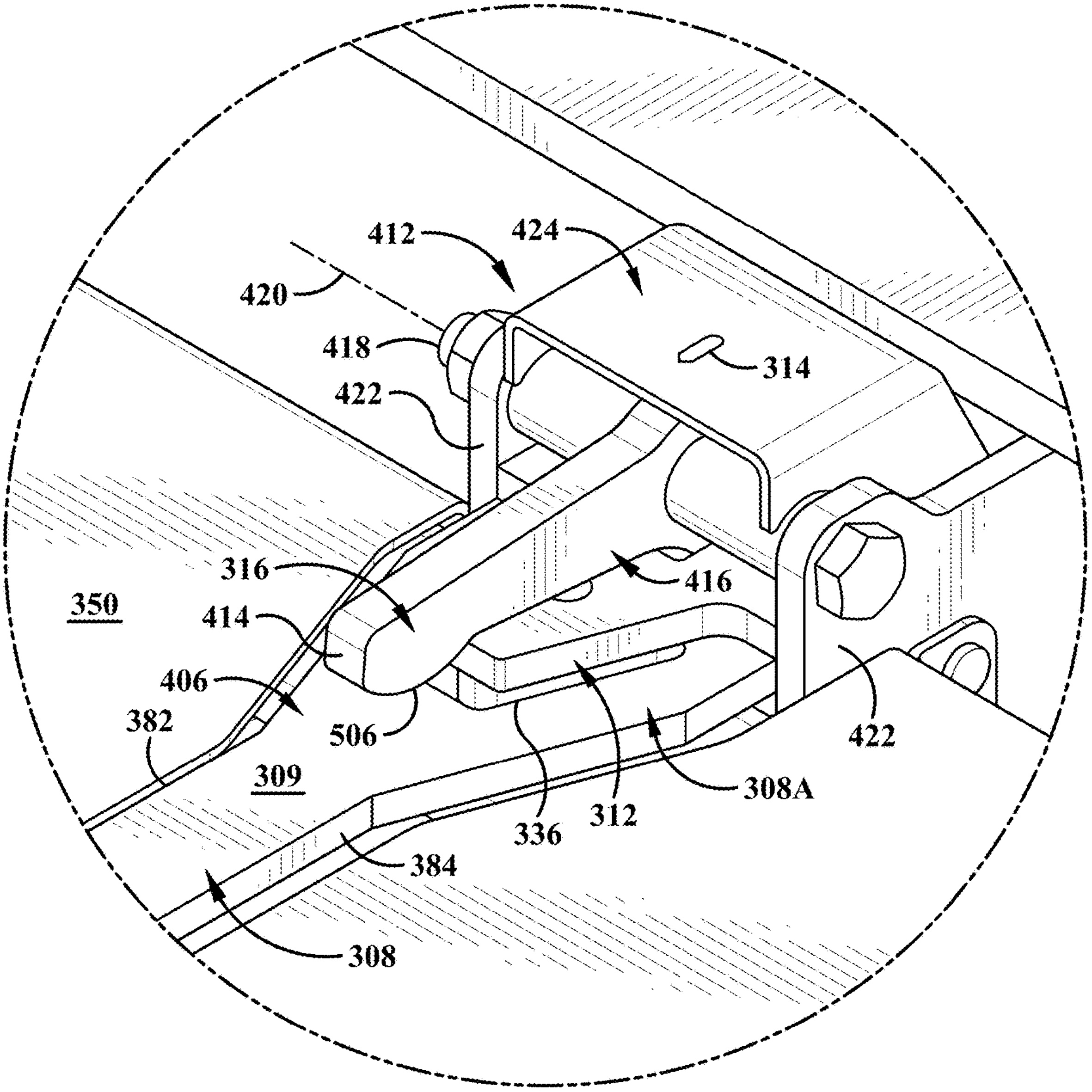
FIG. 26A (FIG. 26A) is an enlarged top perspective view of a latch at or near an opposite end of the rail on the table of the modular cobot system.
Figure 26B:
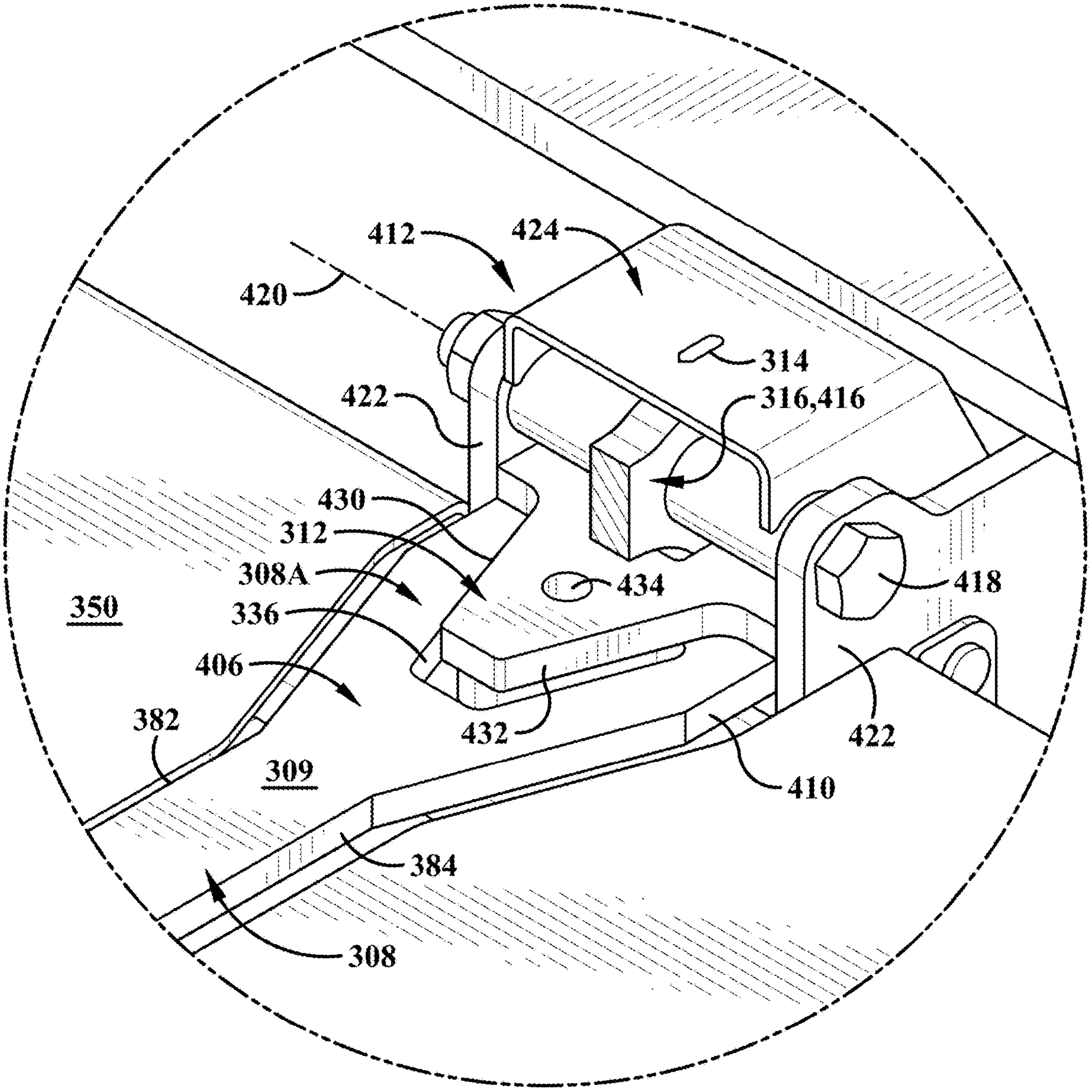
FIG. 26B (FIG. 26B) is an enlarged top perspective view of the opposite end of the rail on the table of the modular cobot system with the latch being cut away to show components below the latch arm.
Figure 27:
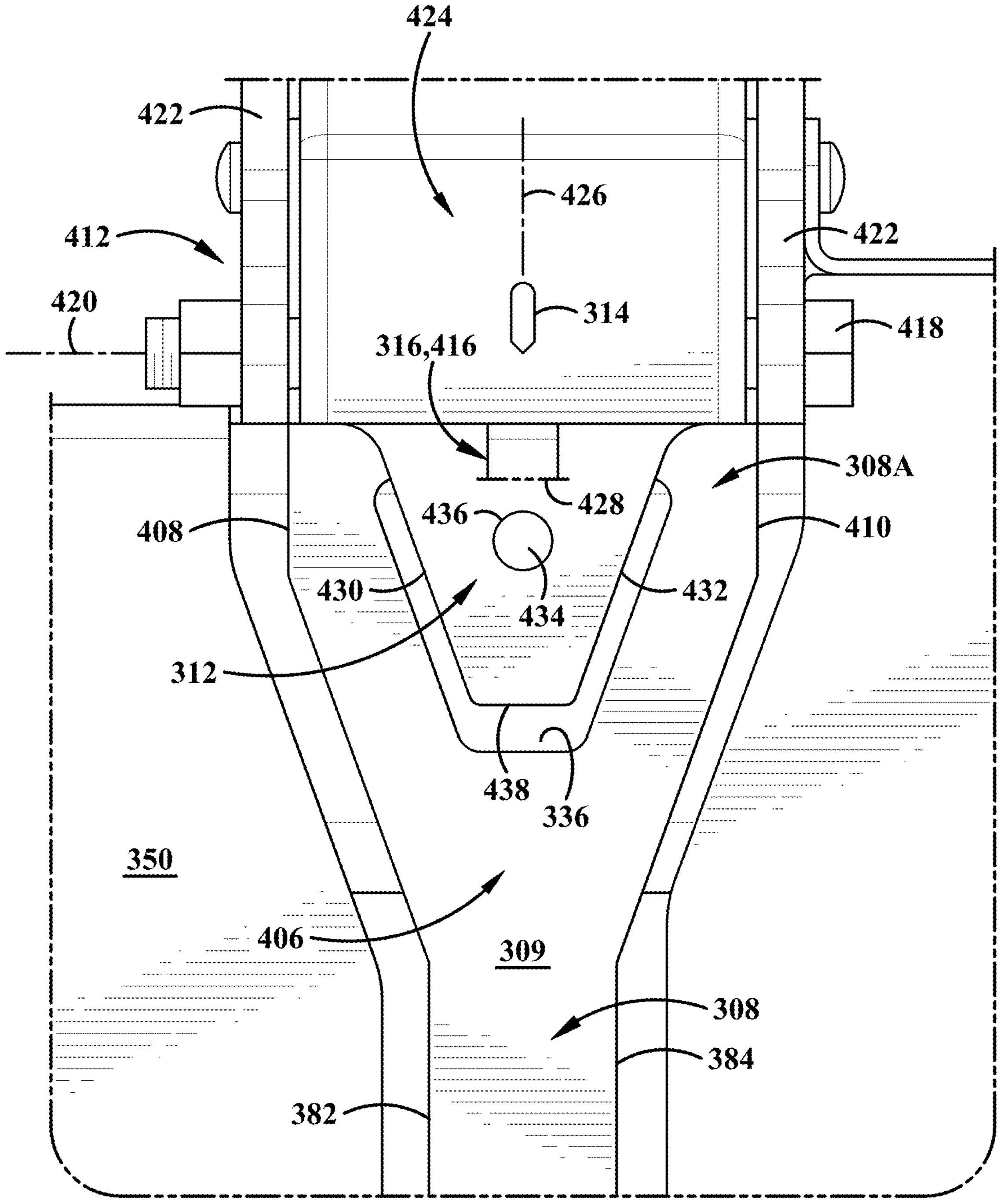
FIG. 27 (FIG. 27) is a top plan view of the opposite end of the rail on the table of the modular cobot system with the latch being cut away to show components below the latch arm.
Figure 28:
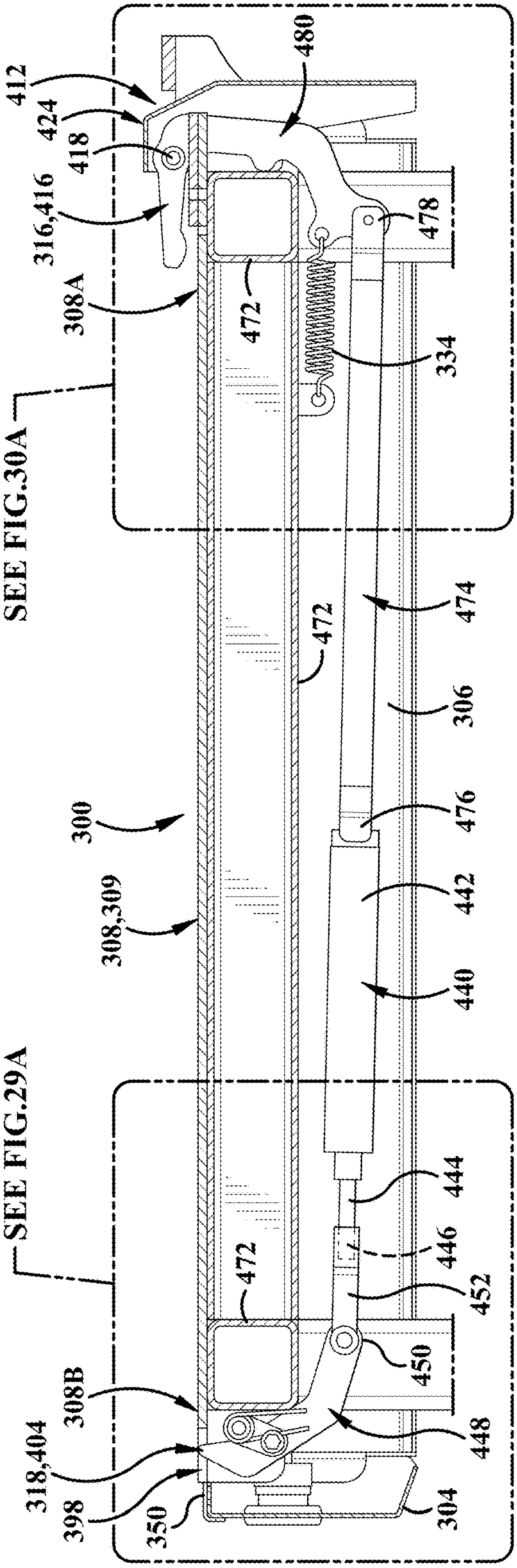
FIG. 28 (FIG. 28) is an elevational cross section view of fixture support assembly.

FIG. 26A, FIG. 26B, and FIG. 27 depict the latch assembly located near the first end 308A of first rail 308. The first end 308A of the first rail 308 has a widened neck region 406 that causes the side edges 382, 384 of the first rail to extend away from each other. The neck region 406 transitions to define end edges 408, 410 that extend longitudinally parallel to each other at a spaced apart distance that is greater than the central side edges 382, 384 of the rail 308. Within the neck region 406, the cutout 336 is defined and extends vertically through the entirety of the rail 308. The cutout 336 is configured to provide a drain port for weld splatter so as to prevent interference of weld material during cobot welding operations. The top surface 350 of the fixture support assembly 300 includes a space that receives the first rail 308 therein.

The latch assembly 412 includes the first latch 316. The latch 316 includes a terminal end 414 defined by a latch arm upper body 416. The other end of the latch upper body 416 is connected with a rotatable member 418, such as a sleeve that rotates around a bolt defining a pivot axis 420 that extends perpendicular to the length of the latch body 416. The rotatable member 418 enables that the latch 316 to rotate about axis 420. The rotatable member 418 is supported by two upwardly extending flanges 422 that fit within the region of the top surface 350 of the fixture support assembly 300 that receives the first rail 308. Between the flanges 422 may be a latch cover 424. On the latch cover 424 may be the alignment indicator 314 which provides visual indication or indicator that the fixture 302 is aligned with the latch plate 312. The latch plate 312 is positioned below the latch 316 and provides a reference to the relative center of the longitudinal length of the latch body 416 and the latch plate 312. The alignment indicator 314 is shown centered along a center axis 426 that extends centrally along the length of the latch body 416 and the latch plate 312.

FIG. 27 depicts that the latch body is shown cut away by dashed line 428 in order to view the configuration of the latch plate 312. The latch plate 312 has a first side edge 430 and a second side edge 432 that are straight edges oriented at an angle relative to each other that is less than 90 degrees so as to define a generally V-shaped configuration of the latch plate. The latch plate includes a central aperture 434 defined by a circular edge 436 that extends vertically through the latch plate 312. Edges 430, 432 may each terminate at an end latch edge 438 that extends in the lateral direction in parallel to axis 420.

FIG. 28A depicts that an actuator 440 may be located beneath the top surface 350 of the fixture support assembly 300. The actuator may extend longitudinally between the front and rear portions between the pair of longitudinal supports 306. The actuator 440 is in operative communication with both the first latch 316 and the first clamp hook 318. In the shown embodiment, the actuator 440 is a piston and cylinder actuator. The actuator 440 may be either a pneumatic actuator or a hydraulic actuator. When the actuator 440 is a piston and cylinder actuator, the cylinder 442 may be located relatively central between the latch 316 and the clamp 318. In the shown embodiment, the piston 444 is associated with the clamp hook 318, however it is to be understood that the actuator 440 could be reversed so as to connect the piston 444 with the latch 316. The cylinder 442 has a terminal distal end 446 that is pivotally connected with a body 448 of the clamp hook. The body 448 of the clamp hook extends from an end 450 up to the tip 404 of the clamp hook.

Figure 29A:
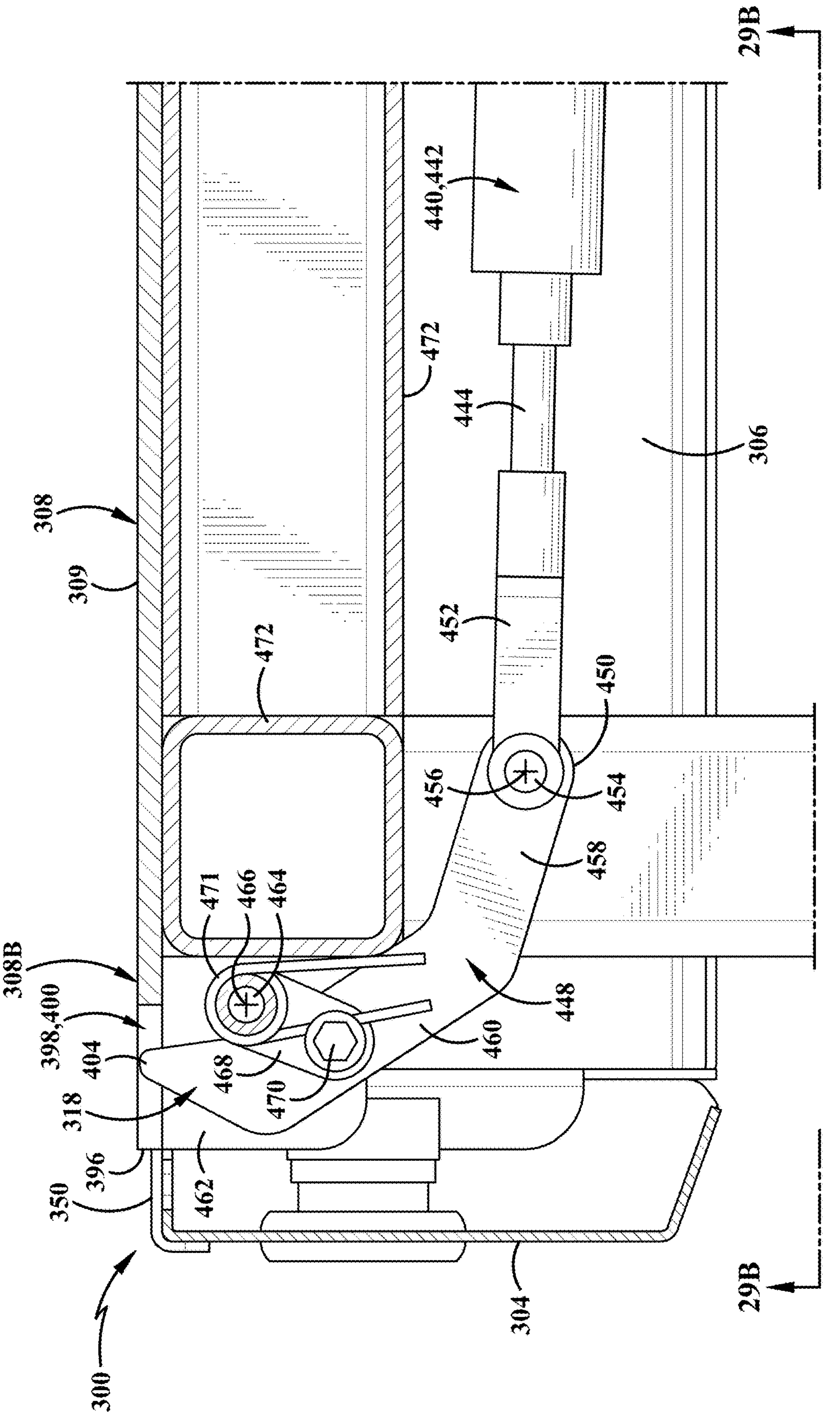
FIG. 29A (FIG. 29A) is an enlarged elevational cross section view of the region labeled "SEE FIG. 29A" in FIG. 29.
Figure 29B:
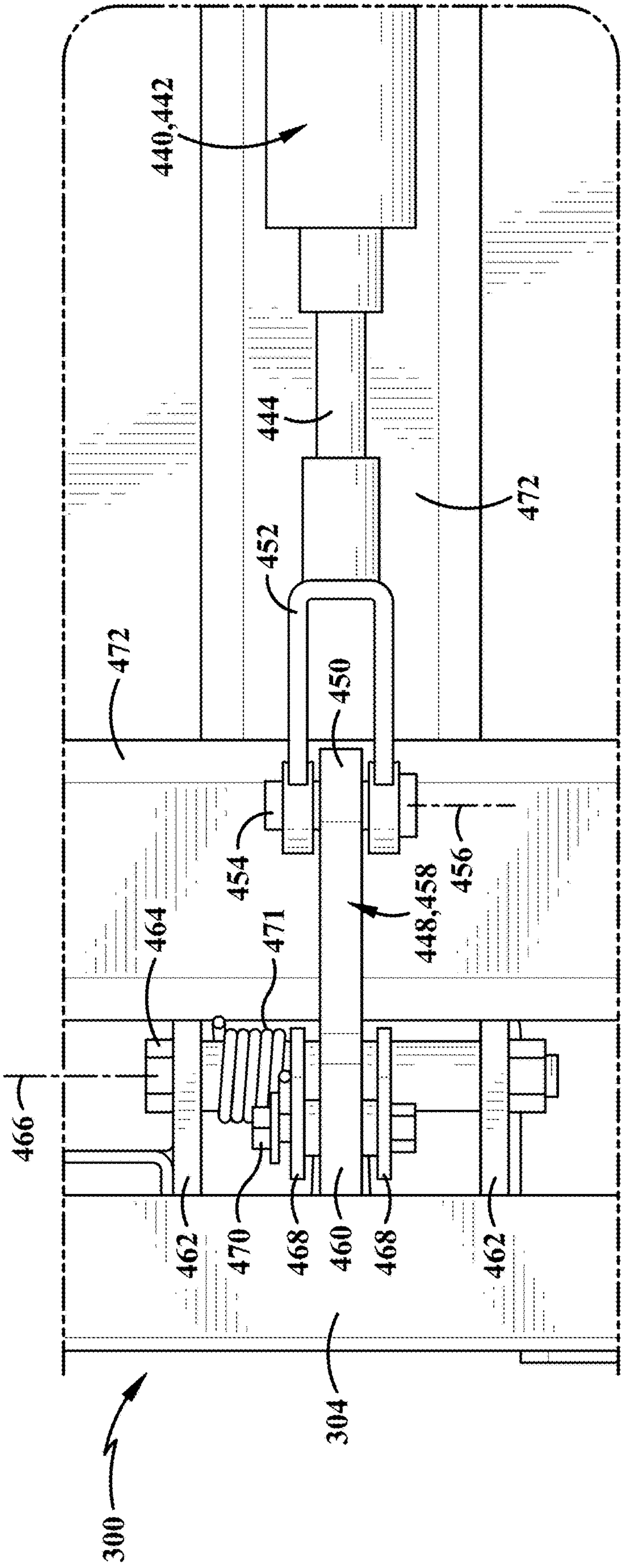
FIG. 29B (FIG. 29B) is an enlarged bottom plan view of the region from FIG. 29A.

With continued reference to FIG. 29A and FIG. 29B, a U-shaped connector 452 is at the end of the piston 444 that connects with the end 450 of the body 448. Particularly, the U-shaped connector 452 receives the end 450 of the body 448 between the spaced apart flanges and are connected with a connector 454 that defines a pivot axis 456. Pivot axis 456 is oriented in the lateral direction and is perpendicular to the direction of travel of the actuator 440.

Figure 33A:
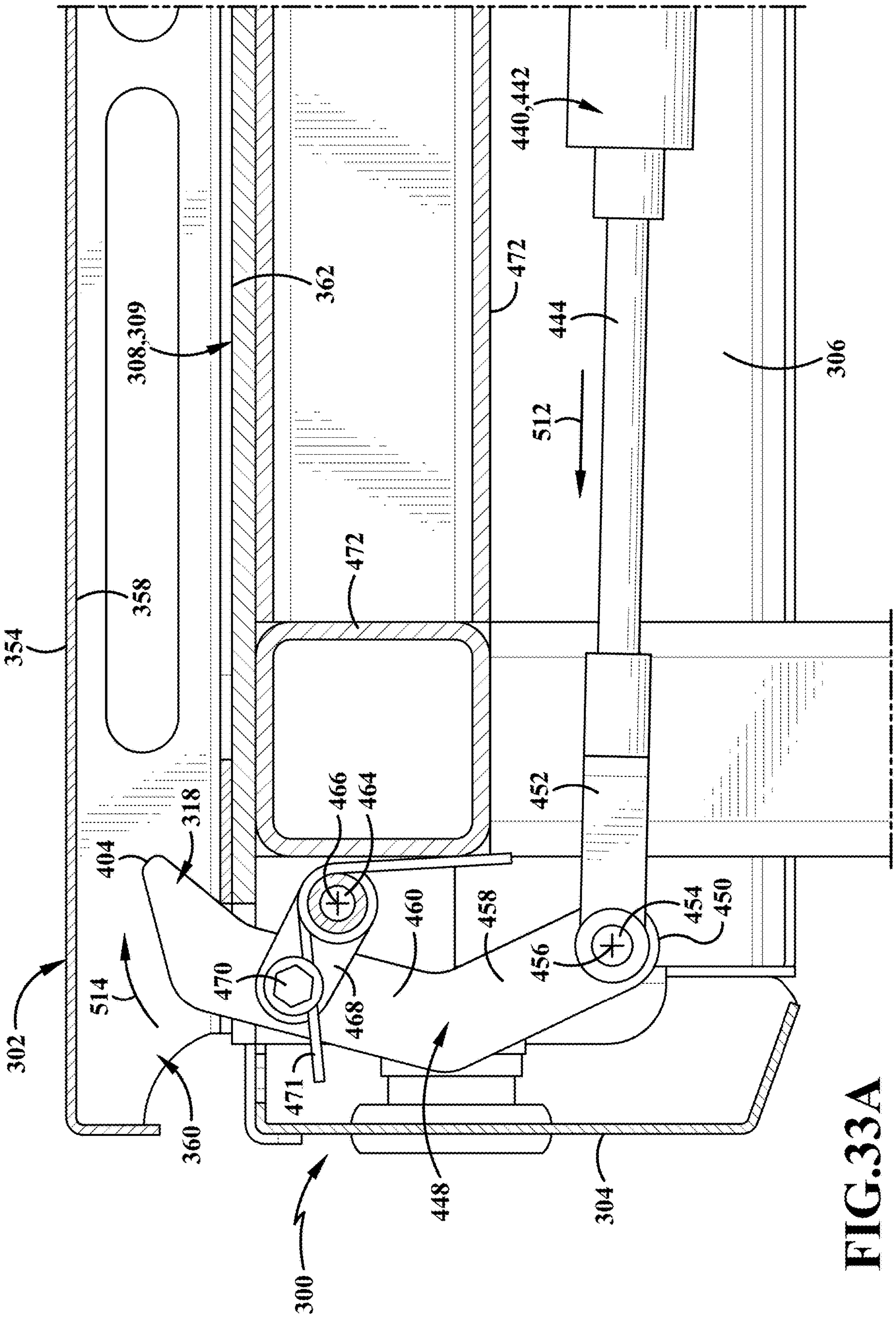
FIG. 33A (FIG. 33A) is an operational cross section view of the clamp hook with the fixture being clamped to the fixture support assembly via the clamp hook.

The latch body 448 defines an arm 458 that extends from the end 450. The arm 458 is rigidly connected with a second arm 460 that extends upwardly and longitudinally from the first arm 458. The second arm 460 continues to extend upwardly to define the tip 404 of the clamp 318. The second arm 460 of the body 448 is retained in position via opposing flanges 462 that function as a bracket with a laterally extending connector 464 that defines a pivot axis 466. A lever 468 is connected with the connector 464 and extends downwardly to a pin 470 that extends laterally through the second arm 460 of the body 448. The offset connection of the second arm 460 via the lever 468 enables the torsion spring 470 to extend around the connector 464 and interact with a square frame tube 472 and the connector 464 to assist with the lever 468 to bias the tip 404 of the clamp 318 upwardly. Thus, the lever 468 may impart an eccentric pivoting action as the clamp moves between the clamped position and the unclamped position. Collectively these components assist with moving the clamp 318 from the unclamped position (as shown in FIG. 29A) to the clamped position (as shown in FIG. 33A).

Figure 30A:
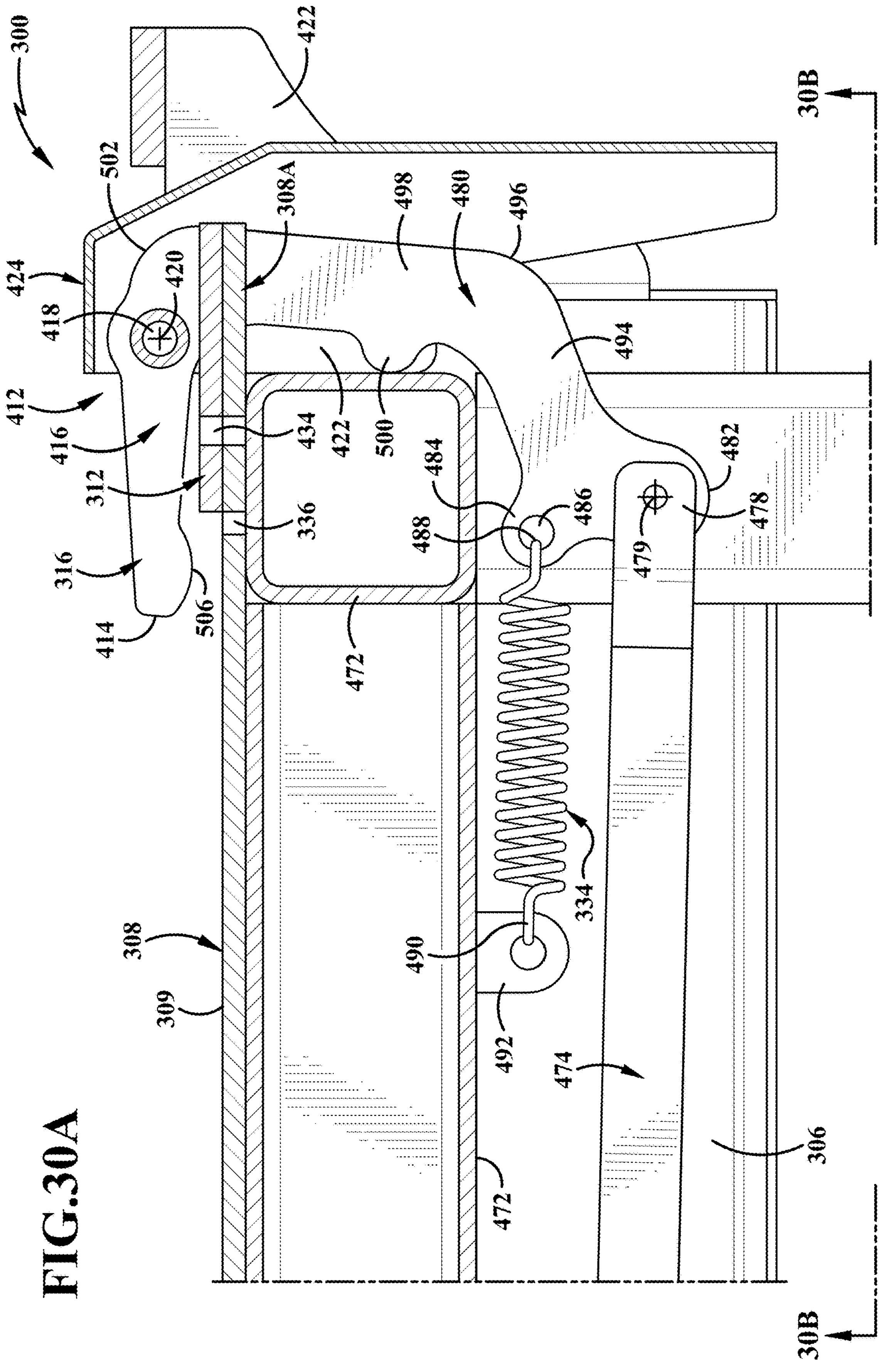
FIG. 30A (FIG. 30A) is an enlarged elevational cross section view of the region labeled "SEE FIG. 30A" in FIG. 29.
Figure 30B:
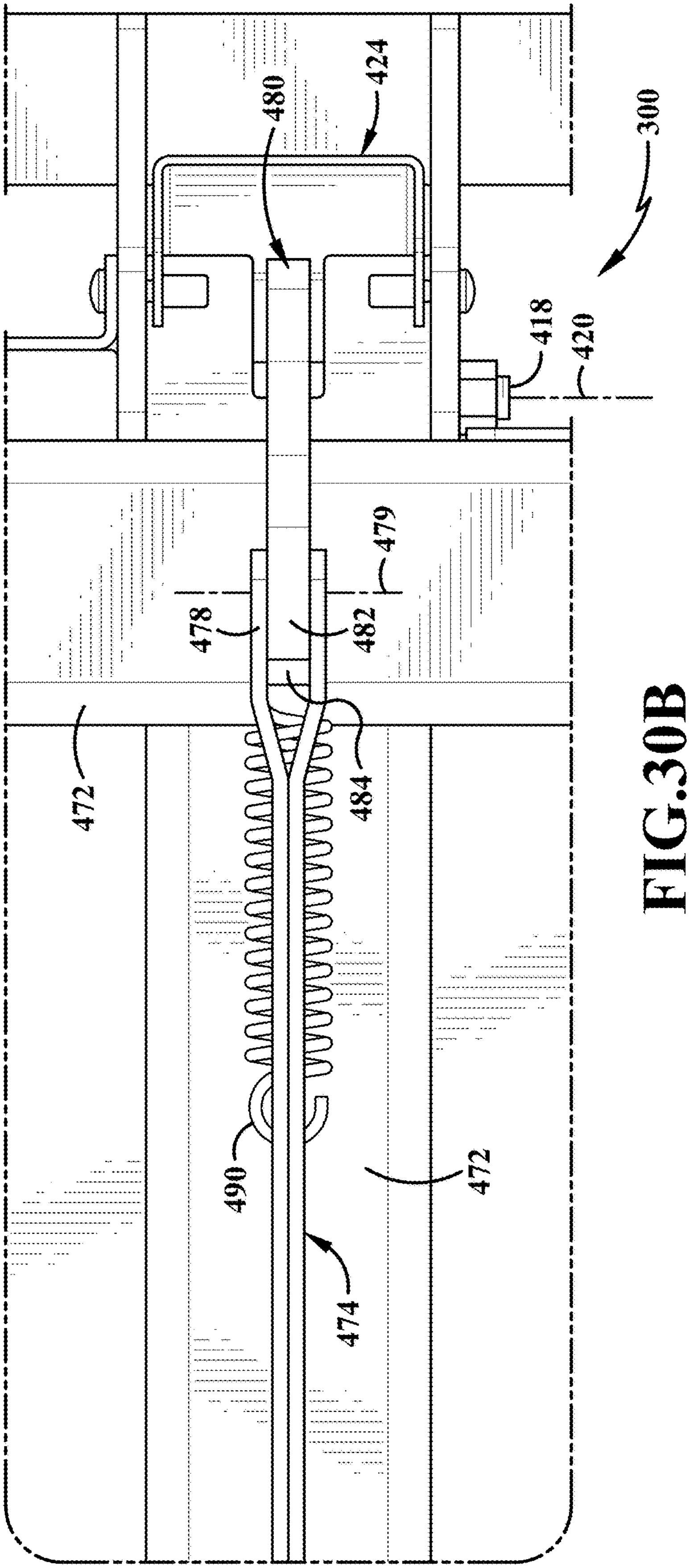
FIG. 30B (FIG. 30B) is an enlarged bottom plan view of the region from FIG. 30A.

FIG. 30A and FIG. 30B depict the first latch 316 in its interaction with the actuator. The actuator is connected with a rod 474 having a first end 476 connected to the cylinder 442 and a second end 478 connected to a body 480 of the latch 316. The latch body 480 includes a lower end 482 that is pivotally connected with the second end 478 of the rod 474. A pivot axis 484 is defined between the pivoting connection of the second end 478 of the rod 474 and the lower end 482 of the body 480 of the latch 316. The body 480 of the latch 316 extends upwardly from the lower end 482 and defines a lobe 484 defining a laterally extending aperture 486 therethrough. The aperture 486 is configured to retain one end 488 of spring 334 and another end 490 of spring 334 is connected to a downwardly extending lobe 492 that is rigidly connected to one of the frame square tubes 472 of the fixture support assembly 300. From the lobe 484 on the body 480, an arm 494 extends in a longitudinal direction to a bend 496 in the body 480. The bend transitions the body 480 upward and vertically to define a second arm 498. An edge on the second arm 498 defines a protrusion or projection 500 that acts as a stop block to interact with one of the square frame tubes 472. The second arm 498 continues to extend upwardly to a second bend 502 wherein the latch body 416 extends in the longitudinal direction from the second bend 502 to the latch end 414.

Having thus described the exemplary configuration of the cobot welding system 210, reference will now be made with respect to the operation thereof, together with FIG. 31A-FIG. 33B.

Figure 31A:
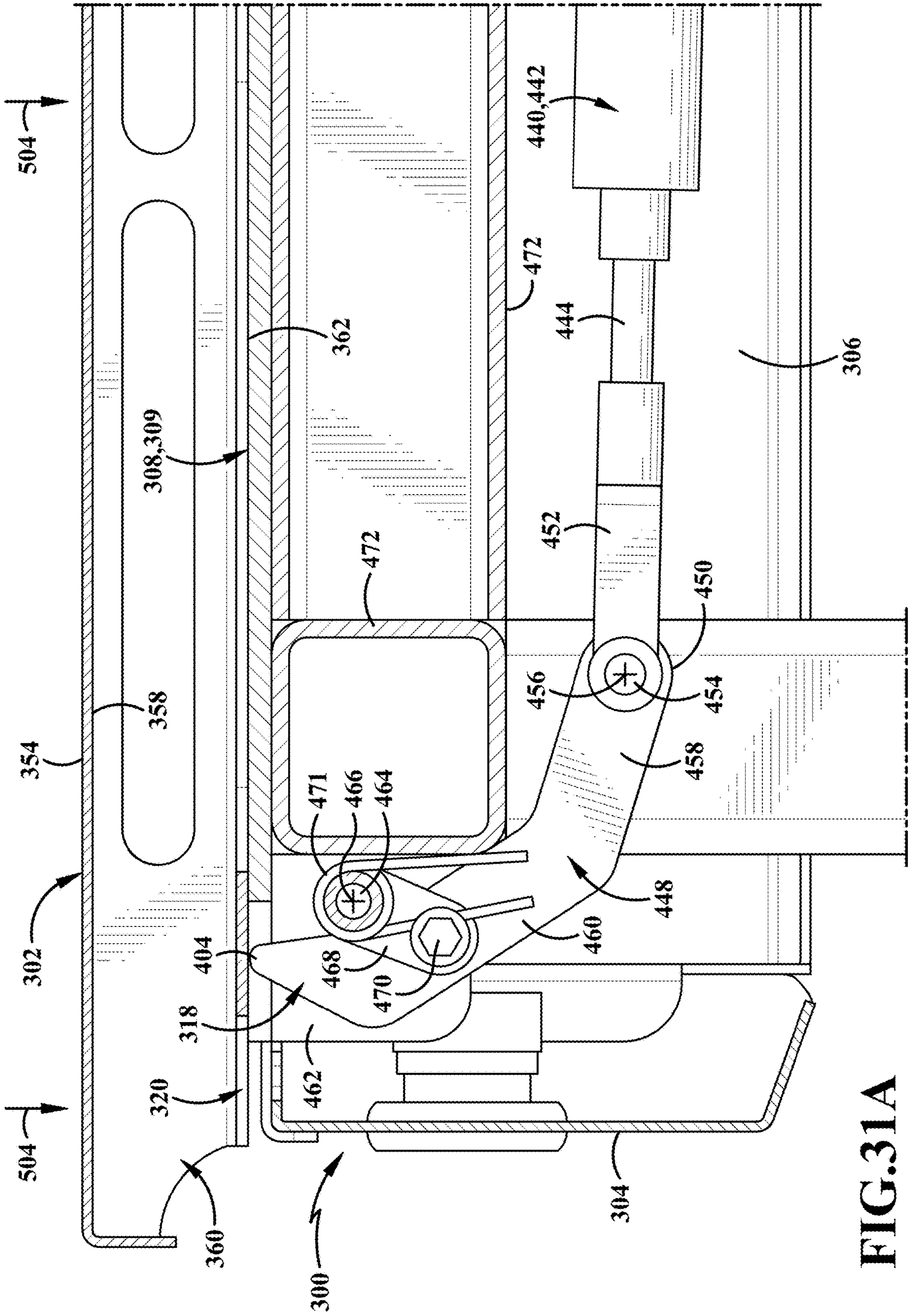
FIG. 31A (FIG. 31A) is an operational cross section view of the clamp hook with a fixture being moved onto the fixture support assembly.

FIG. 31A depicts that the fixture 302 may be lowered downwardly as indicated by arrows 504. The lowering of the fixture 302 onto the fixture support assembly 300, as indicated by arrows 504, is accomplished by moving the lower surface 362 of the lower supports 360 toward the top surface 350 of the fixture support assembly 300. The fixture 302 should be aligned such that the longitudinal length of the lower surface 362 of the lower support 360 rests atop the upwardly facing surface of the rails, such as the first rail 308.

When the fixture 302 is lowered downward in the direction of arrow 504, the clamp, such as the first clamp hook 318, should be in its unclamped position, as shown in FIG. 31A. The unclamped position of the first clamp hook 318 positions the tip 404 of the clamp hook 318 generally below or equal with the top surface 350 of the fixture support assembly 300. This allows the fixture 302 to rest atop or above or on the rail 308 or the top surface 350 of the fixture support assembly 300.

Figure 31B:
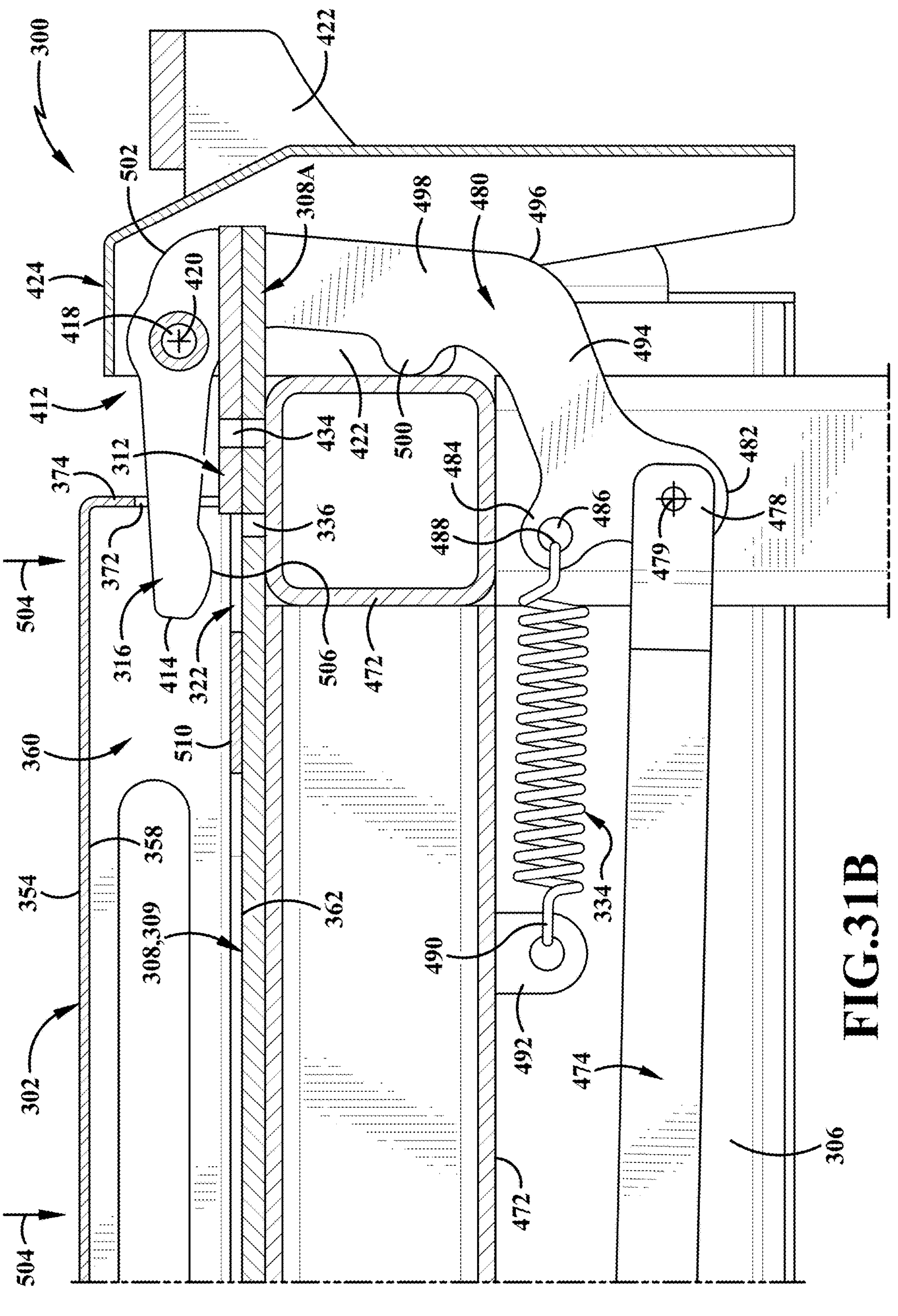
FIG. 31B (FIG. 31B) is an operational cross section view of the latch with the fixture being moved onto the fixture support assembly.

FIG. 31B depicts the opposite end of the fixture support assembly 300 to indicate that when the fixture 302 is lowered downward in the direction of arrow 504 the latch 316 is inserted through the cutout 372 in the flange 374. This positions the lower surface of the latch 316 within the lower support 360 of the fixture 302. FIG. 31B depicts the latch 316 in the unlatched position so as to position a downwardly projecting portion of the lower surface 506 of the latch 316 above the slot 322 formed in the lower support 360. Stated otherwise, the lower surface 506 of the latch 316 is positioned a distance above the upper surface 350 of the fixture support assembly 300 to provide enough clearance that allows the latch 316 to be inserted through the cutout 372 in the fixture 302 and into the interior volume of the lower support 360.

With continued reference to FIG. 31B, when the latch is in the unlatched position, as shown in FIG. 31B, a lower surface of the latch 316 is elevated relative to the top surface 350 of the fixture support assembly 300 due to the shape of the body 480 of the latch. Particularly, when the latch 316 is in the unlatched configuration, the projection 500 on the body 480 engages a side wall of the frame 472 in order to retain the lower surface 506 at an elevated height above the top surface 350.

Figure 32A:
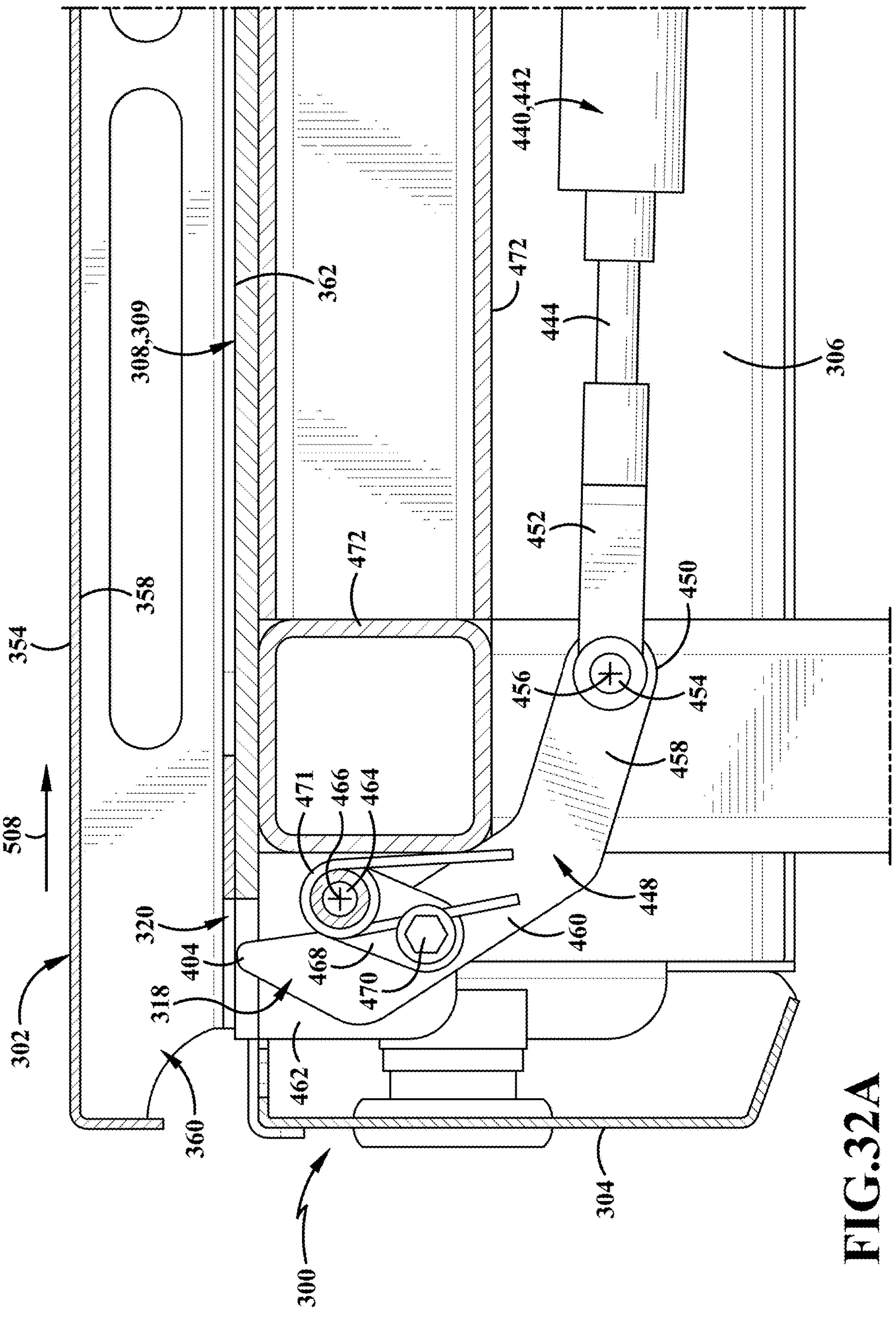
FIG. 32A (FIG. 32A) is an operational cross section view of the clamp hook with the fixture being slid along the fixture support assembly.
Figure 32B:
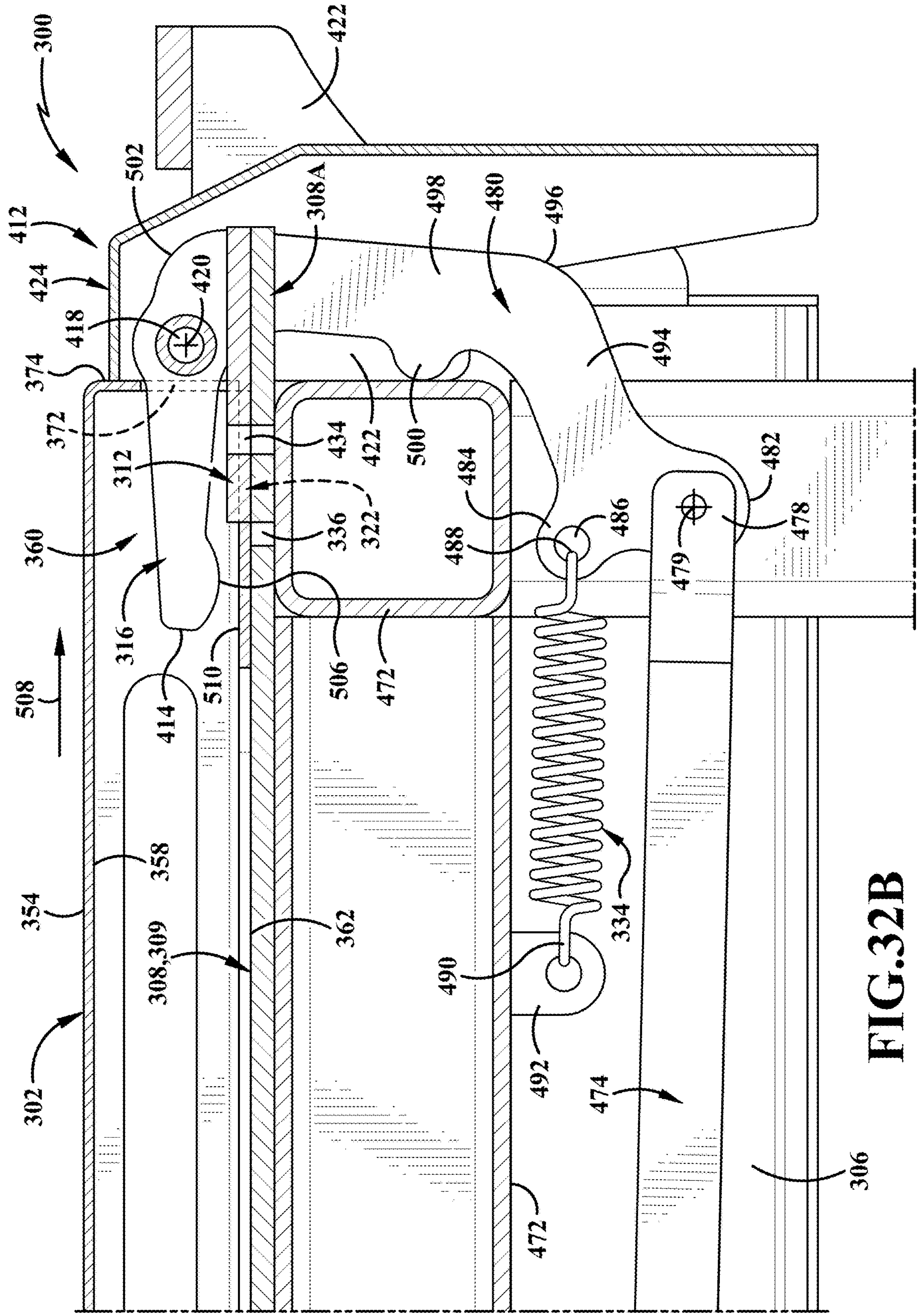
FIG. 32B (FIG. 32B) is an operational cross section view of the latch with the fixture being slid along the fixture support assembly to engage the latch.

FIG. 32A and FIG. 32B depict the sliding movement of the fixture 302 in the direction indicated by arrow 508. Sliding the fixture 302 in the direction of arrow 508 inserts the latch 316 further into the interior volume of the lower support 360 on the fixture 302 as indicated by arrow 508, the first clamp 318 and the first latch 316 are still in their unclamped and unlatched positions, respectively. The sliding movement of the fixture 302 aligns the slot 320 above the slot 398 through which the tip 404 of the clamp 318 will move. Additionally, the V-shaped slot 322 aligns with the latch plate 312 that is shaped complimentary to the side edges 376, 378 that define slot 322. When the edges 376, 378 contact the latch plate 322 at the contact area that is greater than about ¾ inch, the lower surface 506 is positioned above the inner surface 510 of the lower support 360.

Figure 33B:
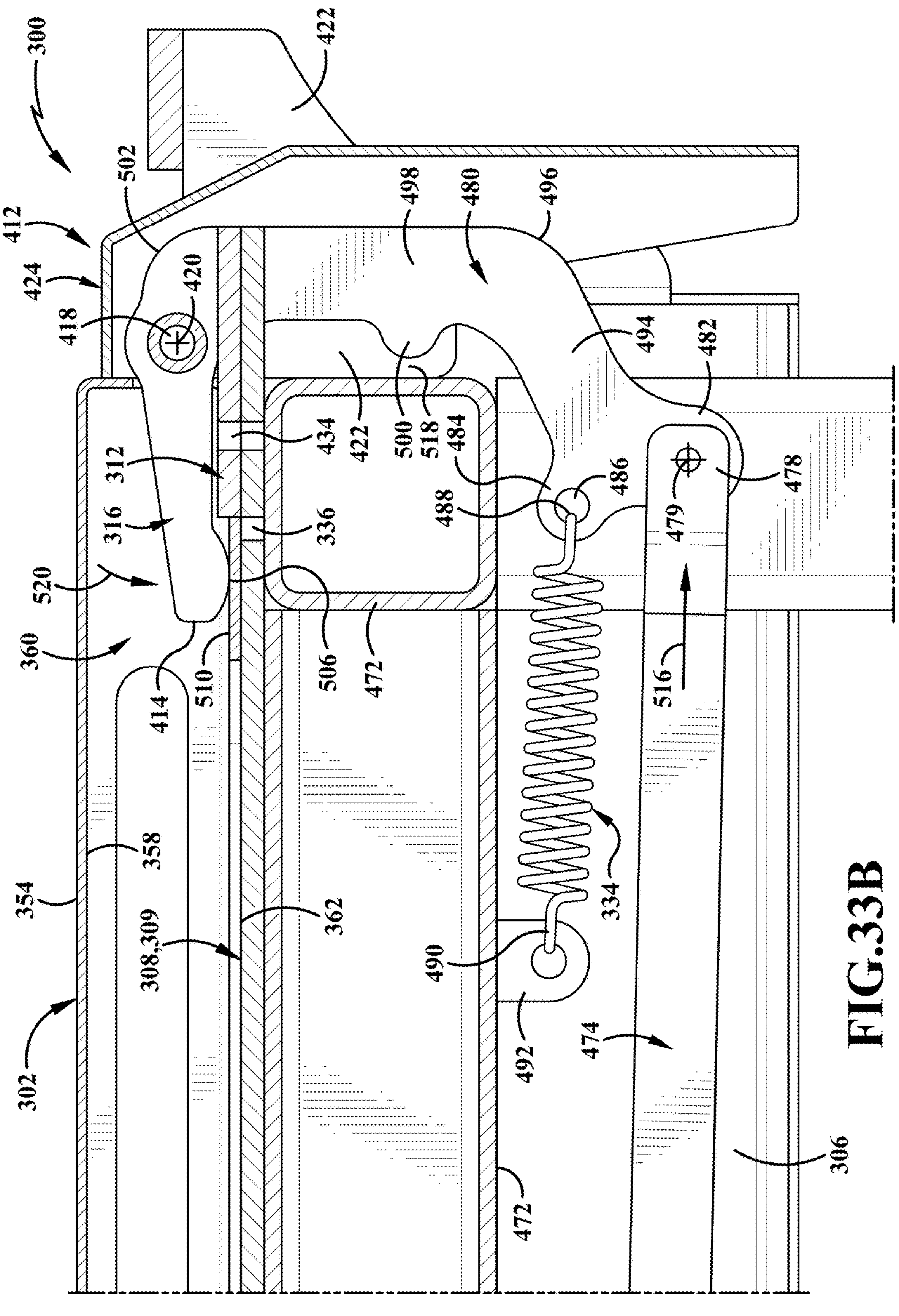
FIG. 33B (FIG. 33B) is an operational cross section view of the latch with the fixture being latched to the fixture support assembly via the latch.

FIG. 33A and FIG. 33B depict the action in which the fixture 302 is secured to the fixture support assembly 300. Control of the actuator 440 occurs by an operator generating an instruction, typically through a push button on the frontal surface of the fixture support assembly 300, to effectuate movement of actuator 440. FIG. 33A and FIG. 33B depict that the actuator expands to impart movement to the clamp 318 and the latch 316 simultaneously. FIG. 33A indicates that the piston 444 moves in the direction of arrow 512. The movement of the piston 444 in the direction of arrow 512 causes the U-shaped connector 452 to push the first arm 458. The first arm 458 will pivot relative to the pivot axis 456. As the first arm 458 is pivoted and pushed by the piston 444 the torsion spring 470 will push against the frame 472 and the pin 470 to cause the lever 468 to move the second arm 460 upwardly. The piston 444 continues to move outwardly, as indicated by arrow 512, until the clamp 318 rotates upwardly in the direction indicated by arrow 514. The clamp 318 will engage the side walls or edges 364, 366 that define the slot or notch 320 to establish a contact connection at the contact area in the lower support member 360 of the fixture.

FIG. 33B depicts that at the other end of the actuator 440 the bar 474 moves, as indicated by arrow 516, in response to the expansion of the actuator 440. The second end 478 of the bar 474 pushes the lower end 482 of the body 480 via the pivot connection 484. The movement of the bar 474 in the direction of arrow 516 causes the spring 334 to extend. Additionally, this action moves the projection 500 away from its contact with the frame 472 to define a gap 518 between the projection 500 and the exterior surface of the frame 472. The latch 316 pivots about the pivot axis 420 as indicated by arrow 520. The latch 316 continues to move to the latched position until the lower surface 506 of the latch body 416 contacts the interior surface 510 of the lower support member 360.

Thus, it can be seen in FIG. 33A and FIG. 33B that the clamp 318 and the latch 316 are moved to their respective clamped and latched positions simultaneously in response to expansion or other movement of the actuator 440. Although the shown embodiment depicts that expansion of the actuator moves the clamp to the clamped position and the latch to the latched position, it is to be understood that movement of the actuator 440 could be reversed using a different arrangement of pivots so as to still accomplish the simultaneous clamping and latching. For example, different pivot arrangements could be utilized such that retraction of the piston relative to the cylinder of the actuator 440 could effectuate the simultaneous clamping and latching.

With the fixture 302 latched and clamped or otherwise secured to the fixture support assembly 300 on table 222, the operator of the cobot welding system 210 could then perform a welding operation utilizing any variety of jigs or other devices atop the fixture 302.

Once the welding operation has been completed, the process may be reversed in order to unlatch and unclamp the fixture 302 from the fixture support assembly 300. Namely, the actuator would be instructed to retract its piston 444 which would lower the clamp 318 from its clamped position to an unclamped position and unlatch the latch 316 from its latched position to an unlatched position simultaneously. Thereafter, once the clamp and unclamped and the latch is unlatched, the operator may slide the fixture 302 out of its engagement from the latch 316 and remove it from the fixture support assembly 300 atop table 222. The fixture 302 can then be removed from the table 222, and thereafter a second fixture could be utilized in its place and the process repeated to perform a different or subsequent welding operation.

A variety of clamps or jigs can be connected to the hole-patterned tabletop of the welding cobot workstation or system 10, each designed for specific clamping needs. Any type of clamp or jig can be utilized. The following are some non-limiting examples. C-clamps are versatile and widely used in welding. They have a C-shaped frame with a threaded screw for adjusting the clamp's opening size. C-clamps can be attached to the holes in the tabletop, allowing them to securely hold workpieces by applying pressure from the top and sides. F-clamps, also known as bar clamps, have an F-shaped frame and a threaded screw for tightening. They are often used for clamping large and heavy workpieces, such as metal beams or frames. F-clamps can be positioned in the tabletop holes to provide lateral clamping force. Toggle clamps have a lever mechanism that provides quick and secure clamping. They come in various styles, including vertical, horizontal, and push-pull toggle clamps. These clamps are useful for holding workpieces in place during welding and can be mounted onto the tabletop holes. Magnetic clamps use strong magnets to hold ferrous (magnetic) workpieces securely. They are especially handy when clamping thin sheets of metal. Magnetic clamps can be placed anywhere on the tabletop with holes that accommodate their mounting. Welding angle clamps are specialized clamps are designed to hold workpieces at precise angles for welding. They have adjustable arms and angles, making them ideal for ensuring accurate joint alignment during welding. Spring clamps are simple clamping devices with spring-loaded jaws that can be opened and closed easily. They are useful for holding small workpieces or lightweight materials during welding. Pneumatic clamps are powered by compressed air and can provide strong and consistent clamping force. They can be integrated into the tabletop for automated welding processes. Depending on the specific welding project, custom fixtures and clamping mechanisms can be designed and attached to the hole-patterned tabletop. These fixtures are tailored to the unique shape and requirements of the workpiece. The choice of clamp depends on the size, shape, and material of the workpiece, as well as the welding process being used. Having a variety of clamps and fixtures that can be connected to the tabletop allows welders and operators to adapt their clamping setups to the specific requirements of each welding task, ensuring secure and precise workpiece positioning during welding operations.

In utilizing the vision system on cobot 12, maintaining the stationary position and establishing a consistent zero-point for clamps in welding operations is critical for achieving uniformity and consistency of welds from one workpiece to another. In welding, consistency is paramount to ensure the quality and integrity of each weld. If the clamps that hold the workpiece in place are not stationary and do not have a consistent zero-point, it can result in variations in the alignment and positioning of the workpiece, leading to inconsistent weld quality. Precise alignment of the workpiece is essential for creating strong and reliable welds. Stationary clamps and a consistent zero-point ensure that the workpiece is held in the same position for each weld, maintaining alignment and preventing distortion or misalignment.

Optical or visual sensors, such as cameras and vision systems, play a role in finding and verifying the zero-point consistently every time a new workpiece is to be welded. Visual sensors can be used to detect the presence and orientation of the workpiece as it is placed on the welding table in the collective workspace area. This initial detection helps ensure that the workpiece is positioned correctly before clamping. The visual system can identify reference points or markers on the workpiece or the welding table. These reference points serve as a known, consistent zero-point that can be used for alignment. Once the workpiece is detected in the collective workspace area, the visual system can provide feedback to the control system, indicating any misalignment or discrepancies from the desired position. This feedback can trigger adjustments to the clamps or workpiece position if necessary. Visual sensors can verify the clamps' positions and ensure they are stationary and in the correct configuration. If any clamp has shifted or is not in the desired position, the visual system can detect this and trigger an alert or corrective action. During the welding process, visual sensors can continuously monitor the workpiece's position and the clamps' stability. If there are any deviations or changes in position, the visual system can provide real-time feedback to the control system, allowing for immediate adjustments if needed. Visual sensor data can be logged and stored for quality control and traceability purposes. This data can be valuable for assessing weld consistency and diagnosing any issues that may arise during production.

The cobot 12 or system 10 of the present disclosure may additionally include one or more sensor to sense or gather data pertaining to the surrounding environment or operation of the system 10. Some exemplary sensors capable of being electronically coupled with the cobot 12 or system 10 of the present disclosure (either directly connected to the cobot 12 or system 10 of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, local pressure changes, submersion in or presence of liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; radar sensors; lidar sensors; ultrasonic sensors; magnetic sensors, image sensors; and moisture sensors sensing surrounding moisture levels.

If any sensors are utilized to gather data relating to the cobot 12 or system 10, then sensed data may be evaluated and processed with artificial intelligence (AI). Analyzing data gathered from sensors using artificial intelligence involves the process of extracting meaningful insights and patterns from raw sensor data to produce refined and actionable results. Raw data is gathered from various sensors, for example those which have been identified herein or others, capturing relevant information based on the intended analysis pertaining to or necessary for the operation of the cobot 12 or system 10. This data is then preprocessed to clean, organize, and structure it for effective analysis. Features that represent key characteristics or attributes of the data are extracted. These features serve as inputs for AI algorithms, encapsulating relevant information essential for the analysis. A suitable AI model, such as machine learning or deep learning (regardless of whether it is supervised or unsupervised), is chosen based on the nature of the data and the desired analysis outcome. The model is then trained using labeled or unlabeled data to learn the underlying patterns and relationships. The model is fine-tuned and optimized to enhance its performance and accuracy. This process involves adjusting parameters, architectures, and algorithms to achieve better results. The trained model is used to make predictions or inferences on new, unseen data. The model processes the extracted features and generates refined output based on the patterns it has learned during training. The results produced by the AI model are refined through post-processing techniques to ensure accuracy and relevance. These refined results are then interpreted to extract meaningful insights and derive actionable conclusions. Feedback from the refined results is used to improve the AI model iteratively. The process involves incorporating new data, adjusting the model, and enhancing the analysis based on real-world feedback and evolving requirements. Further, AI results can be used to alter the operation of the device, assembly, or system of the present disclosure based on feedback. For example, AI feedback can be used to improve the efficiency of the cobot 12 or system 10 of the present disclosure by responding to predicted changes in the environment or predicted changes to the cobot 12 or system 10 of the present disclosure more quickly than if only sensed by one or more of the sensors.

A sensor model may be employed, once trained, in the cobot 12 or system 10 of the present disclosure. In one embodiment, the cobot 12 or system 10 of the present disclosure can be used to teach a sensor model to predict sensor data for a specific scenario. Alternatively, sensor models can be utilized to generate the data to train the AI. The sensor model can be trained for any type of sensor, such as those types of sensors described above, and/or other sensor types. The elements described herein may be implemented as discrete or distributed components in any suitable combination and location. The various functions described herein may be conducted by hardware, firmware, and/or software. For example, a processor may perform various functions by executing instructions stored in memory.

The AI model and/or sensor model can include a deep neural network (DNN), convolutional neural network (CNN), another neural network (NN) or the like and can support generative learning. For example, the sensor model can include a generative adversarial network (GAN), a variational autoencoder (VAE), and/or another type of DNN, CNN, NN or machine learning model (e.g., natural language processing (NLP)). Generally, the sensor model can accept some encoded representation of a scene as input using any number of data structures and/or channels (e.g., concatenated vectors, matrices, tensors, images, etc.).

In a particular embodiment, the cobot 12 or system 10 of the present disclosure can use the sensors to acquire a representation of the real-world environment (e.g., a physical environment) at a given point in time. Data from these sensors may be used to generate a representation of a scene or scenario, which may then be used to teach a sensor model. For example, a representation of a scene can be derived from sensor data, properties of objects in the scene or surrounding environment such as positions or dimensions (e.g., objects being manufactured by the cobot 12 or system 10), classification data identifying objects in the scene or surrounding environment or on the table of the cobot 12 or system 10, properties or classification data of components of the cobot 12 or system 10 of the present disclosure, or some combination thereof. Generally, the sensor model learns to predict sensor data from a representation of the scene, environment or operation of the device, assembly, or system of the present disclosure.

The sensor model architecture can be selected to fit the shape of the desired input and output data. Examples of architectures (e.g., DNNs) include, but are not limited to, perceptron, feed-forward, radial basis, deep feed-forward, recurrent, long/short term memory, gated recurrent unit, autoencoder, variational autoencoder, convolutional, deconvolutional, and generative adversarial. Some DNN architectures, such as a GAN, can include a convolutional neural network (CNN) that accepts and evaluates an input image and may include multiple input channels, which may be used to accept and evaluate multiple input images and/or input vectors.

In one embodiment, training data for the sensor model may be generated using real-world (e.g., physical environment) data. To collect real-world training data, the cobot 12 or system 10 of the present disclosure may collect sensor data by fusing sensors as the cobot 12 or system 10 operates a real-world environment. The sensors of the device, assembly, or system of the present disclosure may include, for example, one or more global navigation satellite systems sensors (e.g., Global Positioning System sensors (GPS)), RADAR sensors, ultrasonic sensors, LIDAR sensors, inertial measurement unit (IMU) sensors (e.g., accelerometer(s), gyroscope(s), magnetic compass(es), magnetometer(s), etc.), ego-motion sensors, microphones, stereo cameras, wide-view cameras (e.g., fisheye cameras), infrared cameras, surround cameras (e.g., 360 degree cameras), long-range and/or mid-range cameras, speed sensors (e.g., for measuring the speed of the vehicle), vibration sensors, steering sensors, brake sensors (e.g., as part of the brake sensor system), and/or other sensor types.

In another embodiment, training data for the sensor model is generated based on simulated or virtual environments. The training data may then be used to train the sensor model for use in real-world autonomous or semi-autonomous applications, e.g., to control the operation of t the cobot 12 or system 10 of the present disclosure. The training data may be derived to fit the shape of the input and output data for the sensor model, which may depend on the architecture of the sensor model. For example, sensor data may be used to encode an input scene, input parameters, and/or established the cobot 12 or system 10 truth sensor data using different data structures and/or channels (e.g., concatenated vectors, matrices, tensors, images, etc.).

The device, assembly, or system of the present disclosure may include hardware, software and/or firmware responsible for managing the sensor data generated by the sensors. The autonomous hardware, software, and/or firmware being executed may manage different environments using one or more maps (e.g., 3D maps representing the workspace for the cobot 12 or system 10), positioning component(s), and the like. The autonomous hardware, software, and/or firmware may also include components to plan, control, and generally manage the cobot 12 or system 10 of the present disclosure. In one example, the autonomous hardware, software, and/or firmware can be installed in and used to control the cobot 12 or system 10 of the present disclosure through the environment based on the sensor data, one or more machine learning models (e.g., neural networks), and the like. A training system may use the training data to train the sensor model to predict virtual sensor data for a given scene, environment, or operation of a component.

The training system can include one or more servers (e.g., a graphics processing unit server) and data stores and may use a cloud-based deep learning infrastructure with artificial intelligence to analyze the sensor data received from the cobot 12 or system 10 of the present disclosure and/or stored in the data store. The training system can also incorporate or train up-to-date, real-time neural networks (and/or other machine learning models) for one or more sensor models.

The cobot 12 or system 10 of the present disclosure may include wireless communication logic coupled to sensors on the cobot 12 or system 10. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the device, assembly, or system of the present disclosure, the system may use a variety of protocols (e.g., Wi-Fi®, ZigBee®, MIWI, BLUETOOTH®) for communication. In one example, each of the devices, assemblies, or systems of the present disclosure may have its own IP address and may communicate directly with a router or gateway. This would typically be the case if the communication protocol is Wi-Fi®. (Wi-Fi® is a registered trademark of Wi-Fi Alliance of Austin, TX, USA; ZigBee® is a registered trademark of ZigBee Alliance of Davis, CA, USA; and BLUETOOTH® is a registered trademark of Bluetooth Sig, Inc. of Kirkland, WA, USA).

In another example, a point-to-point communication protocol like MiWi or ZigBee® is used. One or more of the cobot 12 or system 10 of the present disclosure may serve as a repeater and may be connected together in a mesh network to relay signals from one cobot 12 or system 10 to the next. However, the individual cobot 12 or system 10 in this scheme typically would not have IP addresses of their own. Instead, one or more of the devices, assemblies, or system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the cobot 12 or system 10 of the present disclosure may differ from embodiment to embodiment. In one embodiment, alerts and signals from the cobot 12 or system 10 of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a production department. Thus, if a particular v of the present disclosure creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used.

In other embodiments, alerts and other data from the sensors on the cobot 12 or system 10 of the present disclosure may also be sent to a work tracking system that allows the individual, or the organization for which he or she works, to track the status of the various alerts that are received, to schedule particular workers to manufacture/weld a workpiece on a particular cobot 12 or system 10 of the present disclosure, and to track the status of those production jobs. A work tracking system would typically be a server, such as a Web server, which provides an interface individuals and organizations can use, typically through the communication network. In addition to its work tracking functions, the work tracker may allow broader data logging and analysis functions. For example, operational data may be calculated from the data collected by the sensors on the cobot 12 or system 10 of the present disclosure, and the system may be able to provide aggregate machine operational data for a cobot 12 or system 10 of the present disclosure or group of devices, assemblies, or systems of the present disclosure.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible. For example, instead of the plates 44,46 being L-shaped, the plates 44, 46 can be semi-circular, triangular, rectangular or square, pentagonal, hexagonal, heptagonal, octagonal, decagonal, dodecagonal, diamond shaped or another parallelogram, trapezoidal, star-shaped, oval, ovoid, lines or lined, teardrop-shaped, cross-shaped, donut-shaped, heart-shaped, arrow-shaped, crescent-shaped, any letter shape (i.e., A-shaped, B-shaped, C-shaped, D-shaped, E-shaped, F-shaped, G-shaped, H-shaped, I-shaped, J-shaped, K-shaped, L-shaped, M-shaped, N-shaped, O-shaped, P-shaped, Q-shaped, R-shaped, S-shaped, T-shaped, U-shaped, V-shaped, W-shaped, X-shaped, Y-shaped, or Z-shaped), or any other type of regular or irregular, symmetrical or asymmetrical configuration. In another example, instead of the legs being square or rectangular, they may have any other shape that permits modular connection with a secondary table.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document (DOCX) submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A welding table comprising:
a table frame having downwardly extending legs;
a welding fixture support assembly positioned atop the table frame, wherein the welding fixture support assembly comprises:
a first rail having a first end and a second end; and
a first clamp hook at the second end of the first rail, wherein the first clamp hook is shaped to fit within a first generally V-shaped slot formed below a welding fixture that is to be supported by and engaged with the fixture support assembly via the first clamp hook, wherein the first generally V-shaped slot tapers at an angle less than about 45 degrees, and wherein the first clamp hook contacts an edge of the first generally V-shaped slot at a contact area that has a length greater than ½ inch.

2. The welding table of claim 1, wherein the contact area has a length of about 1.25 inches.

3. The welding table of claim 1, wherein the angle is about 40 degrees.

4. The welding table of claim 1, wherein the welding fixture support assembly further comprises:
a second rail having a first end and a second end;
a second clamp hook at the second end of the second rail, wherein the second clamp hook is shaped to fit within a second generally V-shaped slot formed below the welding fixture that is to be supported by and engaged with the fixture support assembly via the second clamp hook, wherein the second generally V-shaped slot tapers at an angle less than about 45 degrees, and wherein the second clamp hook contacts an edge of the second generally V-shaped slot at a contact area that has a length greater than ½ inch.

5. The welding table of claim 1, wherein the welding fixture support assembly further comprises:
a first latch adjacent the first end of the first rail;
an actuator operatively connected to the first latch and the first clamp hook, wherein movement of the actuator imparts movement to the first latch and the first clamp hook.

6. The welding table of claim 5, wherein the welding fixture support assembly further comprises:
a biasing member operatively connected to the first clamp hook via a lever that offsets the biasing member from an arm of the first clamp hook, wherein the biasing member assists movement of the first clamp hook between an unclamped position and a clamped position, wherein the first clamp hook clamps the welding fixture to the welding fixture support assembly in the clamped position.

7. The welding table of claim 5, wherein the welding fixture support assembly further comprises:
a first latch plate adjacent the first end of the first rail; and
a first alignment indicator formed as an arrow being centered relative to the first latch plate.

8. The welding table of claim 5, wherein the welding fixture support assembly further comprises:
an extension coil spring having one end connected to a body of the first latch, wherein the extension coil spring is adapted to assist the actuator in moving the latch between a latched position and an unlatched position, wherein the first latch latches the welding fixture to the welding fixture support assembly in the latched position.

9. The welding table of claim 5, wherein movement of the actuator moves the first latch between a latched position and an unlatched position, and movement of the actuator moves the first clamp hook between a clamped position and an unclamped position, wherein the actuator causes the first clamp hook and the first latch to be unclamped and unlatched, respectively, at the same time and the actuator causes the first clamp hook and the first latch to be clamped and latched, respectively, at the same time.

10. The welding table of claim 1, wherein the welding fixture support assembly further comprises:
a first cutout defined adjacent to the first end of the first rail, wherein the first cutout is adapted to prevent interference of weld spatter during a welding operation.

11. A method comprising:
placing a latch on a welding fixture support assembly in an unlatched position, wherein the welding fixture support assembly is supported by a table;
placing a clamp on the welding fixture support assembly in an unclamped position;
placing a welding fixture atop a welding fixture support assembly that is supported by a table;
sliding the fixture along a top surface of the welding fixture support assembly;
inserting the clamp into a first generally V-shaped slot formed in the welding fixture, wherein the first generally V-shaped slot tapers at an angle less than about 45 degrees, and wherein the clamp contacts an edge of the first generally V-shaped slot at a contact area that has a length greater than ½ inch; and
actuating an actuator to simultaneously move the latch to a latched position and the clamp to a clamped position.

12. The method of claim 11, further comprising:
inserting the latch into a second generally V-shaped slot formed in the welding fixture, wherein the second generally V-shaped slot tapers at an angle less than about 45 degrees, and wherein the latch contacts an edge of the second generally V-shaped slot at a contact area that has a length greater than ½ inch.

13. The method of claim 11, wherein movement of the clamp from the unclamped position to the clamped position further comprises:
pivoting a lever connected to a body of the clamp with assistance from a biasing member.

14. The method of claim 13, wherein the biasing member is a torsion spring located between a tip of the body of the clamp and a lower end of the body of the clamp.

15. The method of claim 11, further comprising:
performing a welding operation with the welding fixture secured to the welding fixture support assembly; and
effecting weld splatter to move through a cutout defined adjacent to an end of rail in the welding fixture support assembly.

16. A cobot welding table comprising:
a table frame having downwardly extending legs;
at least one modular connector on the table frame, wherein the modular connector is a generally flat and planar member that extends in a vertical direction, wherein the modular connector has an upper end connected to one leg of the table frame, a lower end connected the leg of the table frame, and a central portion that is offset from the leg, wherein the central portion defines an aperture that extends fully through the modular connector;

a fixture support assembly positioned atop the table frame, the fixture support assembly including:

a pair of lateral supports that are elongated to extend in a lateral first direction;

a pair of longitudinal supports that are elongated to extend in a longitudinal second direction that is perpendicular to the first direction;

a first rail and a second rail located between a first longitudinal support and a second longitudinal support, wherein the first longitudinal support and the second longitudinal support collectively define the pair of longitudinal supports, wherein the first rail and the second rail are at least as long as the pair of longitudinal supports;

a first end of each of the first rail and the second rail;

a second end of each the first rail and the second rail;

a first latch plate adjacent the first end of the first rail, and a first alignment indicator formed as an arrow being centered relative to the first latch plate;

a first latch adjacent the first end of the first rail and adjacent the first latch plate;

a first clamp hook at the second end of the first rail, wherein the first clamp hook is shaped to fit within a first V-shaped slot formed below a fixture that is to be supported by and engaged with the fixture support assembly via the first clamp hook, wherein the first V-shaped slot tapers at an angle less than about 45 degrees, and a contact area at where the first clamp hook contacts a sidewall of the first V-shaped slot has a length greater than ¾ inch;

a first actuator operatively connected to the first latch and the first clamp hook, wherein movement of the first actuator moves the first latch between a latched position and an unlatched position, and movement of the first actuator moves the first clamp hook between a clamped position and an unclamped position, wherein the first actuator causes the first clamp hook and the first latch to be unclamped and unlatched, respectively, at the same time and the first actuator causes the first clamp hook and the first latch to be clamped and latched, respectively, at the same time;

a first biasing member in operative communication with the first clamp hook, wherein the first biasing member assists to move the first clamp hook between the clamped position and the unclamped position, and wherein the first biasing member is a spring;

a second latch plate adjacent the first end of the second rail, and a second alignment indicator formed as an arrow being centered relative to the second latch plate;

a second latch adjacent the first end of the second rail and adjacent the second latch plate;

a second clamp hook at the second end of the second rail, wherein the second clamp hook is shaped to fit within a second V-shaped slot formed below a fixture that is to be supported by and engaged with the fixture support assembly via the second clamp hook, wherein the second V-shaped slot tapers at an angle less than about 45 degrees, and a contact area at where the second clamp hook contacts a sidewall of the second V-shaped slot has a length greater than ¾ inch;

a second actuator operatively connected to the second latch and the second clamp hook, wherein movement of the second actuator moves the second latch between a latched position and an unlatched position, and movement of the second actuator moves the second clamp hook between a clamped position and an unclamped position, wherein the second actuator causes the second clamp hook and the second latch to be unclamped and unlatched, respectively, at the same time and the second actuator causes the second clamp hook and the second latch to be clamped and latched, respectively, at the same time;

a second biasing member in operative communication with the second clamp hook, wherein the second biasing member assist to move the second clamp hook between the clamped position and the unclamped position, and wherein the second biasing member is a spring;

a first cutout defined adjacent to the first end of the first rail, wherein the first cutout is adapted to prevent interference of weld spatter during cobot welding operation; and a second cutout defined adjacent to the first end of the second rail, wherein the second cutout is adapted to prevent interference of weld spatter during cobot welding operation.

17. The cobot welding table of claim 16, wherein the welding fixture support assembly further comprises:

air supply couplings on one of the pair of lateral supports; and a safety kill switch in a lateral sidewall, wherein the safety kill switch is a push-button type switch.

* * * * *